US011894776B2

(12) United States Patent
Saha et al.

(10) Patent No.: US 11,894,776 B2
(45) Date of Patent: Feb. 6, 2024

(54) CONSTANT CURRENT TO CONSTANT VOLTAGE DUAL ACTIVE BRIDGE LCL-TRANSFORMER RESONANT DC-DC CONVERTER

(71) Applicants: Tarak Saha, Niskayuna, NY (US); Anindya Chitta Bagchi, Colma, CA (US); Regan A. Zane, Hyde Park, UT (US); Hongjie Wang, North Logan, UT (US)

(72) Inventors: Tarak Saha, Niskayuna, NY (US); Anindya Chitta Bagchi, Colma, CA (US); Regan A. Zane, Hyde Park, UT (US); Hongjie Wang, North Logan, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 17/513,717

(22) Filed: Oct. 28, 2021

(65) Prior Publication Data
US 2023/0155514 A1 May 18, 2023

(51) Int. Cl.
*H02M 3/335* (2006.01)
*H02M 1/00* (2006.01)

(52) U.S. Cl.
CPC ..... *H02M 3/33584* (2013.01); *H02M 1/0058* (2021.05); *H02M 3/33571* (2021.05)

(58) Field of Classification Search
CPC .......... H02M 3/33571; H02M 1/0058; H02M 3/33584; H02M 3/335
See application file for complete search history.

(56) References Cited

U.S. PATENT DOCUMENTS 8,587,975 B2 * 11/2013 Jain ..................... H02M 3/3376
363/17
9,761,370 B2 * 9/2017 Wu ........................ B60L 53/122
(Continued)

OTHER PUBLICATIONS

Saha et al., Analysis and Design of an LCL-T Resonant DC-DC Converter for Underwater power Supply, IEEE Transactions on Power Electronics, Jun. 2021, pp. 6725-6737, vol. 36, Issue 6.
(Continued)

*Primary Examiner* — Yusef A Ahmed
(74) *Attorney, Agent, or Firm* — Kunzler Bean & Adamson; Bruce R. Needham

(57) ABSTRACT

A power converter includes a primary H-bridge with switches and an LCL-Transformer section with a first inductor with a first end connected to a first terminal of the primary H-bridge, a capacitor connected between a second end of the first inductor and a second terminal of the primary H-bridge, and a second inductor with a first end connected to the second end of the first inductor. The converter includes a transformer with a primary connected between a second end of the second inductor and the second terminal of the primary H-bridge, a secondary H-bridge with switches with an input connected to a secondary side of the transformer, and an output capacitor connected across output terminals of the secondary H-bridge. The primary H-bridge is fed by a DC constant current source and the output terminals of the secondary H-bridge have a regulated DC output voltage are connected to a load.

18 Claims, 27 Drawing Sheets

(a)

(b)

(56) References Cited

U.S. PATENT DOCUMENTS

| | | | | |
|---|---|---|---|---|
| 9,876,434 | B2* | 1/2018 | Torrico-Bascopé | H02M 3/33584 |
| 10,050,534 | B1* | 8/2018 | Murthy-Bellur | H02M 3/24 |
| 10,110,138 | B1* | 10/2018 | Murthy-Bellur | H02M 1/36 |
| 10,122,367 | B1* | 11/2018 | Albertini | H02M 3/33584 |
| 2009/0034299 | A1* | 2/2009 | Lev | H02M 3/01 363/17 |
| 2010/0002471 | A1* | 1/2010 | Heo | H02M 3/33573 363/17 |
| 2010/0026419 | A1* | 2/2010 | Hara | H03H 9/725 333/175 |
| 2011/0249472 | A1* | 10/2011 | Jain | H02M 3/33584 363/15 |
| 2011/0254379 | A1* | 10/2011 | Madawala | H02M 3/33584 307/104 |
| 2012/0002446 | A1* | 1/2012 | Madawala | H02J 7/00712 363/17 |
| 2012/0014138 | A1* | 1/2012 | Ngo | H02M 3/33584 363/17 |
| 2012/0229034 | A1* | 9/2012 | Yu | H05B 45/3725 315/186 |
| 2012/0300502 | A1* | 11/2012 | Shimada | H02M 1/4258 363/17 |
| 2013/0188397 | A1* | 7/2013 | Wu | B60L 53/126 363/17 |
| 2013/0207482 | A1* | 8/2013 | Madawala | H02M 7/797 307/104 |
| 2013/0343089 | A1* | 12/2013 | Gupta | H02M 7/49 363/16 |
| 2014/0198534 | A1* | 7/2014 | Jovcic | H02M 3/33507 363/16 |
| 2015/0001958 | A1* | 1/2015 | Abe | B60L 50/16 307/104 |
| 2015/0109827 | A1* | 4/2015 | Poshtkouhi | H02M 3/33584 363/17 |
| 2015/0349649 | A1* | 12/2015 | Zane | H02M 3/1584 363/21.03 |
| 2017/0019960 | A1* | 1/2017 | Qu | H05B 45/3725 |
| 2017/0222488 | A1* | 8/2017 | Madawala | H02M 3/33576 |
| 2018/0183344 | A1* | 6/2018 | Iwaya | H02M 3/33592 |
| 2019/0097544 | A1* | 3/2019 | Albertini | H02M 3/33592 |
| 2019/0190393 | A1* | 6/2019 | Murakami | H02M 3/33561 |
| 2019/0217726 | A1* | 7/2019 | Covic | B60L 5/005 |
| 2019/0296650 | A1* | 9/2019 | Wang | H02M 3/33573 |
| 2019/0372471 | A1* | 12/2019 | Peng | H02M 3/33584 |
| 2020/0195144 | A1* | 6/2020 | Gekinozu | H02M 3/3376 |
| 2020/0235656 | A1* | 7/2020 | Forouzesh | H02M 1/4258 |
| 2020/0287470 | A1* | 9/2020 | Saha | H02M 3/33573 |
| 2020/0373847 | A1* | 11/2020 | Saha | H02M 3/33576 |
| 2020/0382012 | A1* | 12/2020 | Ksiazek | H02M 1/083 |
| 2021/0028712 | A1* | 1/2021 | Yu | H01F 30/16 |
| 2021/0067045 | A1* | 3/2021 | Zhang | H02M 3/33573 |
| 2021/0135666 | A1* | 5/2021 | Wang | B60L 58/10 |
| 2021/0203236 | A1* | 7/2021 | Zhang | H02M 3/33561 |
| 2022/0321016 | A1* | 10/2022 | Khaligh | H02M 3/33561 |
| 2022/0337166 | A1* | 10/2022 | Chan | H02M 1/4233 |

OTHER PUBLICATIONS

Rivetta et al., Analysis and Control of a Buck DC-DC Converter Operating with Constant Power Load in Sea and Undersea Vehicles, IEEE Transactions on Industry Applications, Mar. 2006, pp. 559-572, vol. 42, Issue 2.

Zhao et al., Overview of Dual-Active-Bridge Isolated Bidirectional DC-DC Converter for High-Frequency-Link Power-Conversion System, IEEE Transactions on Power Electronics, Aug. 2014, pp. 4091-4106, vol. 29, No. 8.

Kheraluwala et al., Performance Characterization of a High-Power Dual Active Bridge DC-to-DC Converter, IEE Transactions on Industry Applications, Nov. 1992, pp. 1294-1301, vol. 28, No. 6.

Borage et al., LCL-T Resonant Converter with Clamp Diodes: A Novel Constant-Current Power Supply with Inherent Constant-Voltage Limit, IEEE Transactions on Industrial Electronics, Apr. 2007, pp. 741-746, vol. 54, No. 2.

Borage et al., Constant-Current, Constant-Voltage Half-Bridge Resonant Power Supply for Capacitor Charging, IEE Proc-Electr. Power Appl., May 2006, pp. 343-347, vol. 153, No. 3.

Saha et al., Time-Domain Analysis and ZVS Assistance Design for a DAB LCL-T Resonant Converter in Underwater DC Current Distribution Network, 2020 IEEE 21st Workshop on Control and Modeling for Power Electronics (COMPEL), Nov. 9, 2020, IEEE.

* cited by examiner

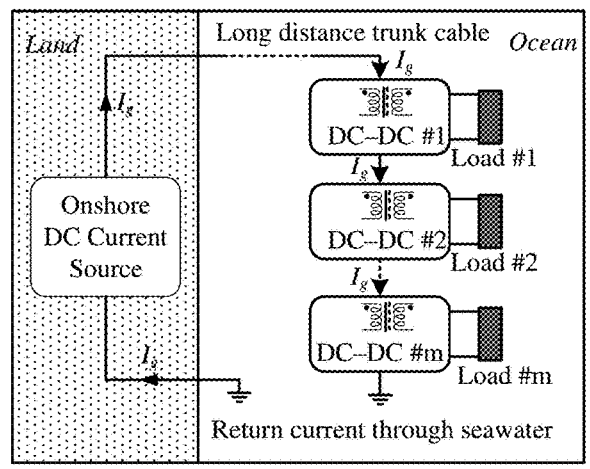
FIG. 1
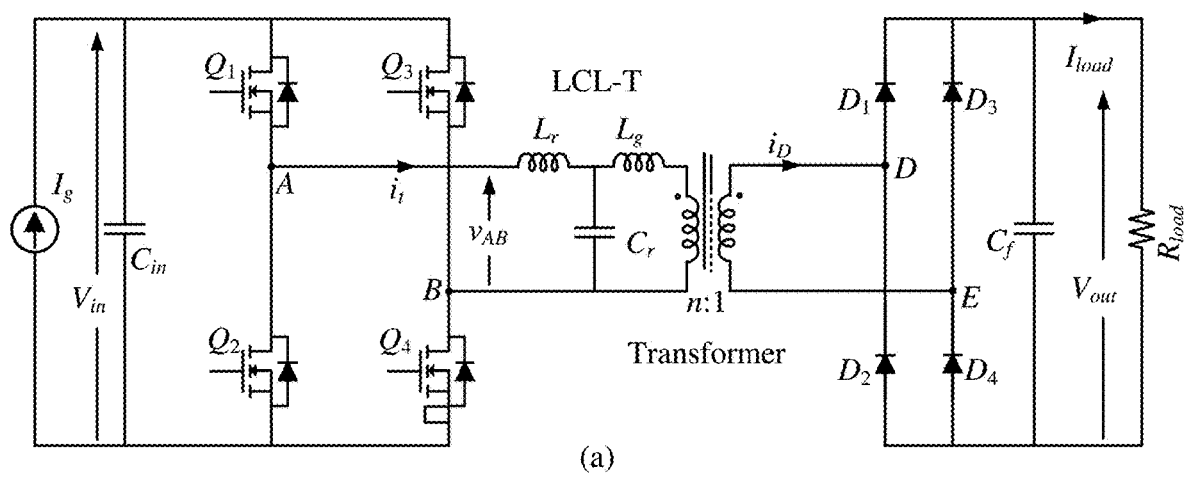
(a)
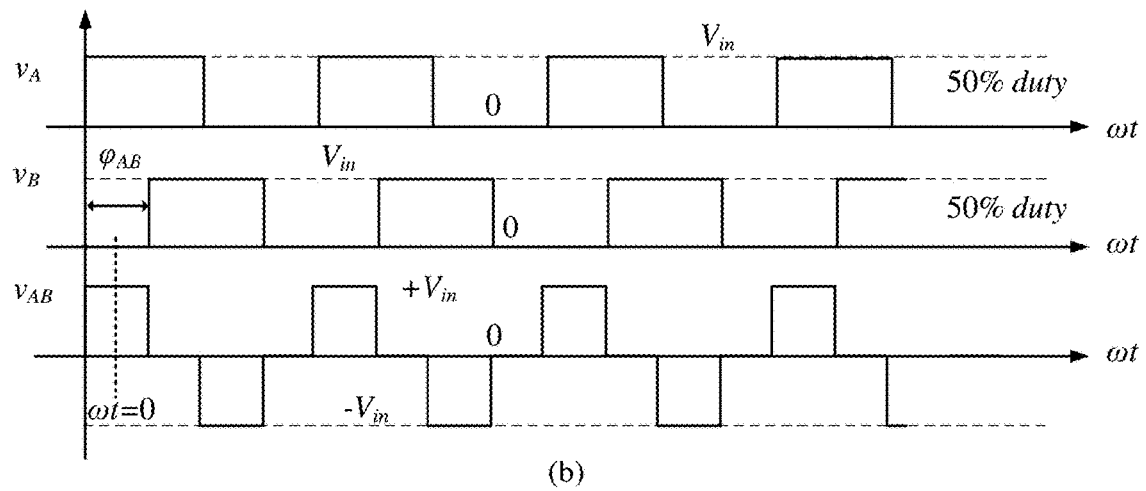
(b)
FIG. 2

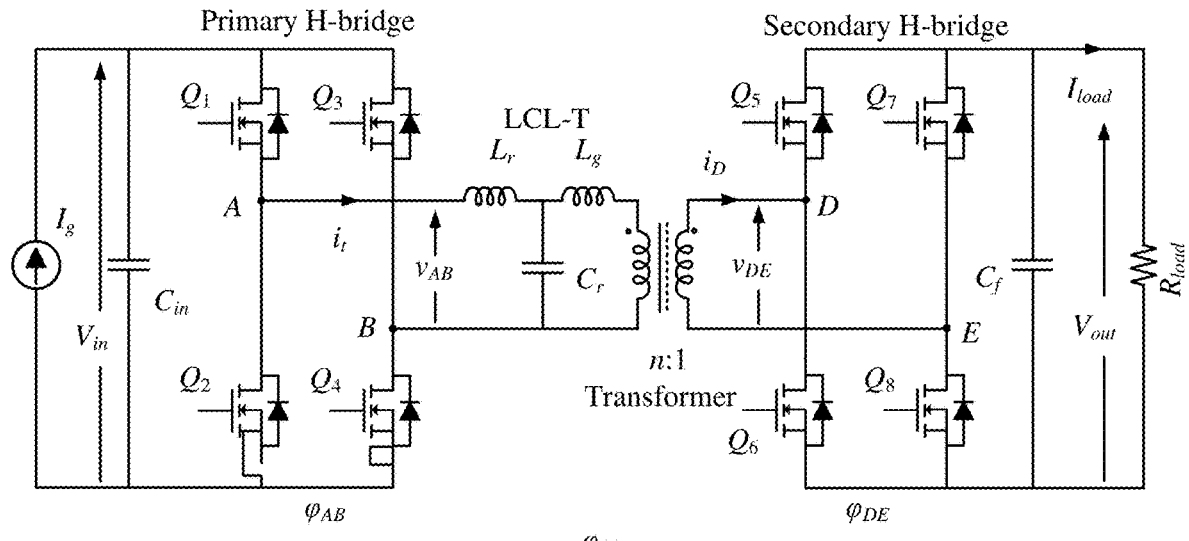
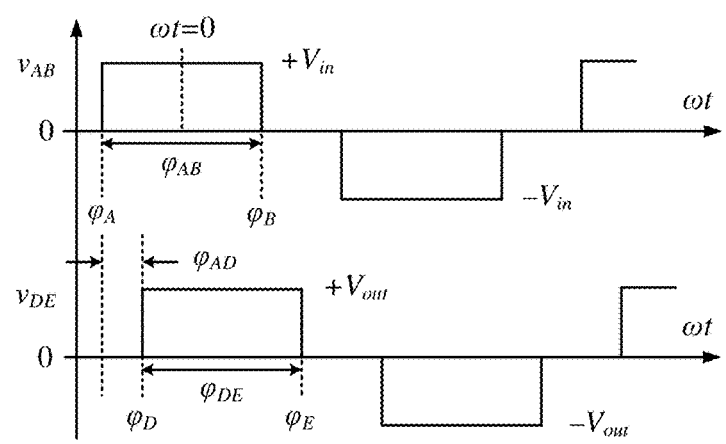
FIG. 8

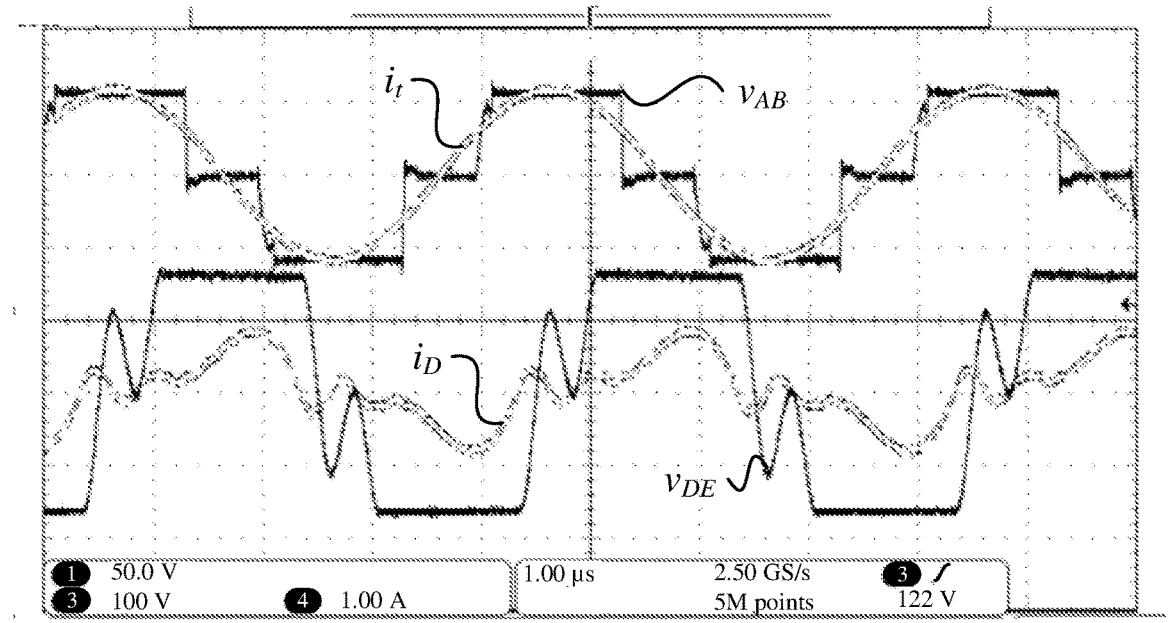
(a)
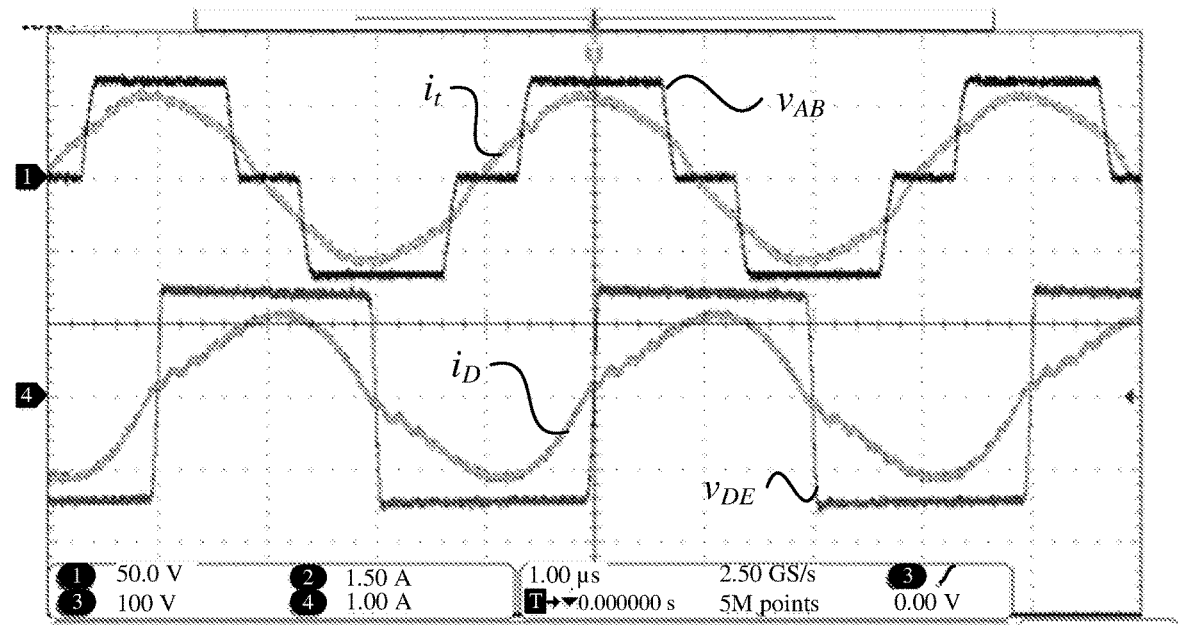
(b)
FIG. 10

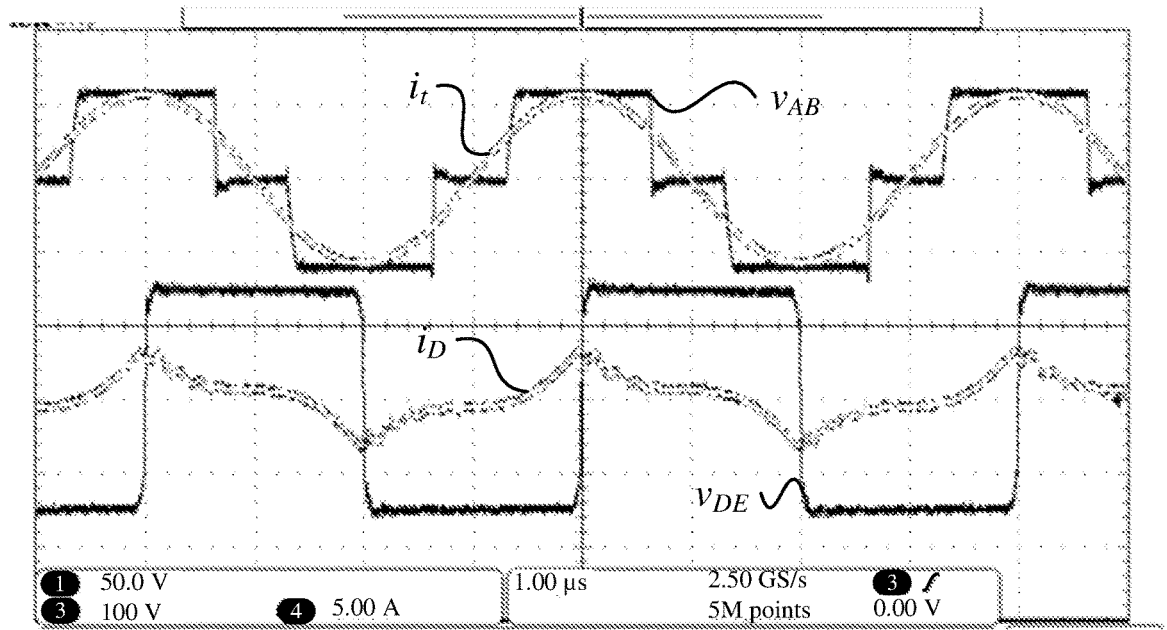
(a)
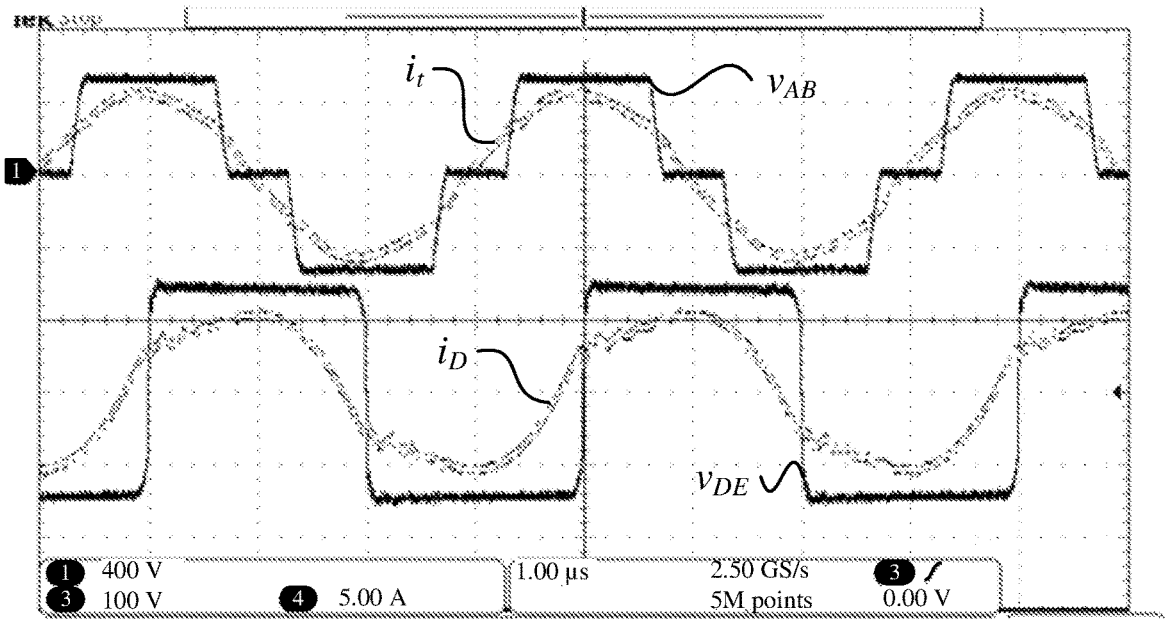
(b)
FIG. 11

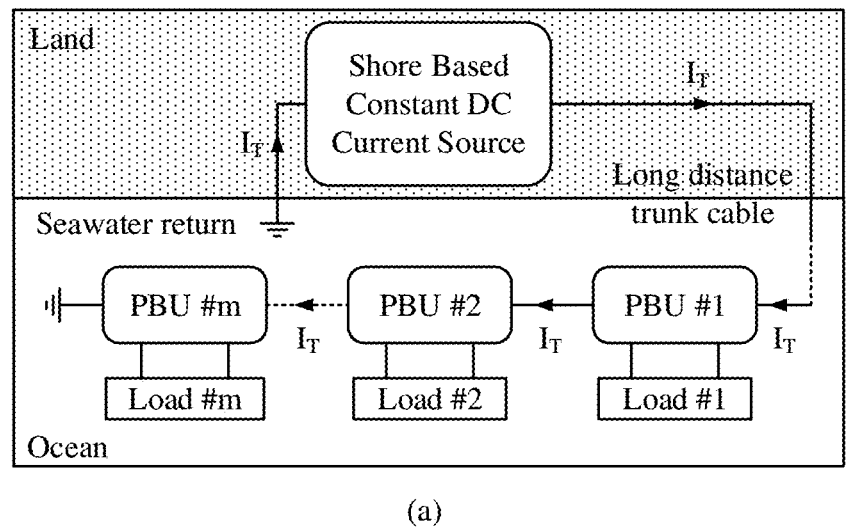
(a)
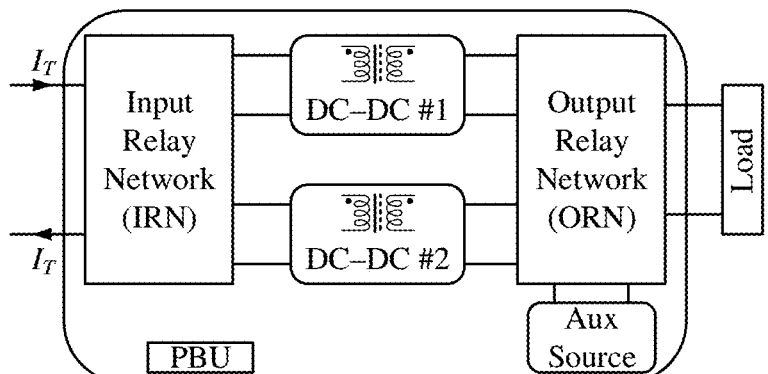
(b)
FIG. 19

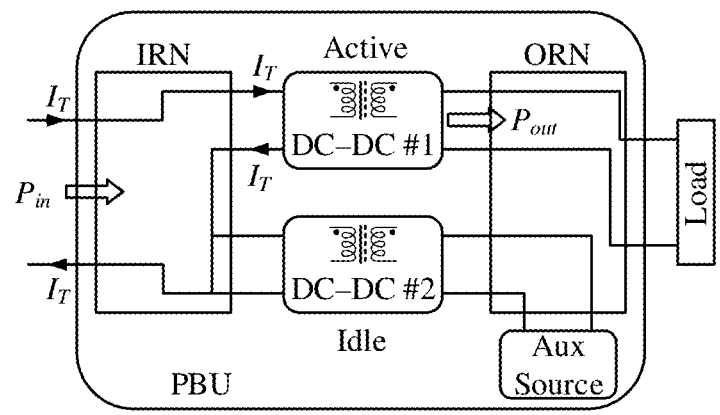
(a)
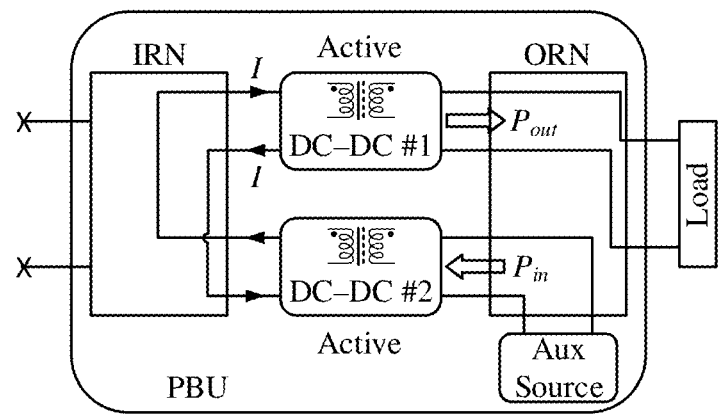
(b)
FIG. 20

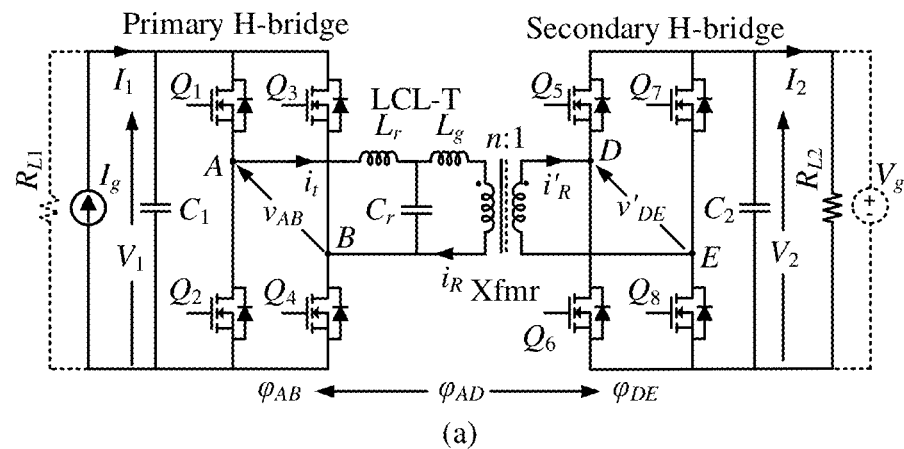
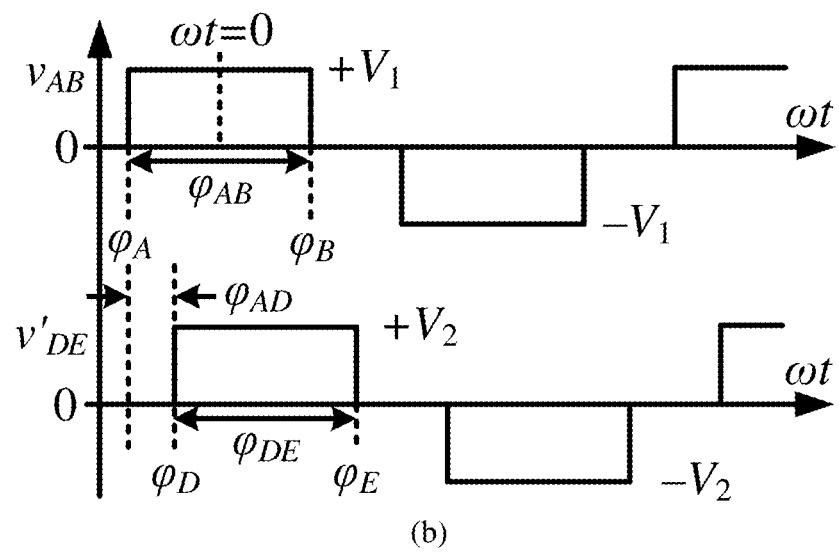
FIG. 21

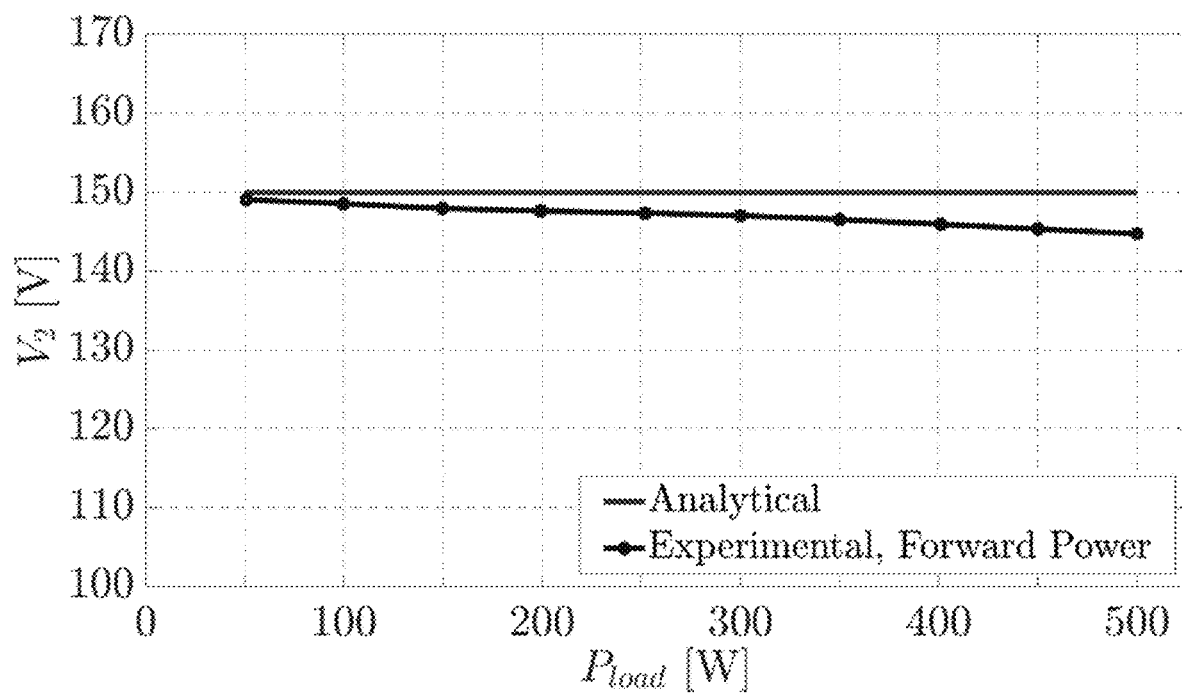
(a)
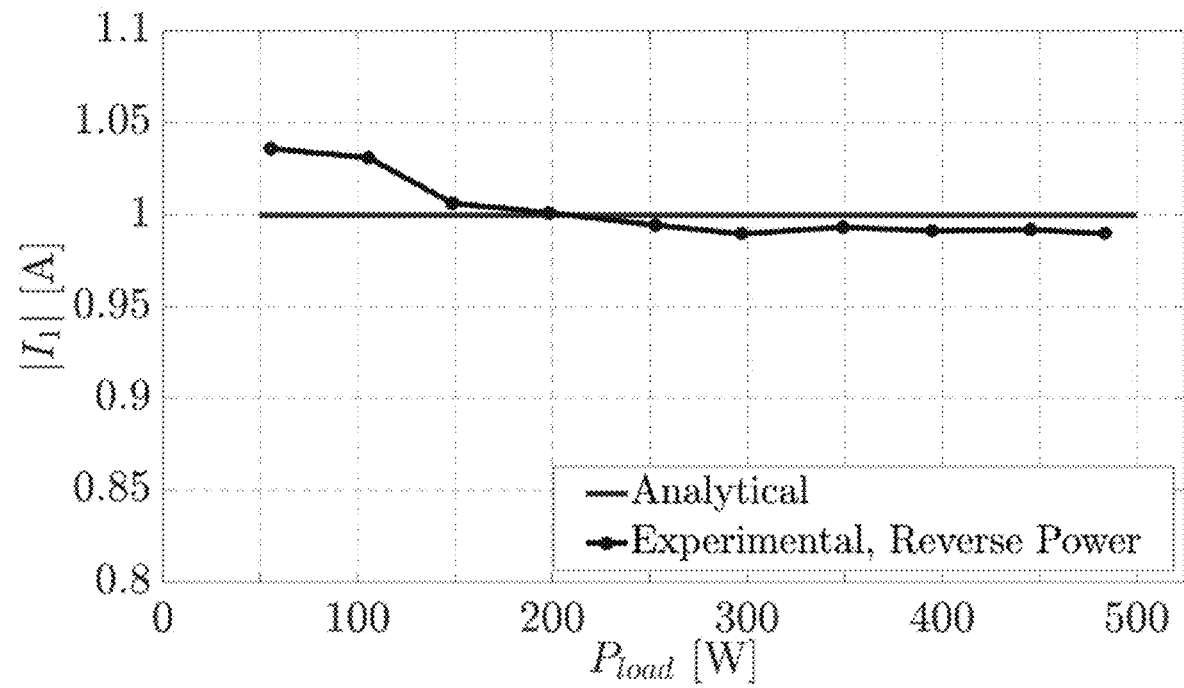
(b)
FIG. 27

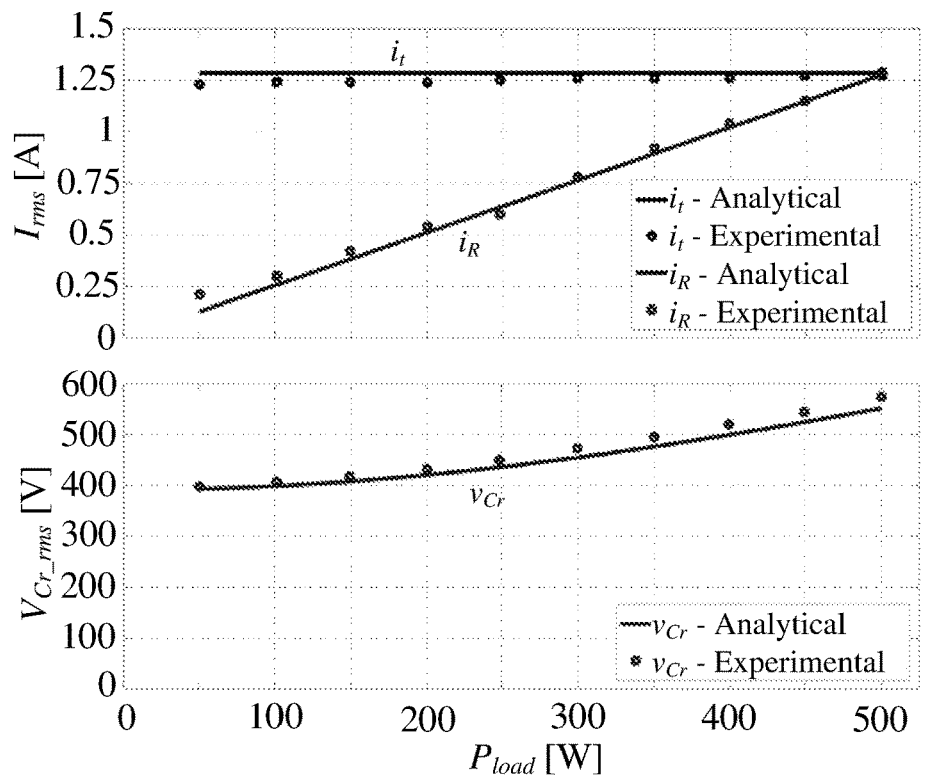
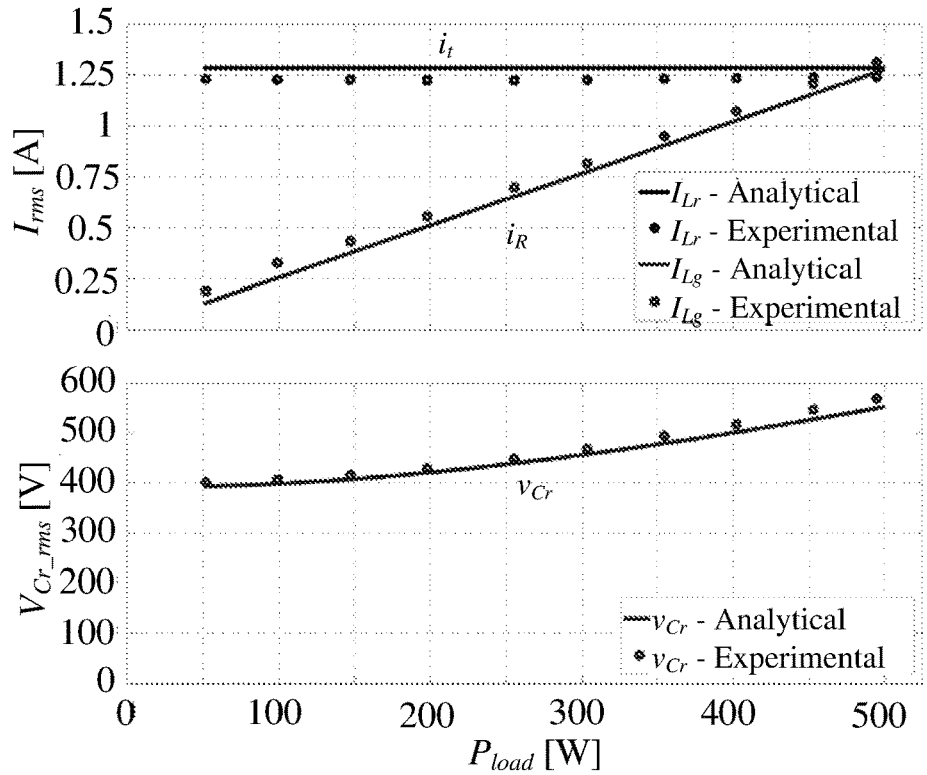
FIG. 29

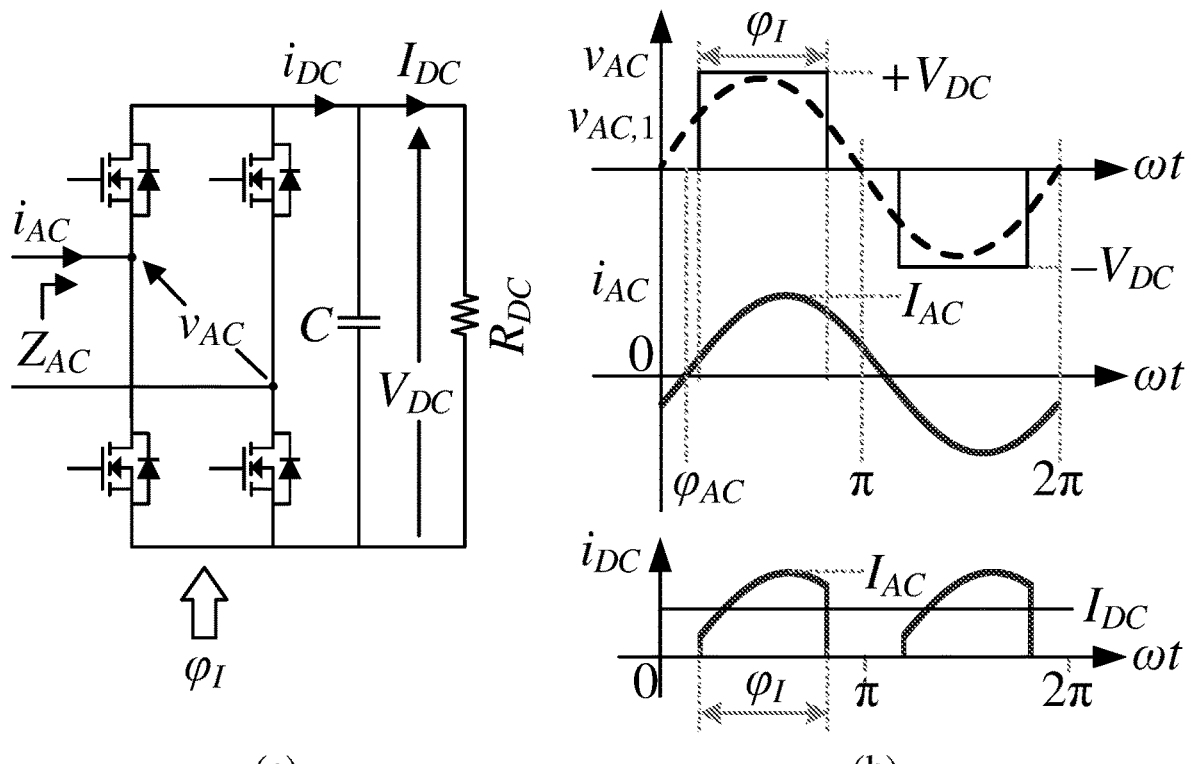
(a)     FIG. 34     (b)
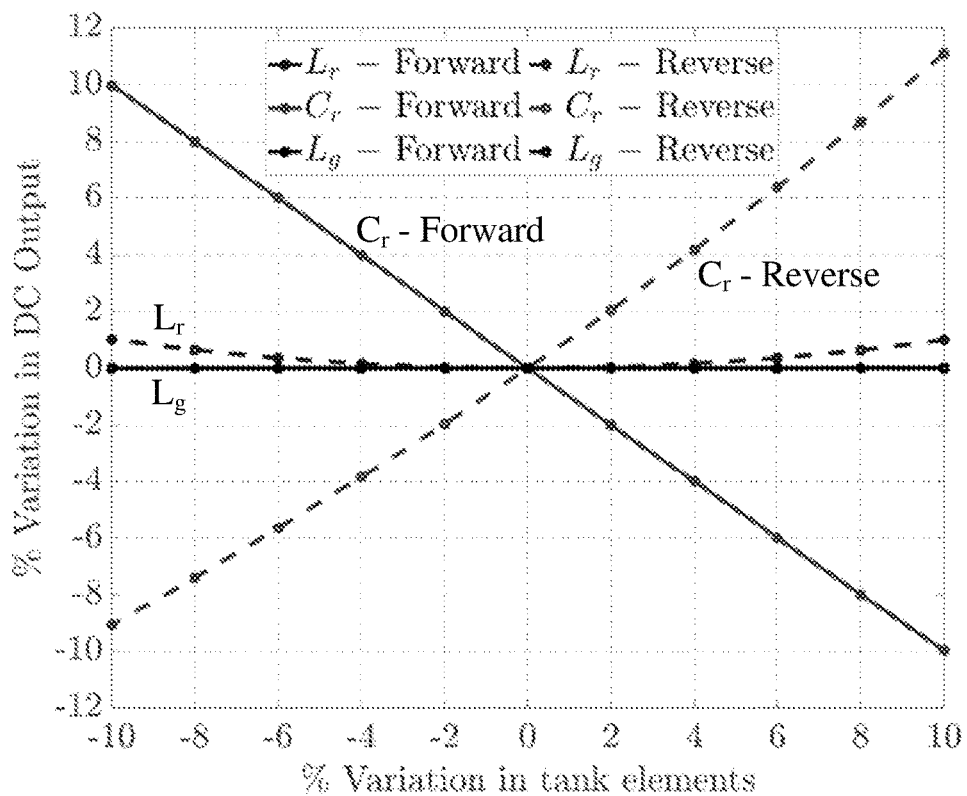
FIG. 35

Table III – Converter Signals

| VALUE | FORWARD POWER | REVERSE POWER |
|---|---|---|
| Source | $I_g$ | $V_g$ |
| Load ($R_L$) | $R_{L2}$ | $R_{L1}$ |
| $V_1$ | $\dfrac{I_g}{R_{L2}}\left[\dfrac{\pi^2}{8n\sin\left(\frac{\varphi_{AB}}{2}\right)\sin\left(\frac{\varphi_{DE}}{2}\right)\sin\left(\varphi_{AD}-\frac{\varphi_{AB}}{2}+\frac{\varphi_{DE}}{2}\right)}\right]^{-1}$ | $\|I_1\|R_{L1}$ |
| $I_1$ | $I_g$ | $\dfrac{8}{\pi^2}\dfrac{nV_g}{Z_o}\sin\left(\frac{\varphi_{AB}}{2}\right)\sin\left(\frac{\varphi_{DE}}{2}\right)\sin\left(\varphi_{AD}-\frac{\varphi_{AB}}{2}+\frac{\varphi_{DE}}{2}\right)$ |
| $V_2$ | $\dfrac{\pi^2}{8n}\dfrac{I_g Z_o}{\sin\left(\frac{\varphi_{AB}}{2}\right)\sin\left(\frac{\varphi_{DE}}{2}\right)\sin\left(\varphi_{AD}-\frac{\varphi_{AB}}{2}+\frac{\varphi_{DE}}{2}\right)}$ | $V_g$ |
| $I_2$ | $\dfrac{V_2}{R_{L2}}$ | $-nV_g\left[\dfrac{8n}{\pi^2 Z_o}\sin\left(\frac{\varphi_{AB}}{2}\right)\sin\left(\frac{\varphi_{DE}}{2}\right)\sin\left(\varphi_{AD}-\frac{\varphi_{AB}}{2}+\frac{\varphi_{DE}}{2}\right)\right]^{-1}$ |
| $\varphi_e$ | $\dfrac{\pi}{2}-\left(\varphi_{AD}-\dfrac{\varphi_{AB}}{2}+\dfrac{\varphi_{DE}}{2}\right)$ | $\dfrac{\pi}{2}+\left(\varphi_{AD}-\dfrac{\varphi_{AB}}{2}+\dfrac{\varphi_{DE}}{2}\right)$ |
| $Z_e$ | $\dfrac{8n^2}{\pi^2}R_{L2}\cos(\varphi_e)\sin^2\left(\frac{\varphi_{DE}}{2}\right)\angle\varphi_e$ | $\dfrac{8}{\pi^2}R_{L1}\cos(\varphi_e)\sin^2\left(\frac{\varphi_{AB}}{2}\right)\angle\varphi_e$ |
| $v_S$ | $v_{AB,1}=\dfrac{4}{\pi}V_1\sin\left(\frac{\varphi_{AB}}{2}\right)\angle 0$ | $v_{DE,1}=\dfrac{4n}{\pi}V_g\sin\left(\frac{\varphi_{DE}}{2}\right)\angle 0$ |
| $v_L$ | $v_{DE,1}=\dfrac{4n}{\pi}V_2\sin\left(\frac{\varphi_{DE}}{2}\right)\angle-\left(\varphi_{AD}-\frac{\varphi_{AB}}{2}+\frac{\varphi_{DE}}{2}\right)$ | $v_{AB,1}=\dfrac{4}{\pi}V_1\sin\left(\frac{\varphi_{AB}}{2}\right)\angle\left(\varphi_{AD}-\frac{\varphi_{AB}}{2}+\frac{\varphi_{DE}}{2}\right)$ |
| $i_S$ | $i_L=\dfrac{\pi I_g}{2\sin\left(\frac{\varphi_{AB}}{2}\right)\cos(\varphi_e)}\angle\varphi_e$ | $i_R=\dfrac{4}{\pi}\|I_1\|\dfrac{R_{L1}}{Z_o}\sin\left(\frac{\varphi_{AB}}{2}\right)\angle(\pi+\varphi_e)$ |
| $i_L$ | $i_R=\dfrac{\pi}{2n}\dfrac{V_2}{R_{L2}\sin\left(\frac{\varphi_{DE}}{2}\right)\cos(\varphi_e)}\angle-\dfrac{\pi}{2}$ | $i_L=\dfrac{4n}{\pi}\dfrac{V_g}{Z_o}\sin\left(\frac{\varphi_{DE}}{2}\right)\angle\dfrac{\pi}{2}$ |
| $v_{Cr}$ | $\dfrac{4n}{\pi}V_2\sin\left(\frac{\varphi_{DE}}{2}\right)\cos(\varphi_e)\sqrt{1+\dfrac{1}{Q_e^2}}\angle-\tan^{-1}Q_e$ | $\dfrac{4}{\pi}\|I_1\|R_{L1}\sin\left(\frac{\varphi_{AB}}{2}\right)\cos(\varphi_e)\sqrt{1+\dfrac{1}{Q_e^2}}\angle-\tan^{-1}Q_e$ |
| $i_{Cr}$ | $\dfrac{4n}{\pi}\dfrac{V_g}{Z_o}\sin\left(\frac{\varphi_{DE}}{2}\right)\cos(\varphi_e)\sqrt{1+\dfrac{1}{Q_e^2}}\angle\tan^{-1}\left(\frac{1}{Q_e}\right)$ | $\dfrac{4}{\pi}\|I_1\|\dfrac{R_{L1}}{Z_o}\sin\left(\frac{\varphi_{AB}}{2}\right)\cos(\varphi_e)\sqrt{1+\dfrac{1}{Q_e^2}}\angle\tan^{-1}\left(\frac{1}{Q_e}\right)$ |
| Phasor Diagram | (phasor diagram) | (phasor diagram) |

FIG. 36

Table IV – Converter Signals at the Operating Condition

| VALUE | FORWARD POWER | REVERSE POWER |
|---|---|---|
| $V_1$ | $\dfrac{I_g}{R_{L2}}\left[\dfrac{\pi^2}{8n}\dfrac{Z_o}{\sin\left(\frac{\varphi_{AB}}{2}\right)}\right]^2$ | $|I_1|R_{L1}$ |
| $I_1$ | $I_g$ | $-\dfrac{8n\,V_g}{\pi^2\,Z_o}\sin\left(\dfrac{\varphi_{AB}}{2}\right)$ |
| $V_2$ | $\dfrac{\pi^2}{8n}\dfrac{I_g Z_o}{\sin\left(\frac{\varphi_{AB}}{2}\right)}$ | $V_g$ |
| $I_2$ | $\dfrac{V_2}{R_{L2}}$ | $-R_{L1}V_g\left[\dfrac{8n}{\pi^2 Z_o}\sin\left(\dfrac{\varphi_{AB}}{2}\right)\right]^2$ |
| $R_e$ | $\dfrac{n^2 8}{\pi^2}R_{L2}$ | $\dfrac{8}{\pi^2}R_{L1}\sin^2\left(\dfrac{\varphi_{AB}}{2}\right)$ |
| $v_S$ | $v_{AB,1}=\dfrac{4}{\pi}V_1\sin\left(\dfrac{\varphi_{AB}}{2}\right)\angle 0$ | $v_{DE,1}=\dfrac{4n}{\pi}V_g\angle 0$ |
| $v_L$ | $v_{DE,1}=\dfrac{4n}{\pi}V_2\angle -\dfrac{\pi}{2}$ | $V_{AB,1}=\dfrac{4}{\pi}V_1\sin\left(\dfrac{\varphi_{AB}}{2}\right)\angle -\dfrac{\pi}{2}$ |
| $i_S$ | $i_t=\dfrac{\pi}{2}\dfrac{I_g}{\sin\left(\frac{\varphi_{AB}}{2}\right)}\angle 0$ | $i_R=\dfrac{\pi}{2}\dfrac{|I_1|}{\sin\left(\frac{\varphi_{AB}}{2}\right)}Q\angle \pi$ |
| $i_L$ | $i_R=\dfrac{4n}{\pi}\dfrac{V_2}{QZ_o}\angle -\dfrac{\pi}{2}$ | $i_t=\dfrac{4n}{\pi}\dfrac{V_g}{Z_o}\angle \dfrac{\pi}{2}$ |
| $v_{Cr}$ | $\dfrac{4n}{\pi}V_2\sqrt{1+\dfrac{1}{Q^2}}\angle -\tan^{-1}Q$ | $\dfrac{\pi}{2}\dfrac{Z_o|I_1|}{\sin\left(\frac{\varphi_{AB}}{2}\right)}\sqrt{1+Q^2}\angle -\tan^{-1}Q$ |
| $i_{Cr}$ | $\dfrac{4n}{\pi}\dfrac{V_2}{Z_o}\sqrt{1+\dfrac{1}{Q^2}}\angle \tan^{-1}\left(\dfrac{1}{Q}\right)$ | $\dfrac{\pi}{2}\dfrac{|I_1|}{\sin\left(\frac{\varphi_{AB}}{2}\right)}\sqrt{1+Q^2}\angle \tan^{-1}\left(\dfrac{1}{Q}\right)$ |
| Phasor Diagram | 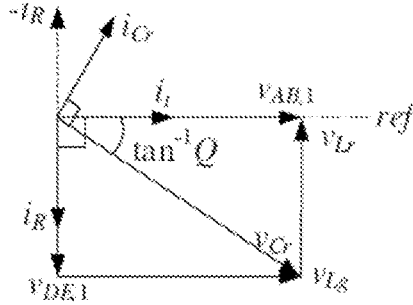 | 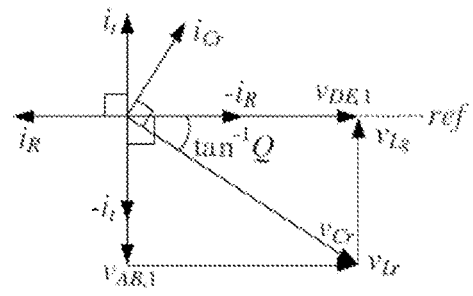 |

FIG. 37

CONSTANT CURRENT TO CONSTANT VOLTAGE DUAL ACTIVE BRIDGE LCL-TRANSFORMER RESONANT DC-DC CONVERTER

FIELD

This invention relates to resonant converters and more particularly relates to constant current to a constant voltage dual active bridge ("DAB") inductor-capacitor-inductor ("LCL") T-type resonant direct current ("DC")-to-DC converter.

BACKGROUND

Resonant power converters are a popular choice for DC-DC power conversion at high switching frequency due to their soft-switching capability, high efficiency, high power density, and low electromagnetic interference ("EMI"). Because of these inherent advantages, resonant converters are widely used in various application such as telecommunications, energy storage, undersea DC distribution networks, wireless power transfer systems, battery or capacitor charging, LED drivers, and the like.

In long distance underwater ocean observatory systems, converters placed on the seabed are distant from the source and a constant DC current based power distribution is preferred because of its robustness against cable impedance and faults. A block diagram of such a distribution network is shown in FIG. 1, where the onshore a U power source drives a constant current through the trunk cable to m series connected, O isolated DC-DC converter module(s) that are contained in their respective hermetically sealed enclosures and thus the components do not come in contact with the sea-water. IN some embodiments, utilizing the conductivity of saline water, the cable current returns to the source through seawater. Each DC-DC converter taps power from this constant current source to regulate its output voltage or current.

With a current source as input, converters employ a current fed inverter ("CFI") stage at front end that can operate with zero current switching ("ZCS"). However, achieving zero voltage switching ("ZVS") is challenging in CFI, limiting the switching frequency of operation. With resonant topologies, switches in a CFI often must be rated for a value higher than average DC input voltage, which makes the CFI stage impractical for low-current high-voltage systems. Hence, a voltage fed inverter stage is often used at the front end, where the DC input voltage varies with the load. Various topologies have been tried, but all have distinct deficiencies.

SUMMARY

A power converter includes a primary H-bridge that includes semi-conductor switches. The power converter has an LCL-T section that includes a first inductor $L_r$ with a first end connected to a first terminal A of the primary H-bridge, a capacitor $C_r$ connected between a second end of the first inductor $L_r$ and a second terminal B of the primary H-bridge, and a second inductor $L_g$ with a first end connected to the second end of the first inductor $L_r$. The power converter includes a transformer with a primary side connected between a second end of the second inductor $L_g$ and the second terminal B of the primary H-bridge, a secondary H-bridge that includes semi-conductor switches with an input connected to a secondary side of the transformer, and an output capacitor $C_f$ connected across output terminals of the secondary H-bridge. The primary H-bridge is fed by a direct current ("DC") constant current source and the output terminals of the secondary H-bridge are connected to a load and an output voltage of the secondary H-bridge is regulated to maintain a constant DC output voltage.

Another embodiment of a power converter includes a primary H-bridge with four semi-conductor switches where two of the switches are in leg A with terminal A between the switches in leg A and two of the switches are in leg B with terminal B between the switches in leg B. Terminal A and terminal B form an output of the primary H-bridge. The power converter includes an LCL-T section that includes a first inductor $L_r$ with a first end connected to terminal A, a capacitor $C_r$ connected between a second end of the first inductor $L_r$ and terminal B, and a second inductor $L_g$ with a first end connected to the second end of the first inductor $L_r$. The power converter includes a transformer with a primary side connected between a second end of the second inductor $L_g$ and terminal B where the transformer has a turns ratio n. The power converter includes a secondary H-bridge that includes semi-conductor switches with an input connected to a secondary side of the transformer where two of the switches are in leg D with terminal D between the two switches of leg D and two of the switches are in leg E with terminal E between the two switches of leg E. Terminal D and terminal E form an output of the secondary H-bridge. The power converter includes an output capacitor $C_f$ connected across terminal D and terminal E. The primary H-bridge is fed by a DC constant current source and terminals D and E are connected to a load and an output voltage across terminals D and E is regulated to maintain a constant DC output voltage.

Another bidirectional power converter includes a primary H-bridge that includes four semi-conductor switches where two of the switches are in leg A with terminal A between the switches in leg A and two of the switches are in leg B with terminal B between the switches in leg B. Terminal A and terminal B form an output of the primary H-bridge. The bidirectional power converter includes an LCL-T section that includes a first inductor $L_r$ with a first end connected to terminal A, a capacitor $C_r$ connected between a second end of the first inductor $L_r$ and terminal B, and a second inductor $L_g$ with a first end connected to the second end of the first inductor $L_r$. The bidirectional power converter includes a transformer with a primary side connected between a second end of the second inductor $L_g$ and terminal B. The transformer has a turns ratio n. The bidirectional power converter includes a secondary H-bridge that includes semi-conductor switches with an input connected to a secondary side of the transformer where two of the switches are in leg D with terminal D between the two switches of leg D and two of the switches are in leg E with terminal E between the two switches of leg E. Terminal D and terminal E form an output of the secondary H-bridge.

The bidirectional power converter includes an output capacitor $C_f$ connected across terminal D and terminal E. The primary H-bridge is fed by a DC constant current source and terminals D and E are connected to a load and an output voltage across terminals D and E is regulated to maintain a constant DC output voltage. The switches of the primary H-bridge are arranged in a leg A and a leg B and the switches of the secondary H-bridge are arranged in a leg D and a leg E where the switches of the primary H-bridge are operated with symmetrical phase shift modulation with leg A leading leg B by an angle $\varphi_{AB}$, the switches of the secondary H-bridge are operated with symmetrical phase shift modulation with leg D leading leg E by an angle $\varphi_{DE}$, an angle between leg A and leg D is angle $\varphi_{AD}$, and a power flow direction from the primary H-bridge to the secondary H-bridge is dependent on a phase angle $\varphi_{PS}$, which is:

$$\varphi_{PS} = \varphi_{AD} - \frac{\varphi_{AB}}{2} + \frac{\varphi_{DE}}{2}.$$

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1 is schematic block diagram illustrating one embodiment of an underwater DC distribution network fed from an onshore DC current source;

FIG. 2 is a schematic block diagram illustrating one embodiment of (a) an LCL-T resonant DC-DC converter topology and (b) primary side modulation;

FIG. 8 is (a) a schematic block diagram illustrating one embodiment of a dual active bridge ("DAB") LCL-T resonant DC-DC converter topology, and (b) corresponding modulation waveforms;

FIG. 10 includes oscilloscope waveforms from a hardware test setup with steady state operating waveforms with a diode-bridge on the secondary H-bridge with $\varphi_{AB}=120°$, (a) at 50 W and (b) at 500 W where CH1: $v_{AB}$, CH2: $i_r$, CH3: $v_{DE}$, CH4: $i_D$;

FIG. 11 includes oscilloscope waveforms from the hardware test setup with steady state operating waveforms with active bridge on the secondary side with $_{AB}=120°$, $\varphi_{DE}=180°$ and $\varphi_{AD}=60°$, (a) at 50 W and (b) at 500 W where CH1: $v_{AB}$, CH2: $i_r$, CH3: $v_{DE}$, CH4: $i_D$;

FIG. 19 is a schematic block diagram illustrating one embodiment of (a) a system level block diagram of undersea DC constant current distribution network with power branching units ("PBUs") and (b) components within a PBU catering to critical loads;

FIG. 20 is a schematic block diagram illustrating one embodiment of power flow through a PBU (a) from the trunk cable to the load under normal operating conditions, and (b) from an auxiliary source to the load under a cable fault condition;

FIG. 21 is (a) a schematic block diagram illustrating one embodiment of a DAB LCL-T resonant DC-DC converter topology and (b) associated modulation waveforms;

FIG. 27 are diagrams illustrating steady state DC output versus load power for (a) output voltage in forward power and (b) output current in reverse power with analysis results and experimental results;

FIG. 29 are diagrams illustrating a comparison of analytical and experimentally measured rms values of tank signals plotted against load power for (a) forward power and (b) reverse power where solid lines represent analytical expressions and dots represent experimental results operating with $\varphi_{AB}=120°$;

FIG. 34 is (a) a schematic block diagram illustrating one embodiment of the secondary H-bridge with a capacitive filter on the DC side and (b) its AC and DC side voltage and current waveforms;

FIG. 35 is a diagram illustrating percentage variation in DC output with respect to variation in resonant tank elements where solid lines are for forward power transfer and dotted lines are for reverse power flow operation showing plots for $L_r$, $C_r$ and $L_g$;

FIG. 36 is Table III of converter signals; and

FIG. 37 is Table IV of converter signals at the operating condition.

DETAILED DESCRIPTION

Figure 3:
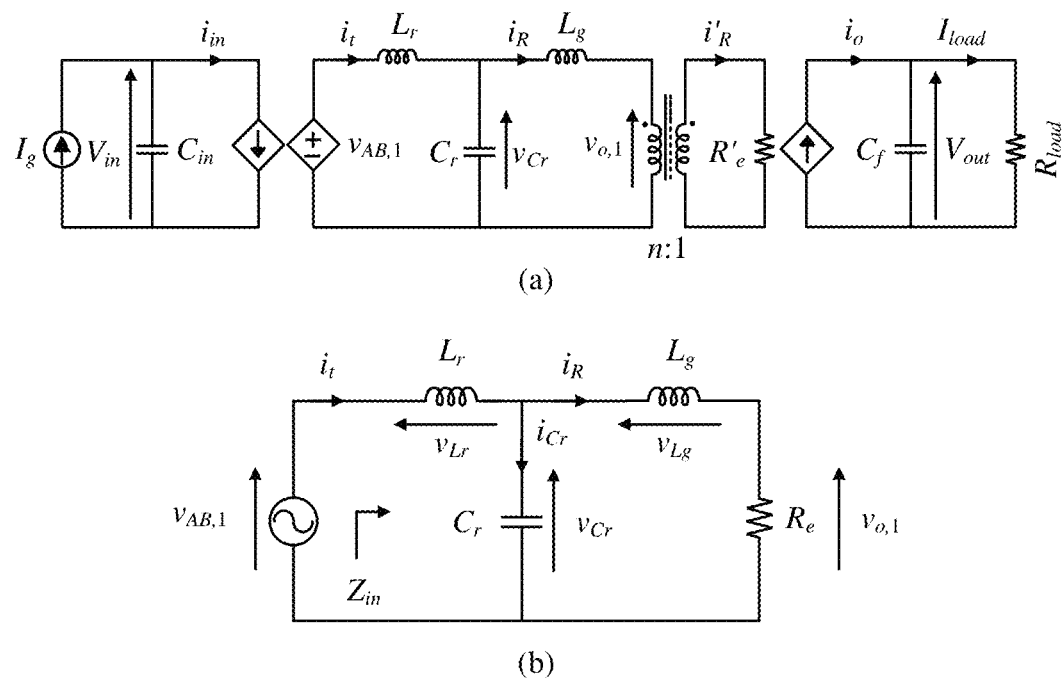
FIG. 3 is (a) a schematic block diagram illustrating one embodiment of an equivalent circuit of the LCL-T resonant converter of FIG. 2(a) and a simplified equivalent circuit for steady state analysis using fundamental harmonic approximation.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A power converter includes a primary H-bridge that includes semi-conductor switches. The power converter has an LCL-T section that includes a first inductor $L_r$ with a first end connected to a first terminal A of the primary H-bridge, a capacitor $C_r$ connected between a second end of the first inductor $L_r$ and a second terminal B of the primary H-bridge, and a second inductor $L_g$ with a first end connected to the second end of the first inductor $L_r$. The power converter includes a transformer with a primary side connected between a second end of the second inductor $L_g$ and the second terminal B of the primary H-bridge, a secondary H-bridge that includes semi-conductor switches with an input connected to a secondary side of the transformer, and an output capacitor $C_f$ connected across output terminals of the secondary H-bridge. The primary H-bridge is fed by a direct current ("DC") constant current source and the output terminals of the secondary H-bridge are connected to a load and an output voltage of the secondary H-bridge is regulated to maintain a constant DC output voltage.

In some embodiments, a switching frequency of the switches of the primary H-bridge and the secondary H-bridge is selected to be within 15 percent of a resonant frequency of the LCL-T section. In other embodiments, a ratio g of the first inductor $L_r$ and the second inductor $L_g$ is set to be within a range of 0.2 to 5 (g=0.2 to 5). In other embodiments, the switches of the primary H-bridge are arranged in a leg A and a leg B and the switches of the secondary H-bridge are arranged in a leg D and a leg E and the switches of the primary H-bridge are operated with symmetrical phase shift modulation with leg A leading leg B by an angle $\varphi_{AB}$, the switches of the secondary H-bridge are operated with symmetrical phase shift modulation with leg D leading leg E by an angle $\varphi_{DE}$, an angle between leg A and leg D is angle $\varphi_{AD}$, and the output voltage of the secondary H-bridge is maintained at a constant voltage by controlling angle $\varphi_{AB}$, angle $\varphi_{DE}$, and angle $\varphi_{AD}$.

In other embodiments, a relationship between angle $\varphi_{AB}$, angle $\varphi_{DE}$, and angle $\varphi_{AD}$ is:

$$\varphi_{AD} = \frac{\varphi_{AB}}{2} + \frac{\pi}{2} - \frac{\varphi_{DE}}{2}.$$

In other embodiments, angle $\varphi_{DE}$ is 180 degrees and a relationship between angle $\varphi_{AB}$ and angle $\varphi_{AD}$ is:

$$\varphi_{AD} = \frac{\varphi_{AB}}{2}.$$

In other embodiments, angle $\varphi_{AB}$ is controlled as a function of the output voltage of the secondary H-bridge and angle $\varphi_{AD}$ is controlled to be half the angle $\varphi_{AB}$, or angle $\varphi_{AD}$ is controlled as a function of the output voltage of the secondary H-bridge and angle $\varphi_{AB}$ is controlled to be twice the angle $\varphi_{AD}$.

In some embodiments, power flow is bidirectional. In other embodiments, the switches of the primary H-bridge are arranged in a leg A and a leg B, the switches of the secondary H-bridge are arranged in a leg D and a leg E and the switches of the primary H-bridge are operated with symmetrical phase shift modulation with leg A leading leg B by an angle $\varphi_{AB}$, the switches of the secondary H-bridge are operated with symmetrical phase shift modulation with leg D leading leg E by an angle $\varphi_{DE}$, an angle between leg A and leg D is angle $\varphi_{AD}$, and a power flow direction from the primary H-bridge to the secondary H-bridge is dependent on a phase angle $\varphi_{PS}$, which is:

$$\varphi_{PS} = \varphi_{AD} - \frac{\varphi_{AB}}{2} + \frac{\varphi_{DE}}{2}.$$

In other embodiments, $\varphi_{PS}$ is within the range $[0, \pi]$ for forward power flow where input current $I_1$ to the primary H-bridge and output current $I_2$ from the secondary H-bridge are positive, and $\varphi_{PS}$ is within the range $[-\pi, 0]$ for reverse power flow where $I_1$ and $I_2$ are both negative. In other embodiments, angle $\varphi_{DE}$ is 180 degrees and a relationship between angle $\varphi_{AB}$ and angle $\varphi_{AD}$ is $$\varphi_{AD} = \frac{\varphi_{AB}}{2}$$

for forward power flow, and $$\varphi_{AD} = \frac{\varphi_{AB}}{2} - 180°$$

for reverse power flow.

In other embodiments, for forward power flow, angle $\varphi_{AB}$ is either set to a fixed value or controlled as a function of the output voltage of the secondary H-bridge and angle $\varphi_{AD}$ is controlled to be half the angle $\varphi_{AB}$, for reverse power flow, angle $\varphi_{AB}$ is either set to a fixed value or controlled as a function of the input current to the primary H-bridge and angle $\varphi_{AD}$ is controlled to be $$\varphi_{AD} = \frac{\varphi_{AB}}{2} - 180°.$$

For forward power flow, angle $\varphi_{AD}$ is either set to a fixed value or controlled as a function of the output voltage of the secondary H-bridge and angle $\varphi_{AB}$ is either set to a fixed value or controlled to be twice the angle $\varphi_{AD}$, or for reverse power flow, angle $\varphi_{AD}$ is controlled as a function of the input current to the primary H-bridge and angle $\varphi_{AB}$ is controlled to be $\varphi_{AB} = 2 (\varphi_{AD} + 180°)$.

In some embodiments, a turns ratio n of the transformer is set at an optimal turns ratio $n_{opt}$:

$$n_{opt} = \frac{P_{load\_max} \sin\left(\frac{\varphi_{AB}}{2}\right)}{V_2 I_g},$$

where the switches of the primary H-bridge are operated with symmetrical phase shift modulation with leg A leading leg B by an angle $\varphi_{AB}$, $P_{load\_max}$ is a maximum load condition, $I_g$ is a DC constant source current, and $V_2$ is a constant output voltage of the secondary H-bridge. In other embodiments, the power converter includes an input capacitor $C_{in}$ connected across input terminals of the primary H-bridge.

Another embodiment of a power converter includes a primary H-bridge with four semi-conductor switches where two of the switches are in leg A with terminal A between the switches in leg A and two of the switches are in leg B with terminal B between the switches in leg B. Terminal A and terminal B form an output of the primary H-bridge. The power converter includes an LCL-T section that includes a first inductor $L_r$ with a first end connected to terminal A, a capacitor $C_r$ connected between a second end of the first inductor $L_r$ and terminal B, and a second inductor $L_g$ with a first end connected to the second end of the first inductor $L_r$. The power converter includes a transformer with a primary side connected between a second end of the second inductor $L_g$ and terminal B where the transformer has a turns ratio n. The power converter includes a secondary H-bridge that includes semi-conductor switches with an input connected to a secondary side of the transformer where two of the switches are in leg D with terminal D between the two switches of leg D and two of the switches are in leg E with terminal E between the two switches of leg E. Terminal D and terminal E form an output of the secondary H-bridge. The power converter includes an output capacitor $C_f$ connected across terminal D and terminal E. The primary H-bridge is fed by a DC constant current source and terminals D and E are connected to a load and an output voltage across terminals D and E is regulated to maintain a constant DC output voltage.

In some embodiments, a switching frequency of the switches of the primary H-bridge and the secondary H-bridge is selected to be within 15 percent of a resonant frequency of the LCL-T section and a ratio g of the first inductor $L_r$ and the second inductor $L_g$ is within a range of 0.2 to 5 (g=0.2 to 5). In other embodiments, the switches of the primary H-bridge are arranged in a leg A and a leg B and the switches of the secondary H-bridge are arranged in a leg D and a leg E. The switches of the primary H-bridge are operated with symmetrical phase shift modulation with leg A leading leg B by an angle $\varphi_{AB}$, the switches of the secondary H-bridge are operated with symmetrical phase shift modulation with leg D leading leg E by an angle $\varphi_{DE}$, an angle between leg A and leg D is angle $\varphi_{AD}$, and the output voltage of the secondary H-bridge is maintained at a constant voltage by controlling angle $\varphi_{AB}$, angle $\varphi_{DE}$, and angle $\varphi_{AD}$ where a relationship between angle $\varphi_{AB}$, angle $\varphi_{DE}$, and angle $\varphi_{AD}$ is:

$$\varphi_{AD} = \frac{\varphi_{AB}}{2} + \frac{\pi}{2} - \frac{\varphi_{DE}}{2}.$$

In other embodiments, angle $\varphi_{DE}$ is 180 degrees and a relationship between angle $\varphi_{AB}$ and angle $\varphi_{AD}$ is $$\varphi_{AD} = \frac{\varphi_{AB}}{2},$$

and angle $\varphi_{AB}$ is controlled as a function of the output voltage of the secondary H-bridge and angle $\varphi_{AD}$ is controlled to be half the angle $\varphi_{AB}$ or angle $\varphi_{AD}$ is controlled as a function of the output voltage of the secondary H-bridge and angle $\varphi_{AB}$ is controlled to be twice the angle $\varphi_{AD}$.

In some embodiments, power flow is bidirectional and the switches of the primary H-bridge are arranged in a leg A and a leg B, the switches of the secondary H-bridge are arranged in a leg D and a leg E and the switches of the primary H-bridge are operated with symmetrical phase shift modulation with leg A leading leg B by an angle $\varphi_{AB}$, the switches of the secondary H-bridge are operated with symmetrical phase shift modulation with leg D leading leg E by an angle $\varphi_{DE}$, an angle between leg A and leg D is angle $\varphi_{AD}$, and a power flow direction from the primary H-bridge to the secondary H-bridge is dependent on a phase angle $\varphi_{PS}$, which is:

$$\varphi_{PS} = \varphi_{AD} - \frac{\varphi_{AB}}{2} + \frac{\varphi_{DE}}{2}.$$

Another bidirectional power converter includes a primary H-bridge that includes four semi-conductor switches where two of the switches are in leg A with terminal A between the switches in leg A and two of the switches are in leg B with terminal B between the switches in leg B. Terminal A and terminal B form an output of the primary H-bridge. The bidirectional power converter includes an LCL-T section that includes a first inductor $L_r$ with a first end connected to terminal A, a capacitor $C_r$ connected between a second end of the first inductor $L_r$ and terminal B, and a second inductor $L_g$ with a first end connected to the second end of the first inductor $L_r$. The bidirectional power converter includes a transformer with a primary side connected between a second end of the second inductor $L_g$ and terminal B. The transformer has a turns ratio n. The bidirectional power converter includes a secondary H-bridge that includes semi-conductor switches with an input connected to a secondary side of the transformer where two of the switches are in leg D with terminal D between the two switches of leg D and two of the switches are in leg E with terminal E between the two switches of leg E. Terminal D and terminal E form an output of the secondary H-bridge.

The bidirectional power converter includes an output capacitor $C_f$ connected across terminal D and terminal E. The primary H-bridge is fed by a DC constant current source and terminals D and E are connected to a load and an output voltage across terminals D and E is regulated to maintain a constant DC output voltage. The switches of the primary H-bridge are arranged in a leg A and a leg B and the switches of the secondary H-bridge are arranged in a leg D and a leg E where the switches of the primary H-bridge are operated with symmetrical phase shift modulation with leg A leading leg B by an angle $\varphi_{AB}$, the switches of the secondary H-bridge are operated with symmetrical phase shift modulation with leg D leading leg E by an angle $\varphi_{DE}$, an angle between leg A and leg D is angle $\varphi_{AD}$, and a power flow direction from the primary H-bridge to the secondary H-bridge is dependent on a phase angle $\varphi_{PS}$, which is:

$$\varphi_{PS} = \varphi_{AD} - \frac{\varphi_{AB}}{2} + \frac{\varphi_{DE}}{2}.$$

As presented herein, an LCL-T resonant network based DC-DC converter is analyzed and is shown that with suitable design, this converter can produce a load independent, constant output voltage characteristic when powered from a constant DC current source input.

I. Steady State Modeling and Analysis

FIG. 2 is a schematic block diagram illustrating one embodiment of an LCL-T resonant DC-DC converter topology and primary side modulation. FIG. 2(a) shows an LCL-T resonant tank based topology that converts constant DC input current to constant DC output voltage. MOSFETs $Q_1$-$Q_4$ form the primary side inverter that operates with symmetrical phase shift modulation with leg A leading leg B by an angle $\varphi_{AB}$, as shown in FIG. 2(b). This inverter translates the DC bus voltage $V_{in}$ to a quasi-square wave vas and drives the LCL-T resonant tank network formed by inductors $L_r$, $L_g$ and capacitor $C_r$. The resonant tank is followed by an n:1 isolation transformer, and the output of which is rectified by a secondary side diode bridge rectifier that includes of diodes $D_1$-$D_4$. The final DC output is filtered through filter capacitor $C_f$ before going to the load, which is represented as a resistor $R_{load}$. For the analysis to follow, it is assumed that all the components are ideal and lossless.

With fundamental harmonics approximation ("FHA"), the converter shown in FIG. 2(a) can be drawn as the equivalent circuit shown in FIG. 3(a), where:

$$I_g = \langle i_{in} \rangle = \frac{2I_t}{\pi} \sin\left(\frac{\varphi_{AB}}{2}\right) \cos(\varphi_{in}) \qquad (1)$$

$$v_{AB,1} = \frac{4}{\pi} V_{in} \sin\left(\frac{\varphi_{AB}}{2}\right) \cos(\omega_s t) \qquad (2)$$

$$I_{load} = \langle i_o \rangle = \frac{2}{\pi} I'_R \qquad (3)$$

and the AC equivalent load resistance is given by:

$$R'_e = \frac{8}{\pi^2} R_{load}, R_e = \frac{n^2 8}{\pi^2} R_{load}. \qquad (4)$$

In equations (1)-(4), $\omega_s$ is the angular switching frequency, and for nomenclature definition, the average value of signal x is represented by <x>, the amplitude of the AC side signal xy is represented by $X_y$ and the signal or parameter x reflected to the secondary side of the transformer are expressed with a prime (x'). In equation (1), $\varphi_{in}$ is the angle between fundamental component of primary side inverter output voltage and current which is given as:

$$\varphi_{in} = \angle Z_{in}, \qquad (5)$$

where $Z_{in}$ is input impedance of the loaded resonant tank, seen from the primary inverter side, as depicted in FIG. 3(b). FIG. 3(b) shows the simplified AC equivalent circuit of the converter, reflected to the primary side of the transformer.

From the circuit in FIG. 3(b), the output to input voltage transfer function can be derived as:

$$\frac{v_{o,1}(s)}{v_{AB,1}(s)} = \frac{1}{1 + (1+g)\frac{s}{Q\omega_o} + \frac{s^2}{\omega_o^2} + g\frac{s^3}{Q\omega_o^3}}, \quad (6)$$

with the parameters are defined as:

$$\omega_o = \frac{1}{\sqrt{L_r C_r}}, Z_o = \sqrt{\frac{L_r}{C_r}}, g = \frac{L_g}{L_r}, Q = \frac{R_e}{Z_o}, F = \frac{f_s}{f_o}, \quad (7)$$

where, $Z_o$ is the characteristic impedance of the resonant tank, Q is the quality factor of the loaded tank, $f_s$ is the switching frequency of operation, $f_o$ is the resonant frequency of $L_r$ and $C_r$, and $\omega_o$, is the angular resonant frequency.

The amplitude of the AC voltages in FIG. 3(b) are given in terms of DC input and output voltage as:

$$|v_{AB,1}| = \frac{4}{\pi}V_{in}\sin\left(\frac{\varphi_{AB}}{2}\right), |v_{o,1}| = \frac{4n}{\pi}V_{out}. \quad (8)$$

For systems with constant DC voltage source, the DC output voltage can be found using equation (6) and equation (8), evaluating the magnitude from equation (6) with $s=j\omega_s$ and is given as:

$$V_{out}|_{DC\_V_{in}} = \frac{V_{in}}{n}\frac{Q\sin\left(\frac{\varphi_{AB}}{2}\right)}{\sqrt{Q^2(1-F^2)^2 + [(1+g)F - gF^3]^2}}. \quad (9)$$

However, for systems with DC current source, $V_{in}$ is dependent on load and expression of $V_{out}$ from equation (9) cannot be used as it is. The output voltage for such system is derived from the equivalent circuits shown in FIG. 3.

The AC active power drawn from the inverter, which equals the DC input and output power of the lossless converter, are given as:

$$P_{AC} = \frac{V_{AB,1,rms}^2}{|Z_{in}|}\cos(\varphi_{in}), P_{in} = V_{in}I_g, P_{out} = \frac{V_{out}^2}{R_{load}}, \quad (10)$$

where, $V_{AB,1,rms}$ is the rms value of the fundamental component of inverter output voltage $v_{AB,1}$, as given in equation (2). With lossless power conversion, from equation (10), the input voltage can be expressed as:

$$V_{in} = \frac{V_{out}^2}{I_g R_{load}}. \quad (11)$$

Equating the DC output power to the AC active power in equation (10) and using expressions from equations (1), (2) and (11), the DC output voltage can be derived as:

$$V_{out} = \frac{\pi^2}{8n}\frac{Z_o I_g}{\sin\left(\frac{\varphi_{AB}}{2}\right)}\sqrt{\frac{Q}{\cos(\varphi_{in})}\frac{|Z_{in}|}{Z_o}}, \quad (12)$$

and the input impedance, whose derivation is provided in the Appendix, is given by:

$$Z_{in} = \frac{Z_o}{\left[(1-gF^2)^2 + F^2 Q^2\right]}[Z_R + jZ_I], \quad (13)$$

where, expression for $Z_R$ and $Z_I$ are presented in the Appendix.

The analysis presented in this section establishes the steady state relations between DC input and output for an LCL-T resonant converter, with its dependence on tank parameters and operating point, which is used in next section for design of the converter.

II. Design of LCL-T Resonant Converter

The DC output voltage of the converter, derived in equation (12), is dependent on the resonant tank parameters, load, operating frequency etc. In this section, it will be shown how the converter is designed, with proper choice of operating point, to achieve load independent output voltage from constant current input. With further analysis, a design method to optimize tank components and transformer turns ratio, is also presented in this section.

A. Operating Point Selection

From the expression of DC output voltage in equation (12), it can be normalized to be expressed as:

$$V_{out\_norm} = \sqrt{\frac{Q}{\cos(\varphi_{in})}|z_{in\_norm}|}, \quad (14)$$

which is normalized with a base voltage defined as:

$$V_{base} = \frac{\pi^2}{8n}\frac{Z_o I_g}{\sin\left(\frac{\varphi_{AB}}{2}\right)}, \quad (15)$$

and the normalized $Z_{in}$ is defined as:

$$Z_{in\_norm} = \frac{Z_{in}}{Z_o}. \quad (16)$$

The normalized DC output voltage ($V_{out\_norm}$) from equation (14) is plotted against normalized switching frequency (F) in FIG. 4(a) for various loads (Q), with g=1. It can be seen that $V_{out\_norm}$ becomes independent of Q if the switching frequency of operation is selected to be equal to the resonant frequency, i.e. with F=1. Under this operating condition, the expression of output voltage from equation (12) is now given as:

$$V_{out}|_{F=1} = \frac{\pi^2}{8n} \frac{Z_o I_g}{\sin\left(\frac{\varphi_{AB}}{2}\right)}. \quad (17)$$

From equation (17), it can be seen that with F=1, $V_{out}$ is also independent of g ($L_g$), which is shown by $V_{out\_norm}$ versus F plot in FIG. 4(b), for various Q, with an arbitrarily chosen value of g=0.3. A special case of g=0 makes it a parallel resonant converter, achieving load independent output voltage from a constant current source input. Where the switching frequency is at or near the resonant frequency of the tank, the output voltage is independent of g for a fairly wide range. In some embodiments, g is chosen to be within a range of 0.2 to 5. In other embodiments, g is chosen to be within a tighter range of 0.8 to 1.2. In other embodiments, g is chosen to be one (g=1).

Figure 4:
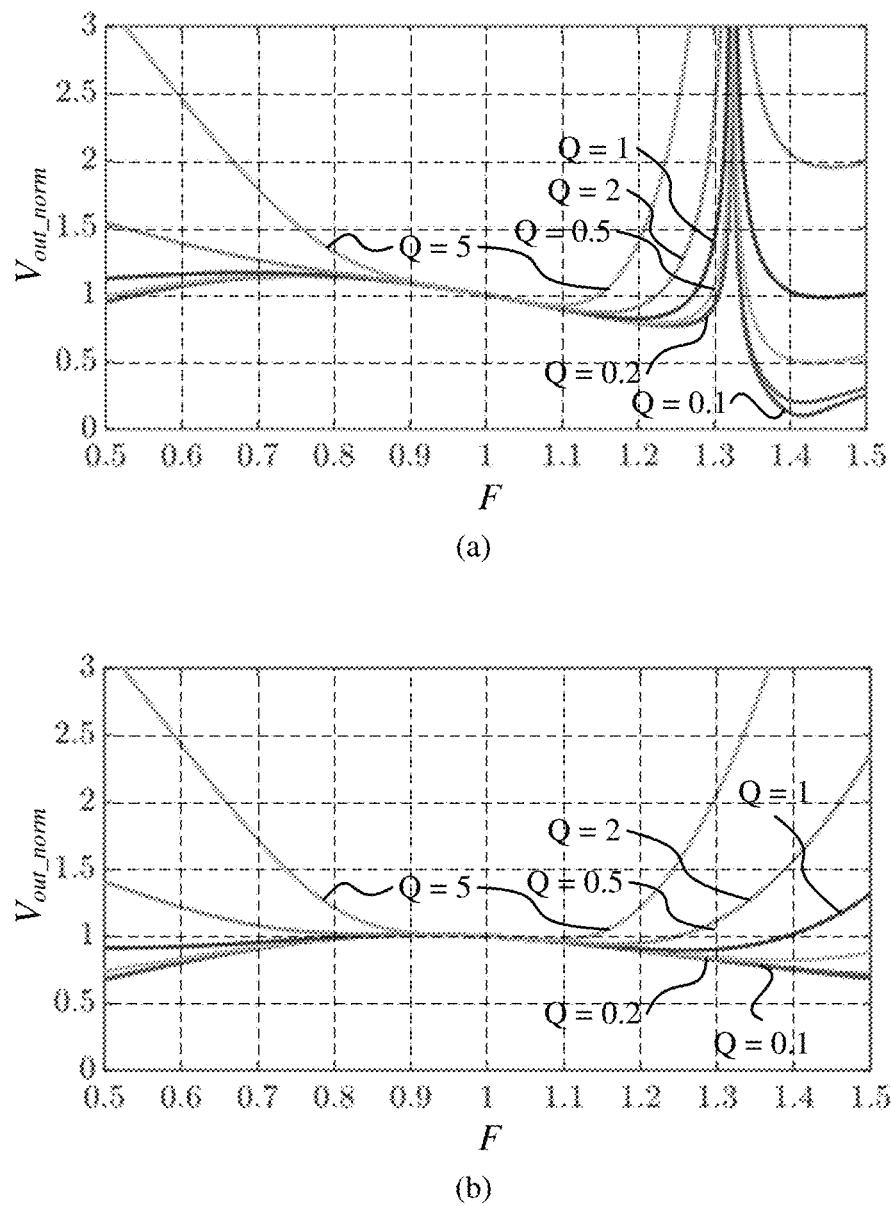
FIG. 4 is a diagram illustrating a steady state normalized DC output voltage ($V_{out\_norm}$) versus a normalized switching frequency (F), for different load (Q), (a) with g=1 and (b) with g=0.3.

From the plots in FIG. 4, it can be observed that the output voltage is almost load independent within ±10% of F=1. So, it is possible to operate the converter with a small variation in F around 1, in addition to phase shift control. In some examples, the switching frequency is chosen to be within a range of 15% of the resonant frequency of the LCL tank. In other embodiments, the switching frequency is chosen to be within a range of 10 percent of the resonant frequency. In other embodiments, the switching frequency is chosen to be at the resonant frequency. However, part variations may result in the switching frequency being a little different than the resonant frequency. However, with a small variation limit in F, the transient response can get limited, depending on the magnitude of load transient, due to low margin from steady state operating point to controller output limit. Moreover, since the converters are part of a system of converters with common source, if they are controlled though F variation then different converters will operate at different switching frequencies, depending on their individual loads, which will introduce low frequency (difference in frequency among converters) ripple component injected to the source which is challenging for filter design. Hence all the converters are designed to operate at fixed frequency and controlled through phase shift modulation.

With F=1, the tank input impedance ($Z_{in}$) from equation (13) can be derived as:

$$Z_{in}|_{F=1} = \frac{Z_o}{\sqrt{Q^2 + (1-g)^2}} \angle \tan^{-1}\left(\frac{1-g}{Q}\right). \quad (18)$$

From this expression of $Z_{in}$, if g<1, $\varphi_{in}$ is positive and thus $Z_{in}$ becomes inductive, which can help achieving ZVS for the primary side inverter switches. However, a non-zero $\varphi_{in}$ puts a restriction on minimum power operation of the converter for which its output can be regulated. Hence, g is selected to be equal to unity and with g=1, $Z_{in}$ becomes resistive, making the primary side inverter operate at unity power factor ("UPF"), considering FHA. With F=1 and g=1, $Z_{in}$ from equation (18) can be given as:

$$Z_{in}|_{F=1, g=1} = \frac{Z_o^2}{R_e} \angle 0°. \quad (19)$$

B. Derivation of Tank Signals

With the selected operating point of F=1 and g=1, the tank AC circuit in FIG. 3(b) can be simplified and redrawn as shown in FIG. 5(a). This circuit is solved analytically to derive the AC signal of the tank. The solutions are provided in this section. The phasor diagram of the AC quantities from FIG. 5(a) is drawn in FIG. 5(b), considering the fundamental component of $v_{AB}$ as reference.

From the equivalent circuit in FIG. 3(a), the current ($i_t$) in the inductor $L_r$ can be found by balancing the DC input current and rectified average current at the primary side inverter. Since the inverter is operating at UPF, $i_t$ can be expressed as:

$$i_t(t) = \frac{\pi}{2} \frac{I_g}{\sin\left(\frac{\varphi_{AB}}{2}\right)} \cos(\omega_s t). \quad (20)$$

The resonant tank AC output voltage $v_{o,1}$ can be found from the fundamental component of AC input voltage to the secondary side diode bridge rectifier, reflected to the transformer primary side, and is given by:

$$v_{o,1}(t) = \frac{4n}{\pi} V_{out} \cos\left(\omega_s t - \frac{\pi}{2}\right). \quad (21)$$

Similarly, the current ($i_R$) in the load side inductor $L_g$, connected to the secondary side diode bridge rectifier, can be given by:

$$i_R(t) = \frac{\pi}{2n} I_{load} \cos\left(\omega_s t - \frac{\pi}{2}\right). \quad (22)$$

The voltage across and current through the resonant capacitor are given by:

$$v_{Cr}(t) = \frac{4n}{\pi} V_{out} \sqrt{1 + \frac{1}{Q^2}} \cos(\omega_s t - \tan^{-1} Q), \quad (23)$$

$$i_{Cr}(t) = \frac{4n}{\pi} \frac{V_{out}}{Z_o} \sqrt{1 + \frac{1}{Q^2}} \cos\left[\omega_s t + \tan^{-1}\left(\frac{1}{Q}\right)\right]. \quad (24)$$

The detailed derivations of the tank signals can be found in the Appendix.

C. RMS Values and VA of Tank Components

From equations (20)-(24) the rms values of tank signals can be found out as:

$$I_{t,rms} = \frac{\pi}{2\sqrt{2}} \frac{I_g}{\sin\left(\frac{\varphi_{AB}}{2}\right)}, \quad (25)$$

$$I_{R,rms} = \frac{\pi}{2\sqrt{2}\, n} I_{load}, \quad (26)$$

$$V_{Cr,rms} = \frac{2\sqrt{2}\, n}{\pi} V_{out} \sqrt{1 + \frac{1}{Q^2}}, \quad (27)$$

$$I_{Cr,rms} = \frac{2\sqrt{2}\, n}{\pi} \frac{V_{out}}{Z_o} \sqrt{1 + \frac{1}{Q^2}}. \quad (28)$$

From equations (25)-(28), it can be observed that for a given operating condition ($I_g$, $V_{out}$, $\varphi_{AB}$), the rms current of the source side resonant inductor ($L_r$) is constant and independent of load whereas, rms current in load side resonant inductor ($L_g$) is directly proportional to load ($I_{load}$). Root-mean-square ("RMS") voltage and current of the resonant capacitor is also dependent on the load (Q).

From these rms current(s), referring to the circuit in FIG. 5(a), the volt-ampere ("VA") for the resonant tank components can be determined. The VA for $L_r$ can be evaluated as:

$$VA_{Lr} = I_{t,rms}^2 Z_0 = QP_{out}, \tag{29}$$

and the VA for $L_g$ is evaluated to be:

$$VA_{Lg} = I_{R,rms}^2 Z_o = \frac{P_{out}}{Q}. \tag{30}$$

Details of equations (29) and (30) are provided in the Appendix. The VA of the resonant capacitor can be found using equation (28) and is expressed as:

$$VA_{Cr} I_{Cr,\,rms}^2 Z_o. \tag{31}$$

Now, from the phasor diagram of FIG. 5(b) it can be seen that i t and i R in quadrature and $i_{Cr}$ is the phasor subtraction of $i_t$ and $i_R$. Hence, equation (28) can also be expressed as:

$$I_{Cr,rms} = \sqrt{I_{t,rms}^2 + I_{R,rms}^2}, \tag{56}$$

and using equation (32), equation (31) can be written as:

$$VA_{Cr} = (I_{t,rms}^2 + I_{R,rms}^2) Z_o = \left(Q + \frac{1}{Q}\right) P_{out}. \tag{33}$$

It can be seen from equations (29), (30) and (33) that the VA of the tank capacitor is the sum of VA of the tank inductors. The total VA of the tank is calculated by summing up equations (29), (30) and (33) and is given by:

$$VA_{tank} = 2\left(Q + \frac{1}{Q}\right) P_{out}. \tag{34}$$

D. Design of Resonant Tank

To find the VA rating of the resonant tank, equation (34) can be evaluated at maximum output power ($P_{out\_max}$). The normalized VA rating ($VA_{tank\_norm}$), with respect to $P_{out\_max}$ can be given from equation (34) as:

$$VA_{tank\_norm} = 2\left(Q_{Pout\_max} + \frac{1}{Q_{Pout\_max}}\right), \tag{35}$$

where, $Q_{Pout\_max}$ is the quality factor at maximum output power. It can be seen that the minimum value of $VA_{tank\_norm}$ from equation (35) is attained at:

$$Q_{Pout\_max} = \frac{1}{Q_{Pout\_max}} = 1, \tag{36}$$

and the minimum value of total tank VA rating is found out using equations (34) and (36) and it is given as:

$$VA_{tank\_min} = 4 P_{out\_max}. \tag{37}$$

In order to design the tank elements, we need to start at equation (17) where $V_{out}$ and $I_g$ are known, but, n, $Z_o$ and $\varphi_{AB}$ are to be decided on. From the expression of Q in equation (7) and $P_{out}$ from equation (10), the characteristic impedance of the tank can be written as:

$$Z_o = \frac{8n^2}{\pi^2} \frac{V_{out}^2}{P_{out} Q}, \tag{38}$$

and substituting $Z_o$ from equation (38) into equation (17), the transformer turns ratio can be expressed as:

$$n = \frac{P_{out} Q \sin\left(\frac{\varphi_{AB}}{2}\right)}{I_g V_{out}}. \tag{39}$$

In order to achieve minimum VA rating for the tank, the optimum value of transformer turns ratio ($n_{min\_VA}$) can be found by substituting $Q = Q_{Pout\_max} = 1$ from equation (36) into equation (39), and is given by:

$$n_{min\_VA} = \frac{P_{out\_max} \sin\left(\frac{\varphi_{AB}}{2}\right)}{I_g V_{out}}. \tag{40}$$

The value of $\varphi_{AB}$ is selected to be 120 degrees ("°") which produces least harmonic content at the output of the inverter with no triplen harmonics. This also provides sufficient margin from the maximum possible control angle of 180° to support transient response. After determining the transformer turns ratio from equation (40), $Z_o$ is evaluated from equation (38) as:

$$Z_o = \frac{8 n_{min\_VA}^2}{\pi^2} \frac{V_{out}^2}{P_{out\_max}}, \tag{41}$$

and from equation (7), the tank element values can be calculated as:

$$L_r = \frac{Z_o}{2\pi f_o} = \frac{Z_o}{2\pi f_s}, \tag{42}$$

$$C_r = \frac{1}{2\pi f_o Z_o} = \frac{1}{2\pi f_s Z_o}, \tag{43}$$

$$L_g = L_r = \frac{Z_o}{2\pi f_s}. \tag{44}$$

The ratings of the resonant tank elements are given in equations (25)-(28). With these design equations, the resonant tank and transformer turns ratio can be uniquely designed with minimum VA rating. However, designing the tank with minimum VA rating can result in discontinuous current in the secondary diodes, which can possibly limit the range of load for which converter output voltage can be regulated. This can be overcome by replacing diode bridge with an active bridge on the secondary side of the converter, which is presented in the next sections with simulation and experimental results.

III. Dual Active Bridge LCL-T Resonant Converter

Figure 6:
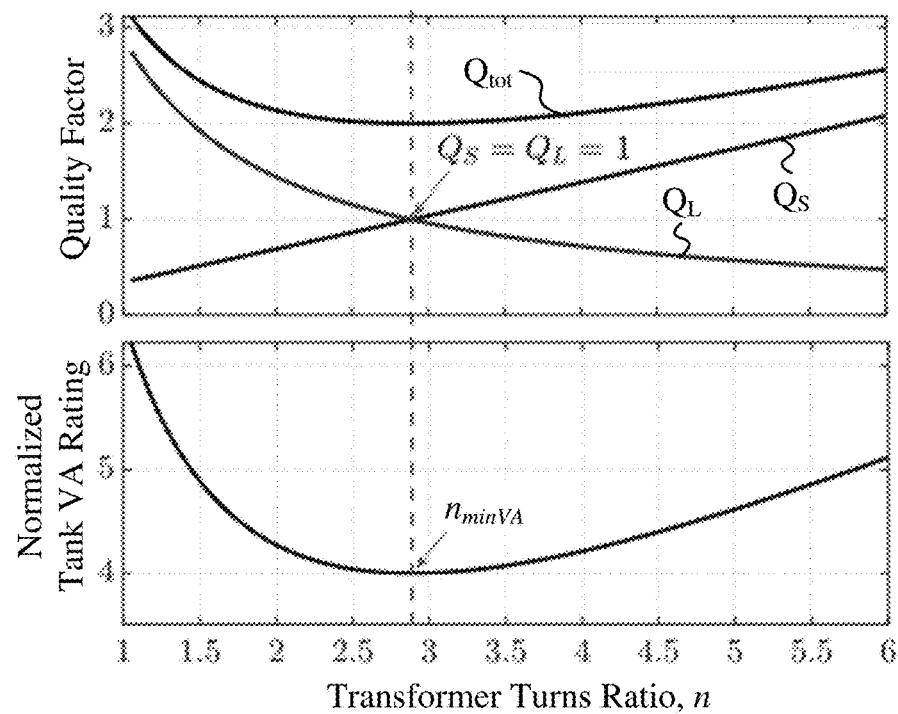
FIG. 6 is a diagram illustrating quality factor of the tank elements (top) and normalized VA rating of the tank (bottom) with respect to transformer turns ratio.

With the design method from Section II-D, the converter is designed for a system with 1 A input and 150 V output with a load range of 50 W to 500 W. The designed parameters are listed in TABLE I. The plot of quality factor and normalized tank VA rating for various transformer turns ratio is presented in FIG. 6, where it can be seen that the tank VA is minimum at n=$n_{min\_VA}$ as per equation (40). In FIG. 6, the quantities $Q_S$, $Q_L$ and $Q_{tot}$ are defined as follows:

$$Q_s = Q, \ Q_L = \frac{1}{Q}, \ Q_{tot} = Q_s + Q_L. \tag{45}$$

Details of equation (45) can be found in the Appendix.

TABLE I

Resonant Tank Parameters

| $L_r$ (μH) | $C_r$ (pF) | $L_g$ (μH) | n |
|---|---|---|---|
| 194.4 | 208.5 | 194.4 | 2.9 |

A. Limitation with Diode-bridge Rectifier

Figure 7:
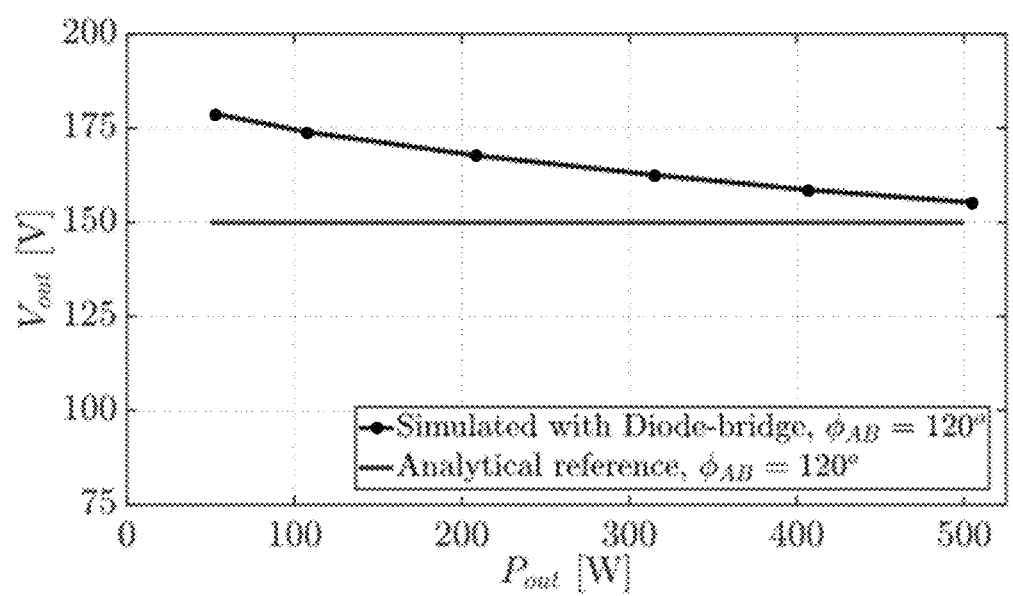
FIG. 7 is a diagram of steady state DC output voltage ($V_{out}$) of the secondary H-bridge versus load power ($P_{out}$) for a result from analysis and a simulation result with diode-bridge.

With the tank parameters listed in TABLE I, the converter of FIG. 2(a) is simulated in MATLAB®/Piecewise Linear Electrical Circuit Simulation ("PLECS"®) and the steady state DC output voltage over the load range is plotted in FIG. 7.

It can be seen from the top plot in FIG. 7 that the output voltage with secondary side diode bridge rectifier does not stay constant, independent of load and increases in value as the load reduces. Since the tank is designed for minimum VA, the diodes operate in discontinuous conduction mode ("DCM") due to low quality factor. This increase in $V_{out}$ at light load will results in the control angle ($\varphi_{AB}$) going towards its limit of 180°, to keep the output voltage at its desired value. This can potentially hinder the load range of operation for which the converter can regulate its output. In order to keep the diodes in continuous conduction mode ("CCM") over a load range, the tank components have to be designed with higher VA rating which will increase the size of the converter. Alternately, the converter can be designed with lower nominal value of $\varphi_{AB}$, considering the load range and margin for component tolerances, but this will lead to higher component stress (see equations 25-28) and losses.

B. Secondary Side Active Rectification

To operate the converter with wide range load regulation, it is desirable to keep the secondary bridge in CCM. This is achieved by employing an active bridge on the secondary side, as shown in FIG. 8(a). The modulation scheme for both primary and secondary bridges is depicted in FIG. 8(b), where $\varphi_{DE}$ is the control angle between leg D and leg E of secondary bridge, and $\varphi_{AD}$ is the angle between leg A and leg D.

With a secondary active bridge, the current in $L_g$ and in the transformer secondary will be in CCM. To operate the secondary bridge at unity power factor (with FHA) and emulate the behavior of diode rectifier, the secondary bridge modulation angle $\varphi_{DE}$ should be equal to 180°. From the phasor diagram shown in FIG. 5(b), the relationship among the three modulation angles [$\varphi_{AB}$, $\varphi_{AD}$, $\varphi_{DE}$] can be given as:

$$\varphi_{AD} = \frac{\varphi_{AB}}{2} + \frac{\pi}{2} - \frac{\varphi_{DE}}{2}, \tag{46}$$

and with $\varphi_{DE}$=180° (e.g. π radians), equation (46) becomes:

$$\varphi_{AD} = \frac{\varphi_{AB}}{2}. \tag{47}$$

Figure 9:
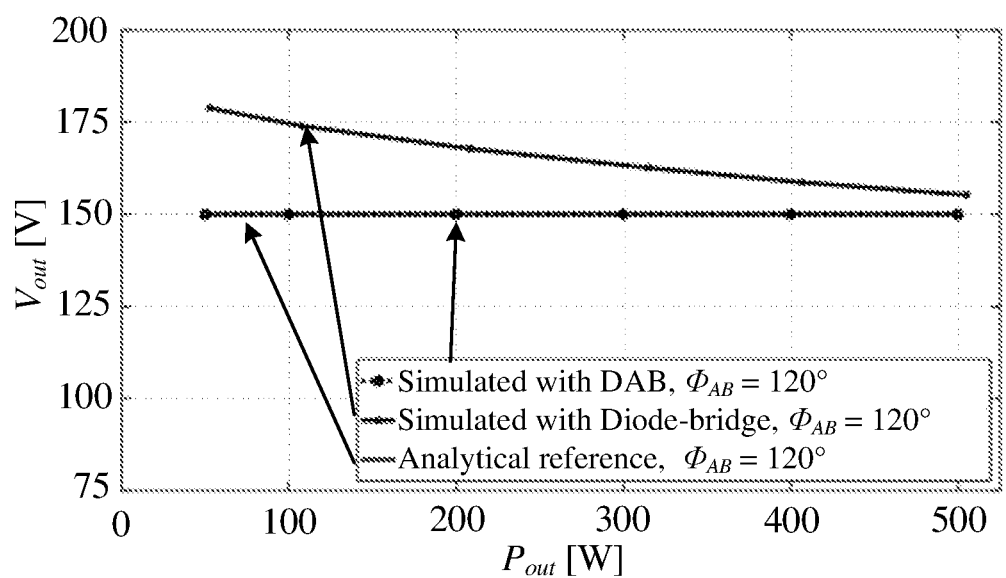
FIG. 9 is a diagram illustrating steady state DC output voltage ($V_{out}$) of the secondary H-bridge versus load power ($P_{out}$) for analysis results, simulation results with a diode-bridge, and simulation results with a DAB.

The dual active bridge ("DAB") LCL-T converter is also simulated in MATLAB/PLECS and the steady state DC output voltage at various load is plotted in FIG. 9, with the tank parameters presented in TABLE I. This is also compared with the result achieved with a diode-bridge on the secondary H-bridge. From the dotted plot in FIG. 9, it can be seen that the steady state DC output voltage remains constant, independent of load, as derived in equation (17), matching the analytical reference plot.

In some embodiments, $\varphi_{AB}$, ($\varphi_{AD}$, and $\varphi_{DE}$ are set to fixed values due to the load independence of the DAB LCL-T converter. In some embodiments, a control loop is used to maintain the output voltage $V_{out}$ at a reference value. The control loop may be used to control any of $\varphi_{AB}$, $\varphi_{AD}$, or $\varphi_{DE}$. In some embodiments, $\varphi_{DE}$ is set to 180°. The control loop compares the output voltage $V_{out}$ with a reference signal, which is fed into a compensator. The output of the compensator is used to either control $\varphi_{AB}$ or $\varphi_{AD}$ (when $\varphi_{DE}$ is set to 180°), which is then used to control modulation of the switches $Q_1$-$Q_8$. Where $\varphi_{AB}$ is controlled, then equation (47) is used to set $\varphi_{AD}$. Where $\varphi_{AD}$ is controlled, then $\varphi_{AB}$ is twice $\varphi_{AD}$.

IV. Experimental Verification

A prototype hardware of the LCL-T converter of FIGS. 2(a) and 8(a) has been built to verify the analysis presented so far with the tank parameters mentioned in TABLE I and additional details presented in TABLE II. The converter is designed to operate at 250 kHz switching frequency, which is the operating frequency of all the series connected converters used in this underwater DC current distribution network. The prototype is designed for operation up to 500 W with 150 V DC output voltage and it is tested over 10:1 load range for experimental verification. With operation at F=1 and g=1, both the primary and secondary inverter(s) (e.g. H-bridges) operate with their fundamental voltage and current in phase which means that all the switches $Q_1$-$Q_8$ in the converter will not have ZVS by the tank current. On the primary side inverter, leg B MOSFETs go through ZVS by tank current and an active ZVS assisting circuit is used for leg A. Since the secondary side bridge operates at unity power factor with fixed DC output voltage, a fixed, passive inductor ($L_{zvs\_sec}$) is used for ZVS of secondary side MOSFETs. DC blocking capacitors ($C_{DC\_pri}$ and $C_{DC\_sec}$) are used in both primary and secondary side H-bridges to block any DC component of voltage arriving out of the H-bridges due to any component mismatch. The value(s) of the DC blocking capacitor(s) is chosen significantly higher than the resonant capacitor such that it does not impact the overall capacitor seen from the resonant inductor terminals and thus does not influence the resonant frequency of the tank.

TABLE II

Converter Details

| Component/Parameter | Value |
|---|---|
| $I_g$ (A) | 1 |
| $V_{out}$ (V) | 150 |

TABLE II-continued

Converter Details

| Component/Parameter | Value |
|---|---|
| $f_s$ (kHz) | 250 |
| $P_{out}$ (W) | 50-500 |
| Primary MOSFETs | C2M1000170D |
| $C_{DC\,pri}$ (μF) | 0.23 |
| $L_{zvs\,pri}$ (μH) | 50 |
| Secondary Diode(s) | FFSH2065B-F085 |
| Secondary MOSFETs | IXFQ72N20X3 |
| $C_{DC\,sec}$ (μF) | 6.4 |
| $L_{zvs\,sec}$ (μH) | 60 |

Figure 12:
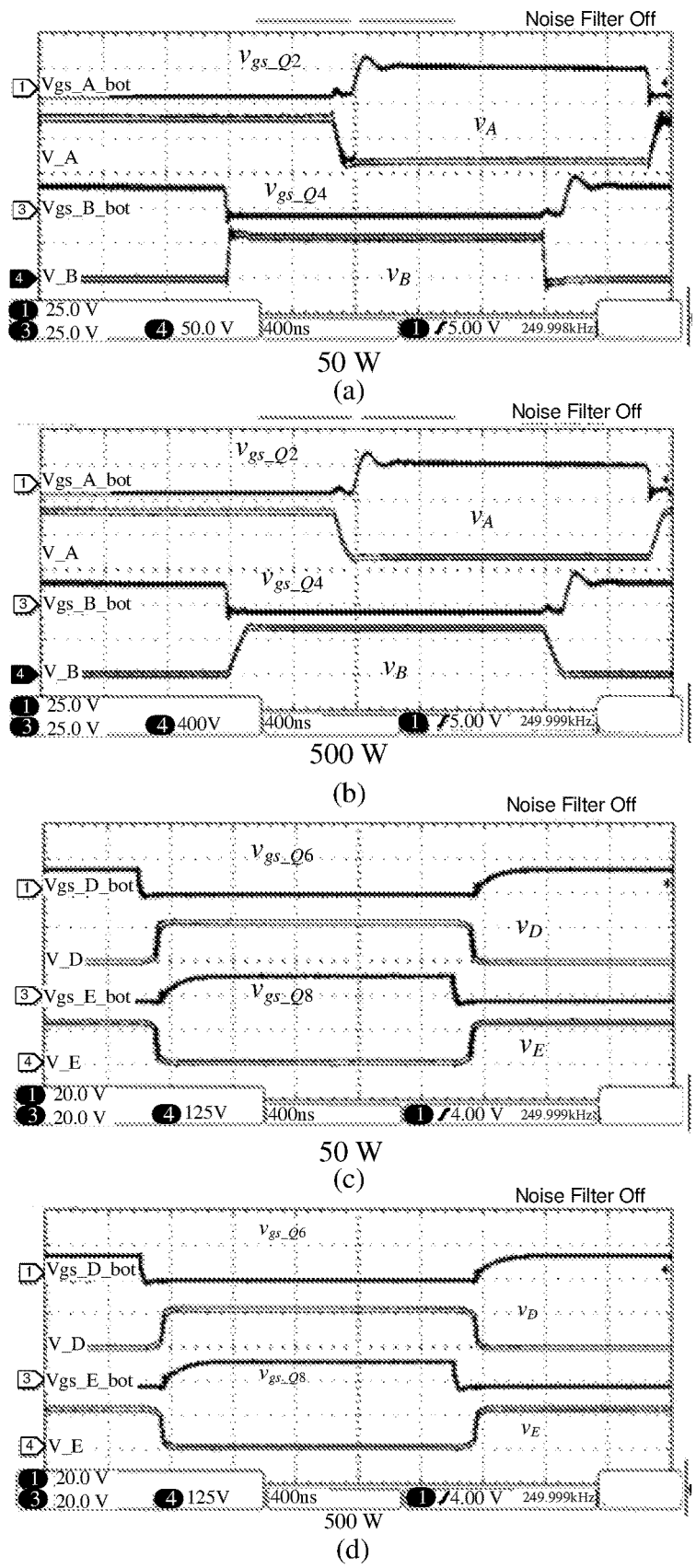
FIG. 12 includes oscilloscope waveforms from the hardware test setup with gate-source and drain-source waveforms of all the legs of the primary H-bridge at (a) 50 W and (b) 500 W, and secondary H-bridge at (c) 50 W and (d) 500 W, operated with $\varphi_{AB}=120°$, $\varphi_{DE}=180°$ and $\varphi_{AD}=60°$, showing ZVS operation.

First, the converter was tested with a diode bridge rectifier and the results are shown in FIG. 10 for 50 W and 500 W operation with $\varphi_{AB}$=120°. It can be seen from the $v_{DE}$ and $i_D$ plot in FIG. 10(a) that the diode operates in DCM mode. Then the converter is tested with active rectifiers (e.g. switches in the secondary H-bridge creating a DAB) and the steady state operating waveforms are shown in FIG. 11 for 50 W and 500 W operation with $\varphi_{AB}$=120°, keeping $\varphi_{DE}$=180° and $\varphi_{AD}$=60°. In addition, the gate-source and drain-source voltage across the bottom switch(es) of all the H-bridge legs of DAB LCL-T are presented in FIG. 12 at minimum (50 W) and maximum (500 W) load. From this results in FIG. 12, it can be seen that the drain-source voltage of the switch(es) falls to zero, before its gate-source voltage rises, confirming ZVS operation over the entire load range. And, due to half wave symmetry in operation, the top switches also go through ZVS turn on.

Figure 13:
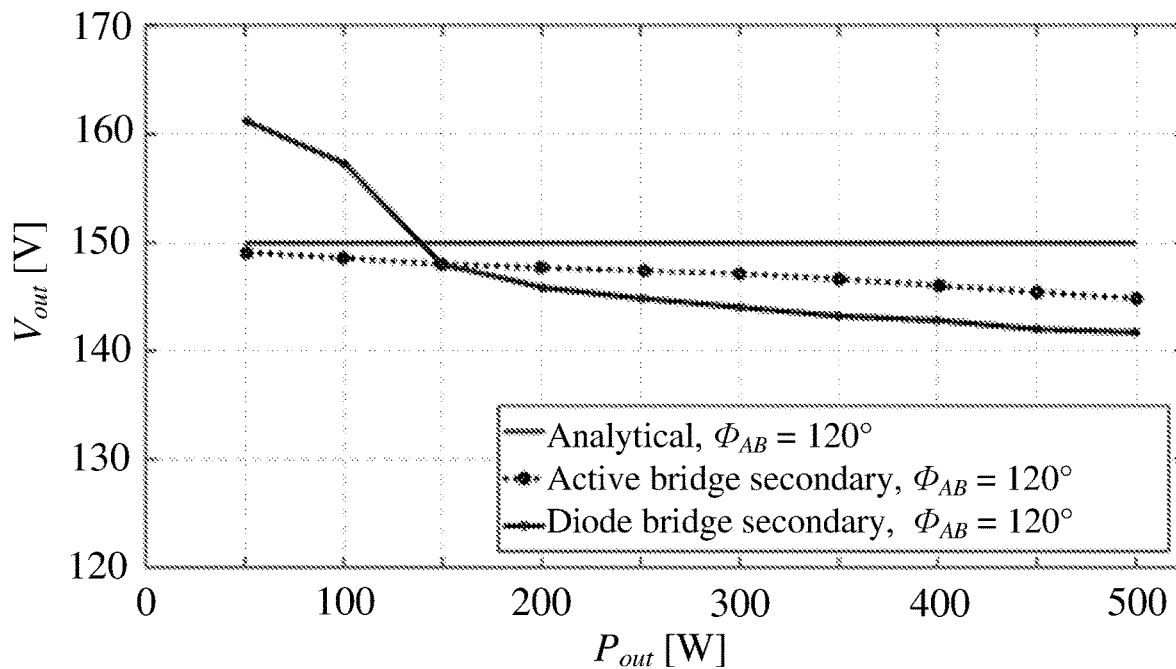
FIG. 13 is a diagram illustrating steady state DC output voltage ($V_{out}$) of the secondary H-bridge versus load power ($P_{out}$) with $\varphi_{AB}=120°$ with analysis results, experimental results with a diode-bridge on the secondary H-bridge, and experimental results with an active bridge on the secondary H-bridge.

The steady state DC output voltage results with both a diode bridge and an active bridge secondary are plotted in FIG. 13, versus the load power at fixed $\varphi_{AB}$=120°. In FIG. 13, the analytical plot is the analytical reference (150 V) and the other traces represent the results with a diode rectifier and an active rectifier, respectively. It can be seen that the output voltage is not load independent for a diode bridge, whereas, with an active secondary bridge, the output voltage is relatively constant over a 10:1 load range. The variation in $V_{out}$ with an active secondary is between 149.1 V and 144.8 V, which is only about 2.9%. The variation is due to non-idealities such as ESR of components. The results presented here are from 50 W to 500 W that is typical range of load seen by the converter. The converter will ideally maintain its output voltage at the same level while the load power falls further below 50 W. In practice, there could be deviation in output voltage from its ideal value, due to component tolerance, temperature variation etc., which will be taken care of by the controller for output voltage regulation. From the hardware results, the variation of $V_{out}$ with a diode bridge is lower than predicted by simulation, which is attributed to the parasitic capacitance of the diodes. Once the diode turns off, the diode capacitance resonates with $L_g$, which can be seen from $v_{DE}$ and $i_D$ plot in FIG. 10(a).

Figure 14:
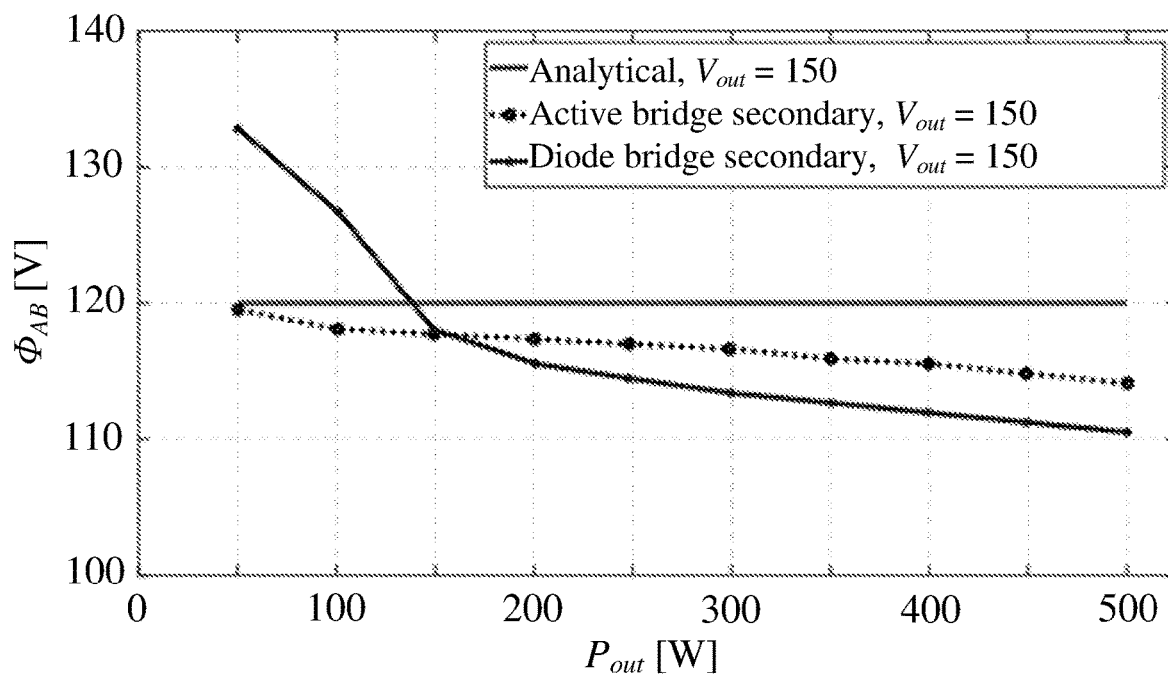
FIG. 14 is a diagram illustrating variation in control angle $\varphi_{AB}$ to regulate $V_{out}$ at a fixed value of 150 V, versus load power with analysis results, experimental results with a diode-bridge on the secondary H-bridge, and experimental results with an active bridge on the secondary H-bridge.

The variation of control angle ($\varphi_{AB}$) needed to keep the output voltage regulated at 150 V is plotted in FIG. 14, where again the analytical line shows the analytical prediction and the other traces represent the results with a diode rectifier and an active rectifier. It can be seen from these plots that variation in $\varphi_{AB}$ is quite large for operation with a diode bridge, whereas the variation is only 5.4° with active bridge on the secondary, over the 10:1 load range.

Figure 15:
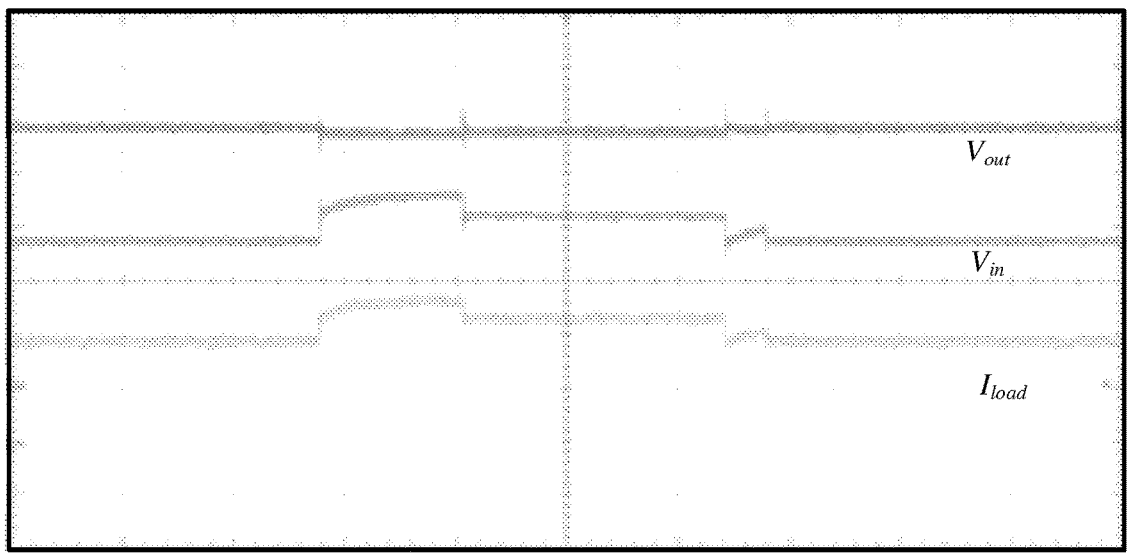
FIG. 15 DAB LCL-T operation under load transient from 350 W to 400 W and back to 350 W with fixed $\varphi_{AB}=115°$ with CH1: output current ($I_{load}$), CH2: input voltage ($V_{in}$) and CH4: output voltage ($V_{out}$)

The DAB LCL-T resonant converter was also tested with load transient at its output with a fixed control angle ($\varphi_{AB}$=115°) and the result is shown in FIG. 15. The output load is varied from 350 W to 400 W and then back to 350 W. In FIG. 15, the input DC voltage ($V_{in}$) is captured by CH2, output current ($I_{load}$) is captured by CH1 and the output voltage ($V_{out}$) is captured by CH4. It can be observed from this result that even under load transient the output voltage returns to the same value at steady state.

Figure 16:
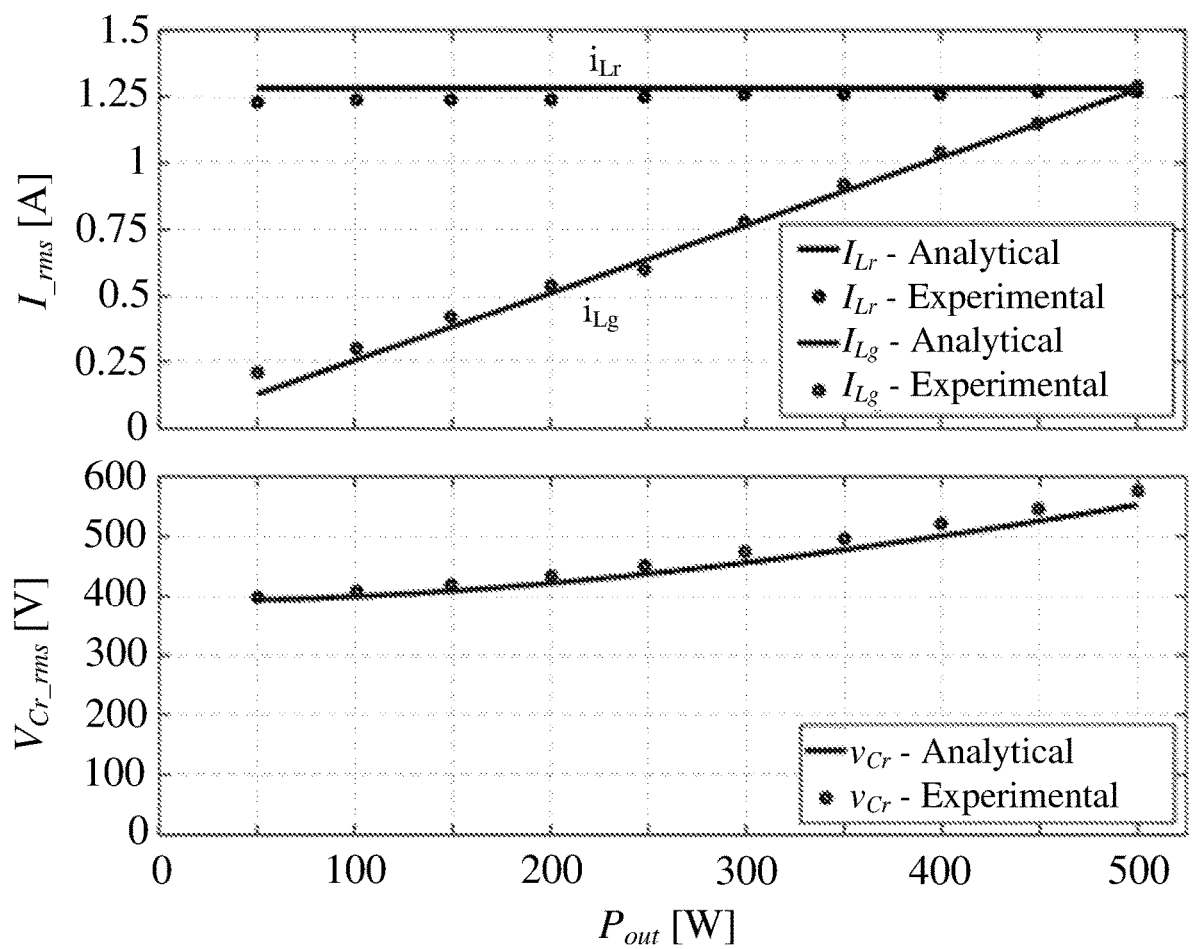
FIG. 16 is a diagram illustrating a comparison of analytical and experimentally measured rms values of tank signals of the DAB LCL-T converter over a load range wherein the top plot pane: It,rms and IR,rms, and bottom plot pane: VCr,rms, and where solid lines are for analytical and dots are for experimental results.

The rms values of tank inductor current and capacitor voltages are measured from the oscilloscope captures at different loads and are compared with the analytical values derived in equations (25)-(27). The comparison is shown in FIG. 16, where analytical values are plotted in solid lines and the measured values are shown in corresponding circles of the same component. The top plot in FIG. 16 compares the rms current in the tank inductors and the bottom plot compares the resonant capacitor voltage. The result depicts a good match between experimental result and analysis.

Figure 17:
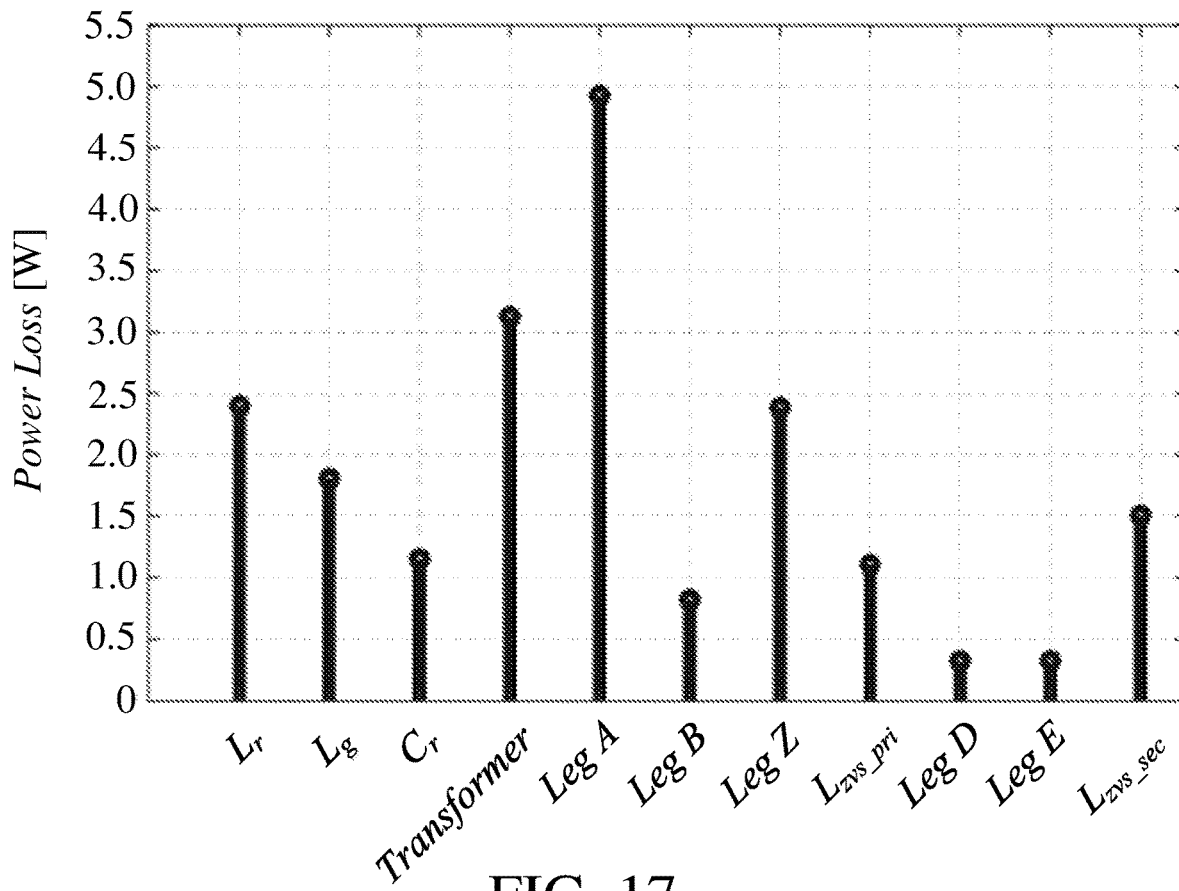
FIG. 17 is a diagram illustrating power loss distribution among the components of DAB LCL-T converter at full load (500 W)
Figure 18:
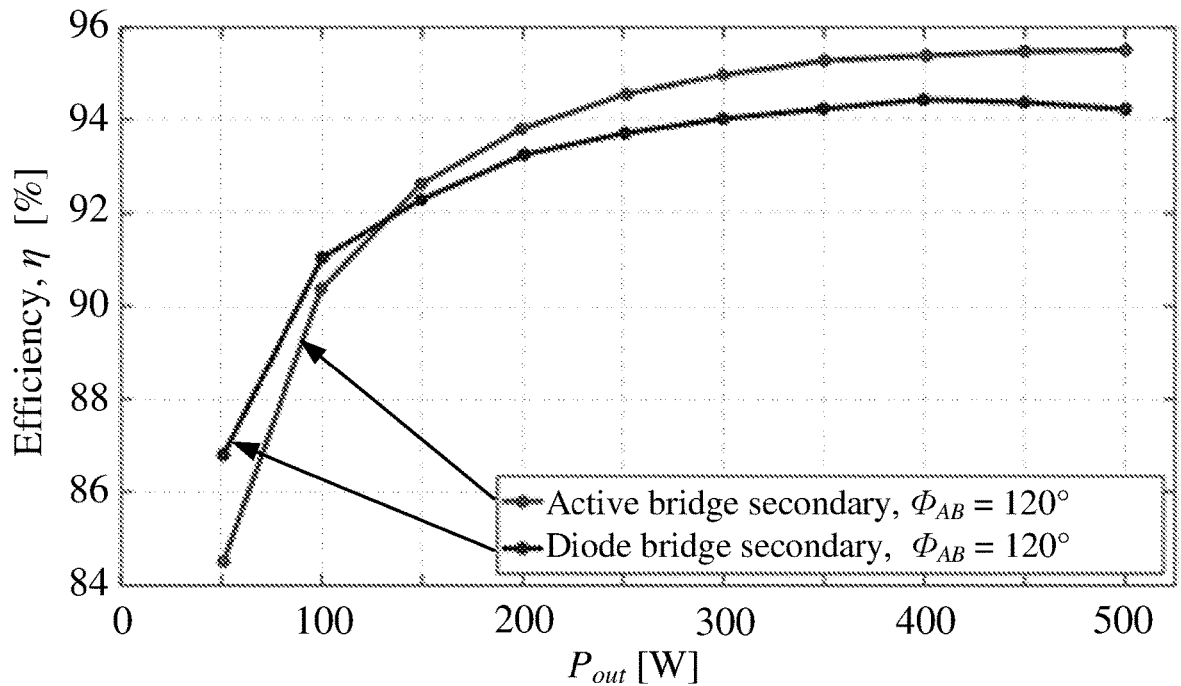
FIG. 18 is a diagram illustrating efficiency of the LCL-T converter over a load range, operating at fixed control angle $_{AB}=120°$ with experimental result with a diode-bridge on the secondary H-bridge and experimental result with an active bridge on the secondary of the H-bridge.

The analytically evaluated power loss in different components of the DAB LCL-T converter is presented in FIG. 17, at full load operating condition. These losses are used for components and heat sink design with natural cooling. The efficiency of the converter, operating at fixed control angle of $\varphi_{AB}$=120°, with active and passive bridges on the secondary side, are shown in FIG. 18. It can be seen that the converter operates with a higher efficiency with an active secondary bridge due to the lower conduction loss. The peak efficiency is approximately 96%.

V. Converter Insights

In underwater DC distribution systems, a constant current source is used to power to multiple, series-connected converters to achieve robustness against voltage drop over the cable length and cable faults. However, powering from a current source brings in various challenges in converter design. Addressing these challenges, as discussed above, it is shown that an LCL-T resonant DC-DC converter can be designed to achieve a load-independent, constant DC output voltage characteristic when powered from a constant DC current source. Detailed modeling, analysis and design are presented for this converter. With analysis, simulation and hardware results, it is shown that diode bridge rectification on the output side of the converter imposes a challenge on low Q (VA rating) design and the use of active bridge overcomes this limitation. A modulation scheme for the DAB LCL-T resonant converter is presented for overall operation of the converter with minimum VA rating for the tank components, the isolation transformer, and the H-bridges. Finally, a hardware prototype is developed and tested for a system with 1 A input current, 150 V output voltage, operating at a switching frequency of 250 kHz, over a load range of 50 W to 500 W. Results obtained from hardware experiments confirm the analysis with a good match between analytical expressions and experimentally obtained values.

VII. Bidirectional Converter

As stated above, underwater power distribution network used in ocean observatory system uses constant current distributed through a long distance trunk cable. In some embodiments, multiple power branching units ("PBUs") are connected in series to tap power from the DC current feed to deliver required voltage or current to their respective loads, as shown in FIG. 19(a). These PBUs can deliver power to a fixed stationary load regulating i, output current or output voltage or can be charging an underwater autonomous vehicle wirelessly.

Some of these PBUs deliver power to critical loads where redundant, identical DC-DC power converter modules are used within a PBU, as shown in FIG. 19(b). The DC-DC converters within a PBU are connected to the input/output of the PBU through relay networks to select appropriate converter module(s) for seamless power delivery to the critical load. In addition, there is an auxiliary source housed within the PBU(s) for uninterrupted power for the critical loads. As shown in FIG. 20(a), under normal conditions, power flows from the constant current source to the load through one of the DC-DC converter modules to provide constant voltage to the load, while the other module is bypassed and kept idle. In case of fault in the line, in some embodiments, the relay networks reconfigure the PBU with a connection shown in FIG. 20(b) where the second DC-DC module converts the power from auxiliary voltage source to a constant current drive feeding the first converter which then delivers power to the load, regulating its output voltage. Hence the power converter modules need to be capable of converting a current source to a voltage source in forward direction of power flow and a voltage source to a current drive in reverse direction of power flow. While the example above provides a rationale to develop a bidirectional DAB LCL-T converter, this bidirectional DAB LCL-T converter may be used for many other situations where one side is constant current and the other is constant voltage.

In embodiments described below, a detailed analysis is presented for an isolated DAB LCL-T resonant converter with generalized three angle modulation for the active bridges, having current source input in forward power flow and voltage source input in reverse power flow. The modulation angles are specifically controlled for converters used in constant current distribution systems and the resonant tank and transformer turn ratio are designed for minimization of VA ratings of the converter components.

VIII. Steady State Modeling and Analysis

The DAB LCL-T converter topology is detailed in FIG. 21(a). In forward direction of power flow, power is transferred from DC current source $I_g$ to load $R_{L2}$, to regulate converter's output DC voltage $V_2$, as depicted in FIG. 21(a). Whereas, in reverse direction of power flow, power from DC voltage source $V_g$ flows to $R_{L1}$, regulating DC current $I_1$ as its output in FIG. 21(a). In FIG. 21(a), MOSFETs $Q_1$-$Q_4$ form primary side H-bridge that translates DC voltage $V_1$ into an AC quasi-square wave $v_{AB}$ through symmetrical phase shift modulation, with leg A leading leg B by an angle $\varphi_{AB}$, as shown in FIG. 21(b). Similarly, MOSFETs $Q_5$-$Q_8$ form secondary side H-bridge between DC voltage $V_2$ and AC quasi-square wave $v'_{DE}$, modulated by angle $\varphi_{DE}$, with leg D leading leg E whose time domain waveform is also shown in FIG. 21(b). As shown in FIG. 21(b), the two H-bridges are separated by angle $\varphi_{AD}$, which is the phase shift between positive rising edge of $v_{AB}$ and $v'_{DE}$. As a matter of nomenclature definition, with reference to the modulation waveform presented in FIG. 21(b), any angle ($\varphi_{XY}$) used in the analysis is defined as:

$$\varphi_{XY} = \varphi_Y - \varphi_X. \tag{48}$$

The resonant tank is formed by capacitor $C_r$ and two equal valued inductors $L_r$ and $L_g$, transferring power between the two H-bridges through a n:1 isolation transformer. Capacitors $C_1$ and $C_2$ filter out high frequency signals at the DC side of the H-bridges. With fundamental harmonics approximation ("FHA"), the converter shown in FIG. 21(a) can be redrawn as the equivalent circuit shown in FIG. 22(a), for the steady state analysis, and it is assumed that all the components are ideal and lossless.

A. AC Equivalent Circuit Analysis

Figure 22:
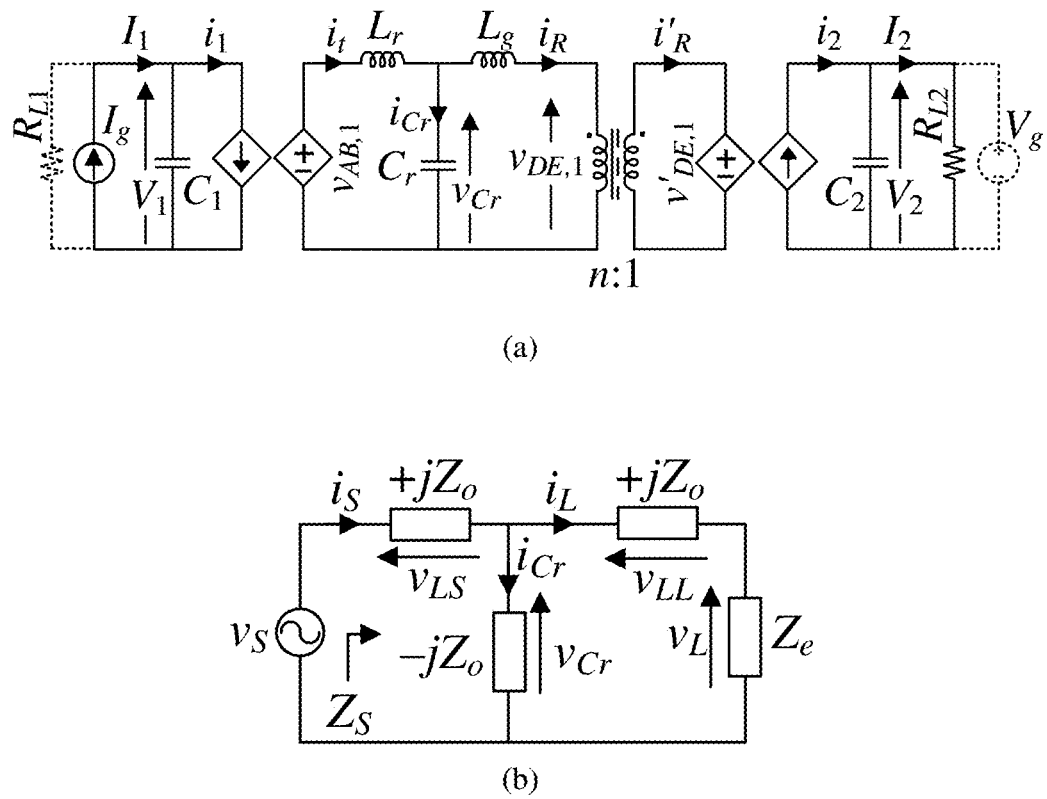
FIG. 22 is a schematic block diagram illustrating one embodiment of (a) an equivalent circuit of the DAB LCL-T resonant DC-DC converter and (b) a fundamental AC equivalent circuit of the loaded resonant tank.

The fundamental AC equivalent circuit of the loaded LCL-T resonant tank, reflected to transformer primary side, is shown in FIG. 22(b) where $v_S$ and $i_s$ represent the source side fundamental AC voltage and current, respectively and $v_L$ and $i_L$ represent load side fundamental AC voltage and current, respectively. In the circuit shown in FIG. 22(b), the impedance $Z_e$ is the equivalent complex impedance seen at the AC side of the H-bridge on the load side and is represented as:

$$Z_e = |Z_e| \angle \varphi_e, \tag{49}$$

where $\varphi_e$ is the angle between $v_L$ and $i_L$. The details of deriving this impedance are provided in Appendix A.

Since the converter's switching frequency ($f_s$) is same as its resonant frequency ($f_o$), the circuit in FIG. 22(b) is symmetric and can be analyzed irrespective of power flow direction from $I_g$ to $R_{L2}$ or from $V_g$ to $R_{L1}$. The circuit quantities used in the analysis are defined as $$f_o = \frac{1}{2\pi\sqrt{L_r C_r}}, Z_o = \sqrt{\frac{L_r}{C_r}}, L_g = L_r, F = \frac{f_s}{f_o} = 1. \tag{50}$$

From the equivalent circuit of FIG. 22(b), the input impedance of the loaded tank, seen from the source side can be derived as:

$$Z_S = jZ_o + \frac{-jZ_o(Z_e + jZ_o)}{-jZ_o + Z_e + jZ_o} = \frac{Z_o^2}{|Z_e|} \angle -\varphi_e. \tag{51}$$

Using $Z_S$ from equation (51), the AC source current $i_S$ can be found as:

$$i_S = \frac{V_S}{Z_S} = V_S \frac{|Z_e|}{Z_o^2} \angle \varphi_e, \tag{52}$$

where $V_S$ is the amplitude of $v_S$. The load side AC current $i_L$ can be derived as:

$$i_L = \frac{V_S}{Z_o} \angle -\frac{\pi}{2}. \tag{53}$$

The voltage across and current through resonant capacitor $C_r$ can be derived as:

$$v_{C_r} = V_L \cos(\varphi_e) \sqrt{1 + \frac{1}{Q_z^2}} \angle -\tan^{-1} Q_z, \tag{54}$$

$$i_{C_r} = \frac{V_L}{Z_o} \cos(\varphi_e) \sqrt{1 + \frac{1}{Q_z^2}} \angle -\tan^{-1}\left(\frac{1}{Q_z}\right). \tag{55}$$

where $V_L$ is the amplitude of $v_L$ and $Q_z$ is defined as:

$$Q_z = \frac{|Z_e|\cos(\varphi_e)}{Z_o + |Z_e|\sin(\varphi_e)}. \tag{56}$$

Figure 23:
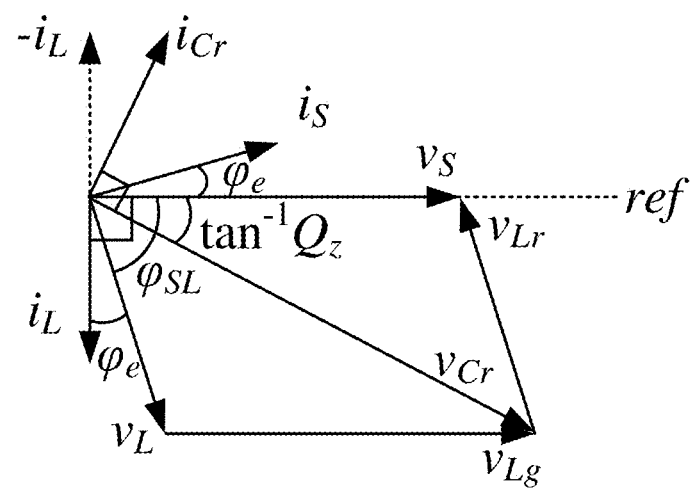
FIG. 23 is a phasor diagram for the AC signals from the equivalent circuit of FIG. 22(b)

From the derivations in equations (52)-(55), the phasor diagram of the AC equivalent circuit in FIG. 22(b) can be drawn as shown in FIG. 23, with $v_S$ taken as reference and $\varphi_{SL}$ defined as the phase angle between $v_S$ and $v_L$ and is related to $\varphi_e$ by:

$$\varphi_e = \frac{\pi}{2} - \varphi_{SL}. \tag{57}$$

The source and load power in the circuit of FIG. 22(b) are expressed as:

$$P_S = \frac{V_S^2}{2}\frac{|Z_e|}{Z_o^2}\cos(\varphi_e), \tag{58}$$

$$P_L = \frac{V_L^2}{2|Z_e|}\cos(\varphi_e). \tag{59}$$

The power transfer from source to load, through the resonant tank, in terms of source and load side AC voltages can be given as:

$$P_T = \frac{V_S V_L}{2Z_o}\cos(\varphi_e). \tag{60}$$

From equation (60), the maximum power transfer for a given resonant tank will occur with maximum values of $V_S$ and $V_L$ and at $\varphi_e=0$ and this value can be given in terms of DC voltage(s) $V_1$ and $V_2$ as:

$$|P_{max}| = \frac{8n}{\pi^2}\frac{V_1 V_2}{Z_o}, \tag{61}$$

and the set of modulation angle(s) at which maximum power transfer occurs is given as:

$$\varphi_{AB} = \pi, \varphi_{DE} = \pi, \left|\varphi_{AD} - \frac{\varphi_{AB}}{2} + \frac{\varphi_{DE}}{2}\right| = \frac{\pi}{2}. \tag{62}$$

From the analysis and phasor diagram of the AC equivalent circuit presented in this section, the following key properties of LCL-T resonant tank can be observed 1. For power transfer from the source to the load, source voltage ($v_s$) will lead the load voltage ($v_L$).
2. The load current ($i_L$) always lags source voltage ($v_S$) by 90°, for any load impedance.
3. An inductive impedance on the load side ($i_L$ lagging $v_L$) will reflect as capacitive on the source side ($i_S$ leading $v_S$) and vice versa.

B. DC Input—Output Relationship

From the analysis of the AC resonant circuit established in previous section, the relationship of input and output DC quantities can be now derived from the equivalent circuit modeled in FIG. 22(a). The fundamental component of AC voltage from the two H-bridges are given as:

$$V_{AB,1} = \frac{4}{\pi}V_1\sin\left(\frac{\varphi_{AB}}{2}\right), \tag{63}$$

$$V_{DE,1} = \frac{4n}{\pi}V_2\sin\left(\frac{\varphi_{DE}}{2}\right). \tag{64}$$

For forward power flow, substituting equations (63) and (64) into equations (58) and (59) and equating the source and load side power the following relationship is established:

$$\frac{V_1\sin\left(\frac{\varphi_{AB}}{2}\right)}{nV_2\sin\left(\frac{\varphi_{DE}}{2}\right)} = \frac{Z_o}{|Z_e|}. \tag{65}$$

The magnitude of AC load impedance is given as:

$$|Z_e| = \frac{8n^2}{\pi^2}R_{L2}\cos(\varphi_e)\sin^2\left(\frac{\varphi_{DE}}{2}\right), \tag{66}$$

where $R_{L2}$ is the load resistance on the DC output side. From the circuit in FIG. 22(a), the DC power input ($P_{in}$) and power output ($P_{out}$) can be given as:

$$P_{in} = V_1 I_1, \quad P_{out} = \frac{V_2^2}{R_{L2}}. \tag{67}$$

With lossless power conversion, equating the input and output DC power from equation (67), the input DC voltage can be expressed as:

$$V_1 = \frac{V_2^2}{I_1 R_{L2}}. \tag{68}$$

Substituting the $V_1$ from equation (68) and $|Z_e|$ from equation (66) into equation (65), the expression of $V_2$ for forward power flow can be derived as:

$$V_2 = \frac{\pi^2}{8n}\frac{I_1 Z_o}{\sin\left(\frac{\varphi_{AB}}{2}\right)\sin\left(\frac{\varphi_{DE}}{2}\right)\cos(\varphi_e)}. \tag{69}$$

The value of $\varphi_e$ can be found from equation (57) with $\varphi_{SL}$ evaluated for forward power, from the modulation waveform in FIG. 21(b) as:

$$\varphi_{SL\_F} = \varphi_{AD} - \frac{\varphi_{AB}}{2} + \frac{\varphi_{DE}}{2}. \tag{70}$$

Finally, substituting equations (70) and (57) into equation (69), the DC output voltage $V_2$ can be evaluated as:

$$V_2 = \frac{\pi^2}{8n}\frac{I_1 Z_o}{\sin\left(\frac{\varphi_{AB}}{2}\right)\sin\left(\frac{\varphi_{DE}}{2}\right)\sin\left(\varphi_{AD} - \frac{\varphi_{AB}}{2} + \frac{\varphi_{DE}}{2}\right)}. \tag{71}$$

From equation (71) it can be observed that with $I_1=I_g$ i.e. with constant DC current source, beneficially the output DC voltage of the converter becomes independent of load. The input voltage, however, will be dependent on load and is found out by plugging in $V_2$ from equation (71) in equation (68) and is given by:

$$V_1 = \frac{I_1}{R_{L2}} \left[ \frac{\pi^2}{8n} \frac{Z_o}{\sin\left(\frac{\varphi_{AB}}{2}\right)\sin\left(\frac{\varphi_{DE}}{2}\right)\sin\left(\varphi_{AD} - \frac{\varphi_{AB}}{2} + \frac{\varphi_{DE}}{2}\right)} \right]^2. \quad (72)$$

The DC input current to the converter ($I_1$) and AC input to the resonant tank ($i_t$) are related through the primary side H-bridge by:

$$I_1 = \langle i_1 \rangle = \frac{2I_t}{\pi}\sin\left(\frac{\varphi_{AB}}{2}\right)\cos(\varphi_e), \quad (73)$$

where $I_t$ is the amplitude of $i_t$ and average value of current ii is represented by $\langle i_1 \rangle$. For forward power flow, $I_1=I_g$ and thus the tank input current can be written from equation (73) and using equation (52) as:

$$i_t = \frac{\pi}{2} \frac{I_g}{\sin\left(\frac{\varphi_{AB}}{2}\right)\cos(\phi_e)} \angle \varphi_e. \quad (74)$$

Similarly, the load side tank AC current $i_R$ can be expressed, using the phase information from equation (53), as:

$$i_R = \frac{\pi}{2n} \frac{V_2}{R_{L2}\sin\left(\frac{\varphi_{DE}}{2}\right)\cos(\varphi_e)} \angle -\frac{\pi}{2}. \quad (75)$$

Following similar approach, the equations of signals for reverse power flow can be derived which are tabulated in Table III (FIG. 36) along with the equations for forward power flow. The phasor diagram for the tank AC signals are also presented in the Table III, for both forward and reverse power flow, taking $v_{AB,1}$ and $v_{DE,1}$ taken as reference, respectively. The power flow direction from primary to secondary and vice versa is dependent of the phase angle ($\varphi_{PS}$) between $v_{AB,1}$ and $v_{DE,1}$ which can be found out from the modulating waveform shown in FIG. 21(b) and is given by:

$$\varphi_{PS} = \varphi_{AD} - \frac{\varphi_{AB}}{2} + \frac{\varphi_{DE}}{2}. \quad (76)$$

For forward power flow where $I_1$ and $I_2$ are positive, $\varphi_{PS}$ is within the range $[0, \pi]$ and in reverse power flow where $I_1$ and $I_2$ are both negative, $\varphi_{PS}$ is within the range $[-\pi, 0]$. Thus, the relationship between $\varphi_{SL}$, and $\varphi_{PS}$ is given by:

$$\varphi_{SL} = |\varphi_{PS}| = \left|\varphi_{AD} - \frac{\varphi_{AB}}{2} + \frac{\varphi_{DE}}{2}\right|, \quad (77)$$

and from equation (57) the relationship between $\varphi_e$ and modulation angles is given by:

$$\varphi_e = \frac{\pi}{2} - |\varphi_{PS}| = \frac{\pi}{2} - \left|\varphi_{AD} - \frac{\varphi_{AB}}{2} + \frac{\varphi_{DE}}{2}\right|. \quad (78)$$

Figure 24:
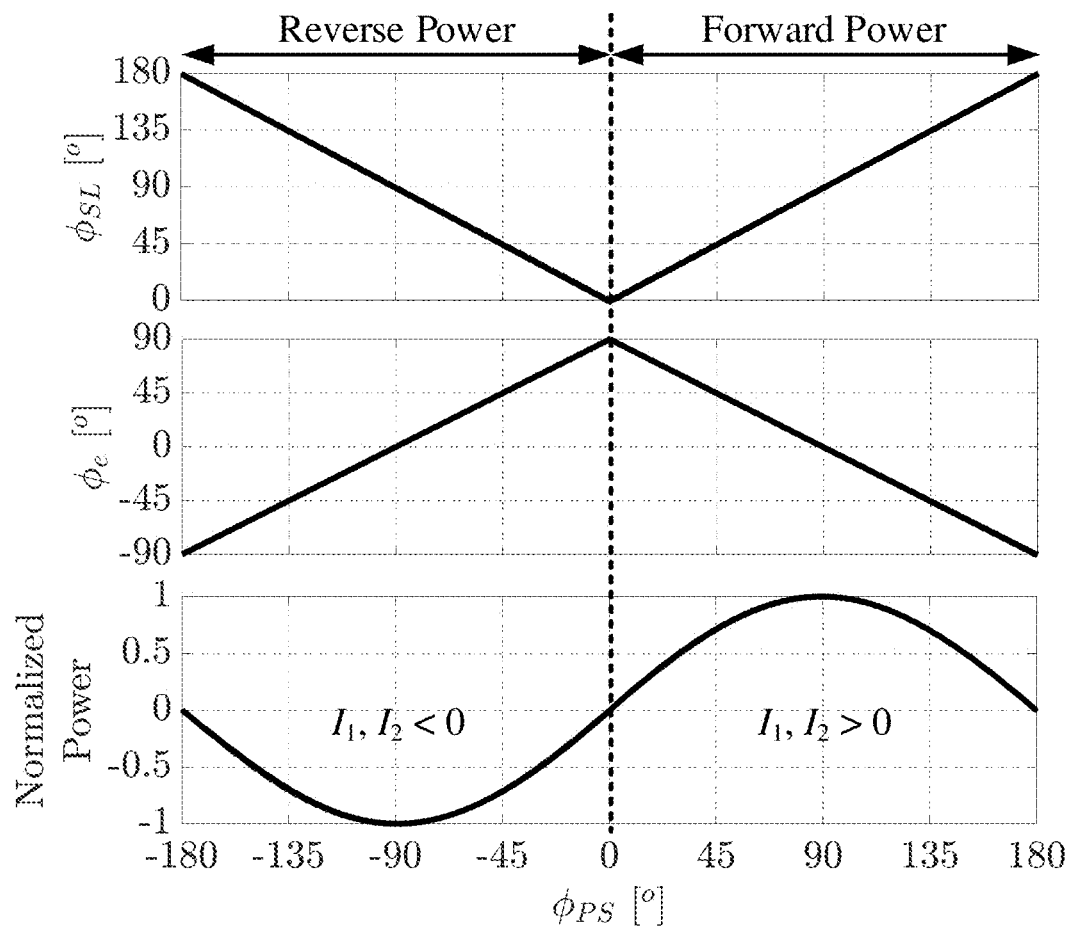
FIG. 24 is a diagram illustrating variations of $\varphi_{SL}$, $\varphi_e$ and normalized power over the range of $\varphi_{PS}$, for forward and reverse power flow.

The variation of $\varphi_{SL}$ and $\varphi_e$ are plotted against $\varphi_{PS}$ in FIG. 24 along with the variation in normalized power from primary to secondary using equation (61), for $\varphi_{Ab}=\varphi_{DE}=\pi$, which is defined as:

$$P_{PS\_norm} = \sin(\varphi_{PS}). \quad (79)$$

The relationships established between DC input and output quantities and the derived AC quantities of the resonant tank, in either direction of power flow, are used for choosing the converter operating point and design of components in the following section.

IX. Design of the Converter

From the analysis presented in the previous section, converter gain for forward ($G_F$) and reverse ($G_R$) power are expressed as:

$$G_F = \frac{V_2}{I_g} = \frac{\frac{\pi^2}{8n}Z_o}{\sin\left(\frac{\varphi_{AB}}{2}\right)\sin\left(\frac{\varphi_{DE}}{2}\right)\sin\left(\varphi_{AD} - \frac{\varphi_{AB}}{2} + \frac{\varphi_{DE}}{2}\right)}, \quad (80)$$

$$G_R = \frac{I_1}{V_g} = \frac{\sin\left(\frac{\varphi_{AB}}{2}\right)\sin\left(\frac{\varphi_{DE}}{2}\right)\sin\left(\varphi_{AD} - \frac{\varphi_{AB}}{2} + \frac{\varphi_{DE}}{2}\right)}{\frac{\pi^2}{8n}Z_o}. \quad (81)$$

It can be observed from equations (80) and (81) that the magnitude(s) of the gain(s) are reciprocal to each other, i.e.:

$$|G_F| = \frac{1}{|G_R|}. \quad (82)$$

which means that for a given resonant tank ($Z_o$) and transformer (n) the input to output ratio can be achieved with same set of modulation angle [$\varphi_{AB}$, $\varphi_{DE}$, $|\varphi_{AD}-\varphi_{AB}/2+\varphi_{DE}/2|$], with source AC voltage leading the load side voltage. And thus, with a designed modulation angle set, the tank and transformer can be designed irrespective of power flow direction.

A. Modulation Angle

In forward power flow, when the converter is fed from a DC current source, a non-zero $\varphi_e$ makes the input impedance seen by the source H-bridge either inductive or capacitive. This brings in a restriction on minimum power operation of the converter for which the output can be regulated. So, to eliminate such limitation, $\varphi_e$ is made to be zero which, from equation (78) gives:

$$\left|\varphi_{AD} - \frac{\varphi_{AB}}{2} + \frac{\varphi_{DE}}{2}\right| = \frac{\pi}{2}. \quad (83)$$

Now, with the condition established in equation (83), control of output can be done through $\varphi_{AB}$ or $\varphi_{DE}$. In this application, since the secondary side of this converter has higher current compared to the primary side, $\varphi_{DE}$ is set to its maximum value of 180° to keep the device current stress low for the secondary H-bridge and control of the converter is done through $\varphi_{AB}$.

Finally, the nominal operating value of $\varphi_{AB}$ is chosen to be 120° which eliminates any triplen harmonic content out of the primary H-bridge. This also keeps good margin from maximum possible value of $\varphi_{AB}$ as 180°, for transients. With known $\varphi_{AB}$ and $\varphi_{DE}$, $\varphi_{AD}$ is found out using equation (83) and the set of modulation angles for forward power is given as:

$$\varphi_{AB} = 120°, \varphi_{DE} = 180°, \varphi_{AD} = \frac{\varphi_{AB}}{2}, \tag{84}$$

whereas, for reverse power, the set is given as:

$$\varphi_{AB} = 120°, \varphi_{DE} = 180°, \varphi_{AD} = \frac{\varphi_{AB}}{2} - 180°. \tag{85}$$

B. Derivation of Converter Signals at Operating Point

With the selected operating set of modulating angles in equations (84) and (85), the resultant signals of the converter from Table III can be simplified to the signals tabulated in Table IV (FIG. 37) where the terms $Z_e$ and $Q_z$ are modified to $R_e$ and Q, respectively. From equation (56), Q is expressed as:

$$Q = \frac{R_e}{Z_o}. \tag{86}$$

From the expressions of the tank AC signals and phasor diagram presented in Table IV, it can be observed that at the selected operating condition, both the H-bridges now operate at unity power factor (UPF), in terms of their fundamental AC voltage and current. Also, from these derivations, rms currents in the tank components can be calculated from their signal amplitude which are used to calculate the VA of the tank to design the resonant tank and transformer turn ratio for lowest VA rating.

C. Design of Resonant Tank and Transformer

The VA of the resonant tank can be expressed in terms of rms current through $L_r$, $L_g$ and $C_r$ as:

$$VA_{Tank} = (I_{t,rms}^2 + I_{R,rms}^2 + I_{Cr,rms}^2) Z_o. \tag{87}$$

Since the current through the resonant capacitor is phasor subtraction of $i_t$ and $i_R$ which are in quadrature to each other, the rms currents through the tank elements can be related as:

$$I_{Cr,rms} = \sqrt{I_{t,rms}^2 + I_{R,rms}^2}. \tag{88}$$

Substituting equation (88) in equation (87) the tank VA is evaluated as:

$$VA_{Tank} = 2(I_{t,rms}^2 + I_{R,rms}^2) Z_o. \tag{89}$$

Using the equations of $i_t$, $i_R$ and $V_2$ from Table IV and Q from equation (86), the tank VA expression from equation (89) can be further simplified to:

$$VA_{Tank} = 2\left(Q + \frac{1}{Q}\right) P_{load}, \tag{90}$$

where $P_{load}$ represents the output load. The expression from is normalized with respect to $P_{load}$ and expressed as:

$$VA_{Tank\_norm} = 2\left(Q + \frac{1}{Q}\right). \tag{91}$$

From the expression of $V_2$ in Table IV, $Z_o$ can be expressed as:

$$Z_o = \frac{8n}{\pi^2} \frac{V_2 \sin\left(\frac{\varphi_{AB}}{2}\right)}{I_g}, \tag{92}$$

and substituting this value in equation (86), Q can be expressed as:

$$Q = \frac{n I_g V_2}{P_{load} \sin\left(\frac{\varphi_{AB}}{2}\right)}. \tag{93}$$

The tank VA rating is found under the maximum load condition ($P_{load} = P_{load\_max}$) and from equation (91) it can be seen that the normalized VA of the tank would be minimum when Q=1, under maximum load. Plugging Q=1 in equation (93), the optimum value of transformer turn ratio ($n_{opt}$) can be expressed as:

$$n_{opt} = \frac{P_{load\_max} \sin\left(\frac{\varphi_{AB}}{2}\right)}{V_2 I_g}. \tag{94}$$

Using equation (94) in equation (92), $Z_o$ can be evaluated from which the values of resonant tank components can be calculated as:

$$L_r = \frac{Z_o}{2\pi f_0} = \frac{Z_o}{2\pi f_S}, \tag{95}$$

$$C_r = \frac{1}{2\pi f_o Z_o} = \frac{1}{2\pi f_s Z_o}, \tag{96}$$

$$L_g = L_r = \frac{Z_o}{2\pi f_s}. \tag{97}$$

Figure 25:
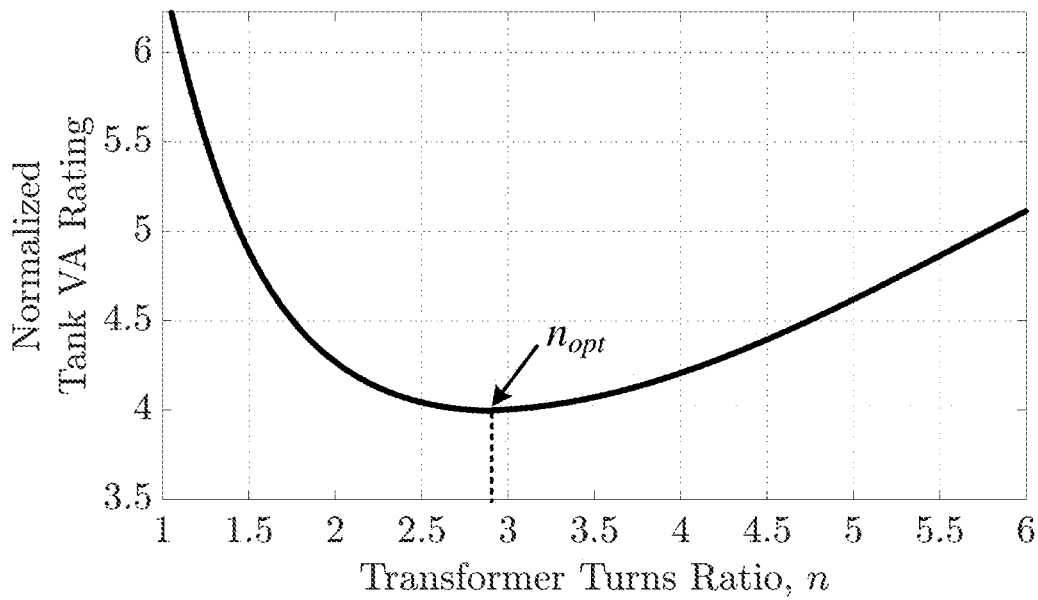
FIG. 25 is a diagram illustrating normalized VA rating of the tank for various transformer turns ratios (n)

The normalized VA rating of the tank is plotted against transformer turn ration (n) in FIG. 25 where it can be seen that the minimum value of tank VA occurs at n=$n_{opt}$.

In some embodiments, $\varphi_{AB}$, $\varphi_{AD}$, and $\varphi_{DE}$ are set to fixed values due to the load independence of the DAB LCL-T converter. In other embodiments, a voltage control loop is used to maintain the output voltage $v_{out}$ at a reference value for forward power and a current control loop is used to control current at the input-side of the primary H-bridge for reverse power. The voltage control loop may be used to control any of $\varphi_{AB}$, $\varphi_{AD}$, or $\varphi_{DE}$. In some embodiments, ($\varphi_{DE}$ is set to 180°. The voltage control loop compares the output voltage $V_{out}$ with a reference signal, which is fed into a compensator. The output of the compensator is used to either control $\varphi_{AB}$ or $\varphi_{AD}$ (when $\varphi_{DE}$ is set to 180°), which is then used to control modulation of the switches $Q_1$-$Q_8$. Where $\varphi_{AB}$ is controlled, then $$\varphi_{AD} = \frac{\varphi_{AB}}{2}$$

is used to set $\varphi_{AD}$ for torward power. Where $\varphi_{AD}$ is controlled, for forward power then $\varphi_{AB}$ is twice $\varphi_{AD}$.

For reverse power, the current control loop may be used to control any of $\varphi_{AB}$, $\varphi_{AD}$, or $\varphi_{DE}$. In some embodiments, $\varphi_{DE}$ is set to 180°. The current control loop compares the input current $I_g$ with a reference signal, which is fed into a compensator. The output of the compensator is used to either control $\varphi_{AB}$ or $\varphi_{AD}$ (when ($\varphi_{DE}$ is set to 180°), which is then used to control modulation of the switches $Q_1$-$Q_8$. Where $\varphi_{AB}$ is controlled, then $$\varphi_{AD} = \frac{\varphi_{AB}}{2} - 180°$$

is used to set $\varphi_{AD}$ for reverse power. Where ($\varphi_{AD}$ is controlled, then $\varphi_{AB}=2(\varphi_{AD}+180°)$ is used to set $\varphi_{AB}$ for reverse power.

D. ZVS Assistance

Figure 31:
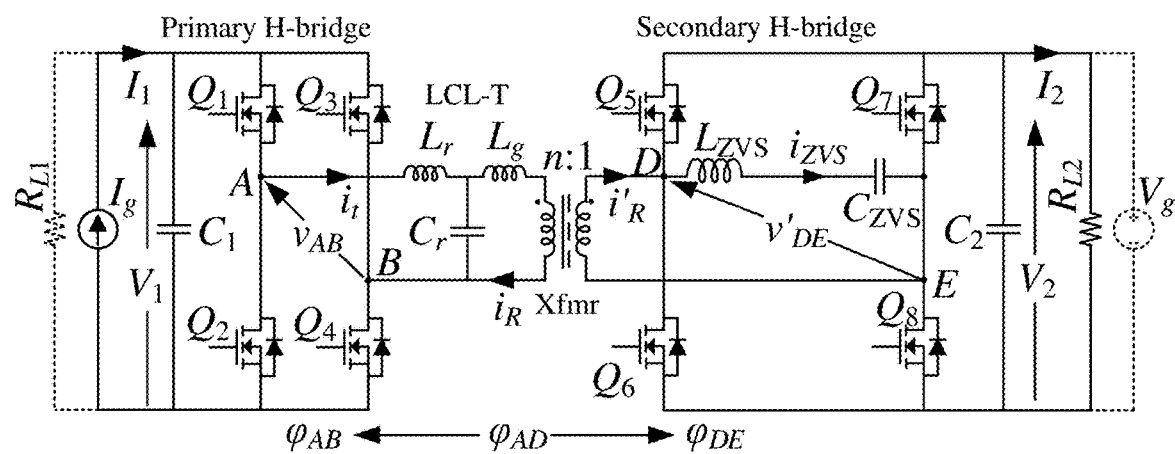
FIG. 31 is a schematic block diagram illustrating one embodiment of a DAB LCL-T resonant DC-DC converter topology with ZVS branches.

FIG. 31 is a schematic block diagram of the circuit of FIG. 21(a) with ZVS circuits. With the H-bridges of the converter designed to operate at UPF (FHA), all the MOSFETs will not have zero voltage switching (ZVS) and hence ZVS assisting circuits are needed. The secondary H-bridge operates at UPF with $\varphi_{DE}=180°$, resulting in zero current turn on and turn off, in either direction of power flow. So, a fixed inductor ($L_{zvs\_sec}$) based passive ZVS assisting circuit is used across leg D and leg E, since the bridge operates with fixed DC voltage $V_2$. On the primary side H-bridge, which operates with $\varphi_{AB}=120°$, tank current ($i_r$) does ZVS for MOSFETs in lagging leg, for forward power and leading leg, for reverse power. For the other leg in the primary bridge, an active ZVS assisting circuit with an inductor ($L_{zvs\_pri}$) and a half-bridge is used to achieve ZVS over the wide load range, since the DC voltage ($V_1$) for primary bridge varies with load.

X. Experimental Verification

A prototype hardware has been built to verify the analysis presented in the last sections whose details are presented in TABLE V. DC blocking capacitors ($C_{DC\_pri}$ and $C_{DC\_sec}$) are used in both primary and secondary side H-bridges to block any DC component of voltage arriving out of the inverters due to any component non-idealities.

Figure 26:
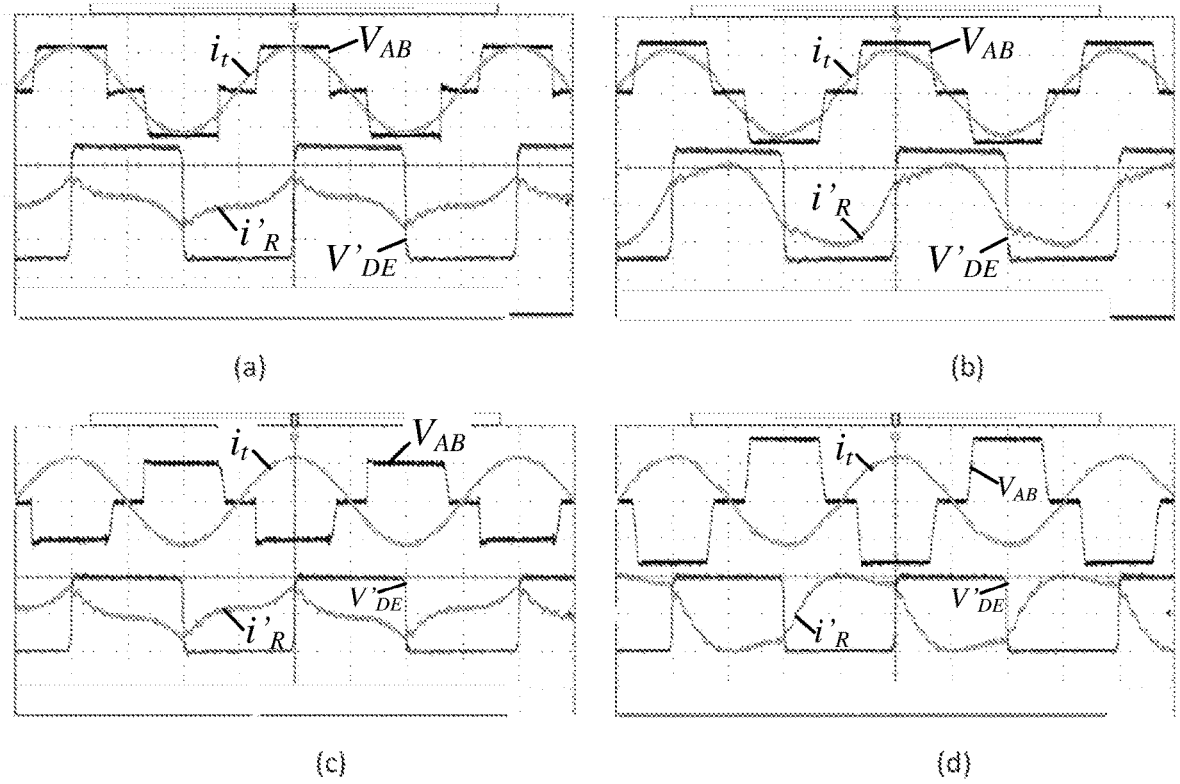
FIG. 26 includes oscilloscope waveforms from a DAB LCL-T converter hardware test setup illustrating steady state operating waveforms (a) at 50 W and (b) 500 W for forward power transfer from a 1 A current source ($I_g$) with $\varphi_{AB}=120°$, $\varphi_{DE}=180°$, and $\varphi_{AD}=60°$ and (c) at 50 W and (d) 500 W for reverse power transfer from a 150 V voltage source ($V_g$) with $\varphi_{AB}=120°$, $\varphi_{DE}=180°$, and $\varphi_{AD}=-120°$ where CH1: $v_{AB}$, CH2: $i_r$, CH3: $v'_{DE}$, and CH4: $i'_R$.

For forward power transfer, the converter is tested with 1 A constant DC current source with modulation angle set from equation (84) for a load range of 50 W to 500 W and the steady state waveforms of the H-bridge voltage and current are shown in FIG. 26(a) and FIG. 26(b) for a load of 50 W and 500 W, respectively. In FIG. 26(c) and FIG. 26(d), same set of waveforms are shown for reverse power flow from a 150 V constant DC voltage source, with modulation angle set presented in equation (85). In FIG. 26, CH1 shows the waveform of $v_{AB}$, CH2 is for $i_r$, CH3 is for $v'_{DE}$ and current $i'_R$ is shown in CH4. It can be seen from these waveforms that for forward power transfer, fundamental components of $v_{AB}$ and $i_r$ are in phase and $v'_{DE}$ and $i'_R$ are in phase with $v_{AB}$ leading $v'_{DE}$ by 90°, as per the derivations and phasor diagram presented in Table IV. Whereas, in reverse power transfer, the corresponding pair of voltage and current are 180° out of phase with $v'_{DE}$ leading $v_{AB}$ by 90°, conforming to the derivations and phasor diagram presented in Table IV.

TABLE V

Bidirectional Converter Details

| Component/Parameter | Value |
| --- | --- |
| $I_g/|I_1|$ (A) | 1 |
| $V_2/V_{out}$ (V) | 150 |
| $f_s$ (kHz) | 250 |
| $L_r$ (µH) | 194.4 |
| $C_r$ (pF) | 208.5 |
| $L_g$ (µH) | 194.4 |
| n | 2.9 |
| $P_{load}$ (W) | 50-500 |
| Primary MOSFETs | C2M1000170D |
| $C_{DC\_pri}$ (µF) | 0.23 |
| $L_{zvs\_pri}$ (µH) | 50 |
| Secondary MOSFETs | IXFQ72N20X3 |
| $C_{DC\_sec}$ (µF) | 6.4 |
| $L_{zvs\_sec}$ (µH) | 60 |

The steady state DC output voltage ($V_2$), with fixed control angle of $\varphi_{AB}=120°$, is plotted over the load range in FIG. 27(a), for forward power transfer. And the DC output current ($|I_1|$) with fixed control angle of $\varphi_{AB}=120°$ is plotted in FIG. 27(b), for reverse power transfer operation. In FIG. 27, the analytical lines represent the analytical reference and the other lines show the experimental data. It can be seen from these plots that the DC output is almost constant over 10:1 load range, making them fairly independent of load. The small variation in the DC output is within around 3% for forward power and within 4% for reverse power transfer operation which is due to non-idealities such as ESR of components, effects of dead time etc., which were ignored in analysis.

Figure 28:
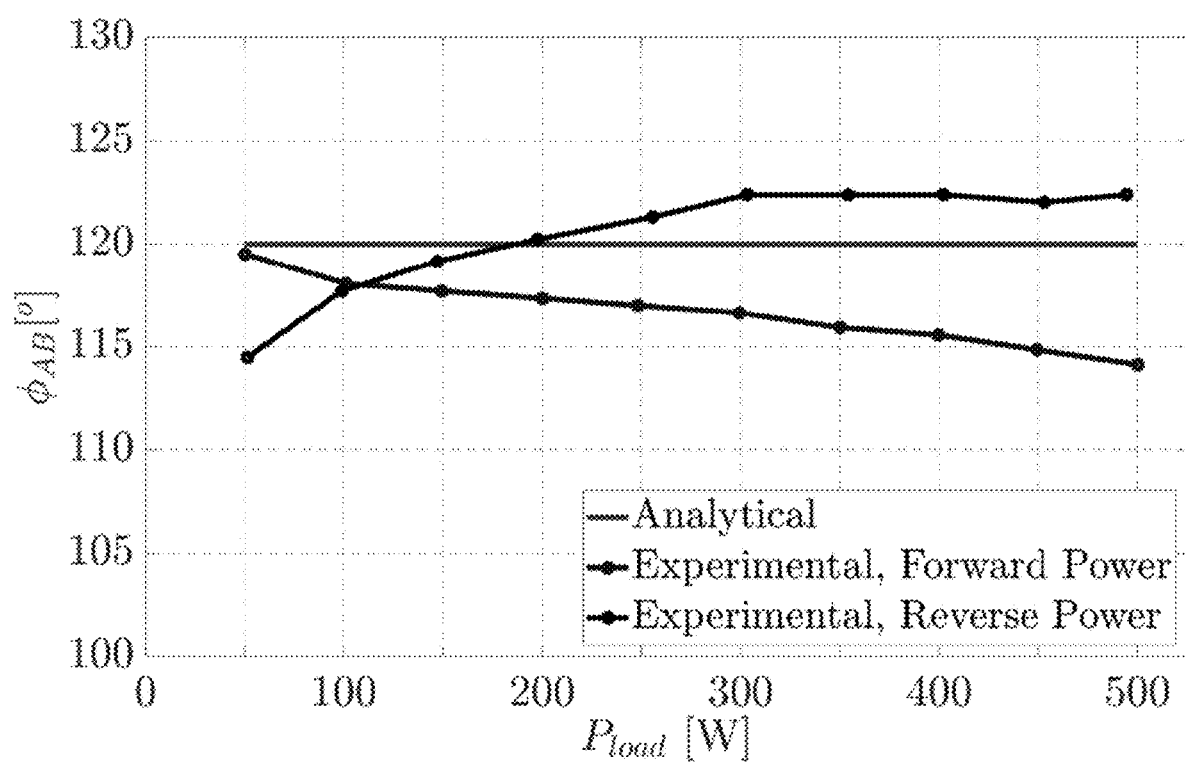
FIG. 28 is a diagram illustrating variation in control angle $\varphi_{AB}$ over the range of load power with analytical results, regulating output voltage ($V_{out}$) at 150 V for forward power flow, and regulating output current ($I_g$) for reverse power transfer.

The variation of control angle ($\varphi_{AB}$) needed to keep the output regulated at the desired value is also checked for this converter operating in both directions of power flow. The experimental data is plotted in FIG. 28 where the forward power transfer and reverse power transfer are depicted along with the analytical reference. The experimental data range of $\varphi_{AB}$ is within the control boundary of the converter and the variation is only within 8°, over the entire load range, for either direction of power flow.

The rms current in the tank inductors and rms voltage across the resonant capacitor are also measured in hardware, from the oscilloscope captures, for the entire load range in both direction of power flow and are compared to their analytical values. The comparisons are shown in FIG. 29(a) for forward power and in FIG. 29(b) for reverse power operations. In FIG. 29, the analytical results from Table IV are plotted in solid line whereas the measured data are shown in corresponding dots of same variable. The top plot in FIG. 29(a) and FIG. 29(b) compares the rms current ($i_r$ and $i_R$) in the tank inductors and the bottom plot compares the rms value of resonant capacitor voltage ($v_{Cr}$). The plots in FIG. 29 depicts a good match between analysis and results obtained from the hardware experiments.

Figure 30:
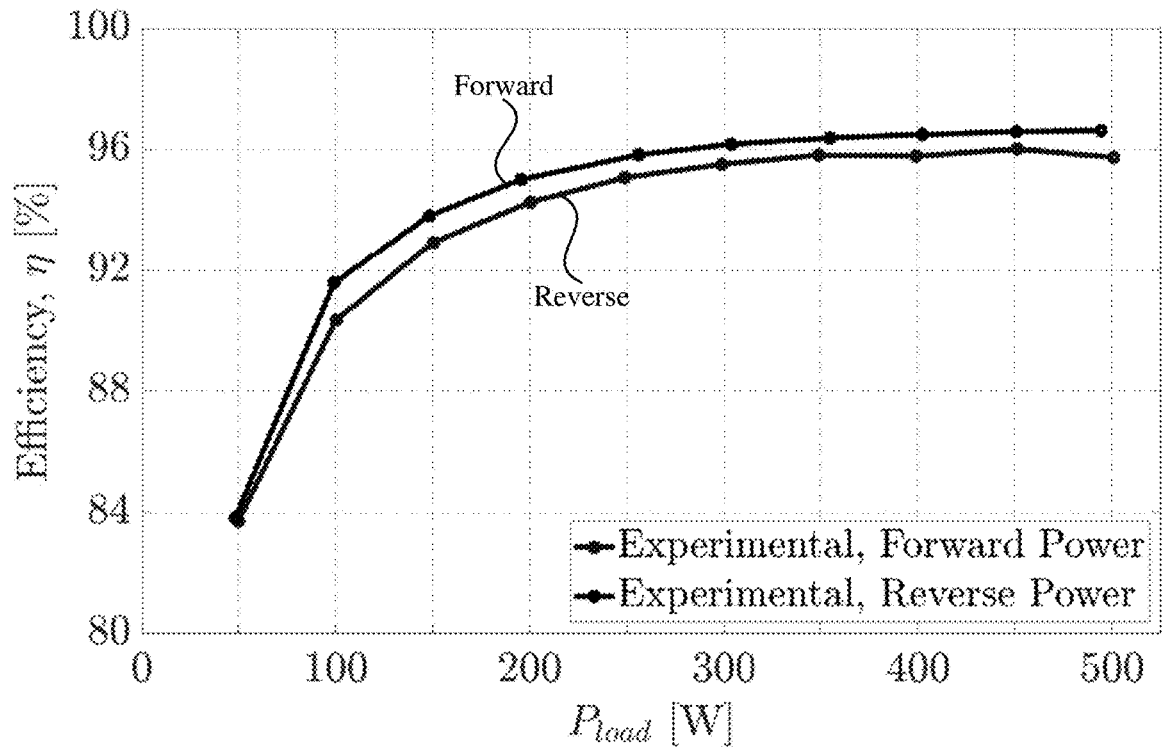
FIG. 30 is a diagram illustrating experimentally measured efficiency of the converter versus load power for forward and reverse power, while regulating its outputs at 150 V and 1 A, respectively.

The converter efficiency while regulating its DC output at its desired value of 150 V for forward power transfer and 1 A for reverse power transfer, are shown in FIG. 30 with a peak efficiency around 96%.

XI. Conclusion

In underwater DC distribution system, constant current source based system provides benefit over constant voltage source due to robustness against voltage drop along cable length and cable fault. In such system, power converter capable of bi-directional power flow are required for critical loads. With detailed analysis presented herein, it is shown that a bidirectional DAB LCL-T resonant converter which can provide load independent DC output voltage from constant DC current source in forward power flow and load independent DC current at its output when fed from a constant DC voltage source in reverse power flow, is well suited for such critical underwater PBUs. Starting with steady state modeling and analysis, incorporating generalized three angle modulation, it is presented how the converter can be designed with proper modulation angle set in order to operate the converter with minimum VA rating for the H-bridges, resonant tank and transformer. A hardware prototype has been built and tested for a load range of 50 W to 500 W, converting 1 A source to 150 V output in forward direction and 150 V DC voltage source to 1 A drive to load in reverse power, operating at a switching frequency of 250 kHz. And the test results show a good match between analysis and experimental data in terms of the steady state DC output, rms values of tank signals and phasor relationship among the AC signals.

XII. Appendix

A. Derivation of Tank Input Impedance

With reference to the AC equivalent circuit shown in FIG. 3(b), the impedances of individual tank components are given by:

$$X_{Lr} = 2\pi f_s L_r = FZ_o, \quad X_{Lg} = gFZ_o, \tag{A.1}$$
$$X_{Cr} = \frac{1}{2\pi f_s C_r} = \frac{Z_o}{F},$$

where, $Z_o$ and $F$ are as defined in equation (7). Now, the tank input impedance can be derived as:

$$Z_{in} = jFZ_o + \frac{-j\frac{Z_o}{F}(R_e + jgFZ_o)}{-j\frac{Z_o}{F} + (R_e + jgFZ_o)}, \tag{A.2}$$

which can be simplified to:

$$Z_{in} = jFZ_o + \frac{Z_o(Q + jgF)}{(1 - gF^2) + jFQ}, \tag{A.3}$$

where, Q is defined in equation (7). The expression of $Z_{in}$ from (A.3) can further be expanded to be expressed in the form:

$$Z_{in} = \frac{Z_o}{\left[(1 - gF^2)^2 + F^2 Q^2\right]}[Z_R + jZ_I], \tag{A.4}$$

where, $Z_R$ and $Z_I$ are expressed as:
$$Z_R = Q(1-gF^2)(1-F^2)^2 + (1+g)QF^2 - gQF^4,$$
$$Z_I = (1+g)F(1-gF^2) - gF^3(1-gF^2) - FQ^2(1-F^2)^2. \tag{A.5}$$

When operating at resonance, i.e. at F=1, $Z_{on}$ from (A.4) can be simplified to:

$$Z_{in}|_{F=1} = \frac{Z_o}{\sqrt{Q^2 + (1-g)^2}} \angle \tan^{-1}\left(\frac{1-g}{Q}\right). \tag{A.6}$$

and the power factor, $\cos(\varphi_{in})$, can be given as:

$$\cos(\varphi_{in})|_{F=1} = \frac{Q}{\sqrt{Q^2 + (1-g)^2}}. \tag{A.7}$$

Substituting (A.6) and (A.7) into equation (12), the DC output voltage can be expressed as:

$$V_{out}|_{F=1} = \frac{\pi^2}{8n} \frac{Z_o I_g}{\sin\left(\frac{\varphi_{AB}}{2}\right)}. \tag{A.8}$$

Further, when g=1, i.e. with $L_g = L_r$, $Z_{in}$ and $\cos(\varphi_{in})$, are given as:

$$Z_{in}|_{F=1,g=1} = \frac{Z_o^2}{R_e} \angle 0°, \quad \cos(\varphi_{in})|_{F=1,g=1} = 1. \tag{A.9}$$

B. Derivation of Tank Quantities

Figure 32:
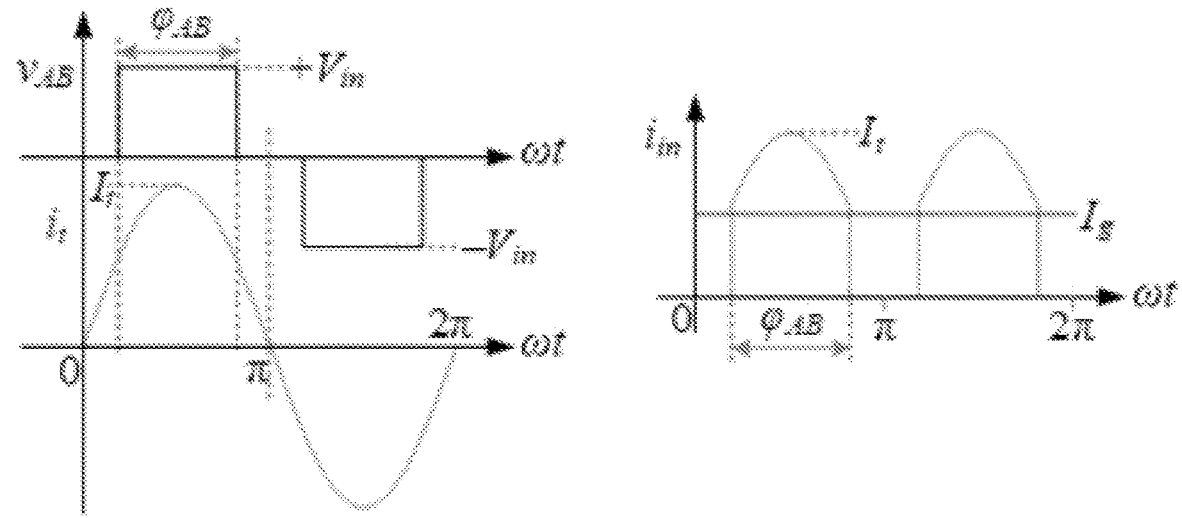
FIG. 32 is diagram illustrating the primary H-bridge inverter's output voltage ($v_{AB}$) and current waveform (left) and DC side input current waveform (right)

In this section, the tank signals are derived from the equivalent circuit shown in FIG. 3(a) and FIG. 5(a). The input current ($i_t$) to the resonant tank from the inverter is shown in FIG. 32 and its rectified DC side current ($i_{in}$) is shown on the right hand side of the same figure. Since the average value of ii n comes from the DC source ($I_g$), the amplitude of $i_t$ can be found out through:

$$I_g = \langle i_{in} \rangle = \frac{2}{\pi} I_t \sin\left(\frac{\varphi_{AB}}{2}\right), \tag{B.1}$$

where, <x> denotes average of x over its period. Since the converter is operating at F=1 and g=1, $v_{AB,1}$ and $i_t$ are in phase and thus, using (B.1), the current in the resonant inductor $L_r$ can be expressed as:

$$i_t(t) = I_t \cos(\omega_s t) = \frac{\pi}{2} \frac{I_g}{\sin\left(\frac{\varphi_{AB}}{2}\right)} \cos(\omega_s t). \tag{B.2}$$

Figure 5:
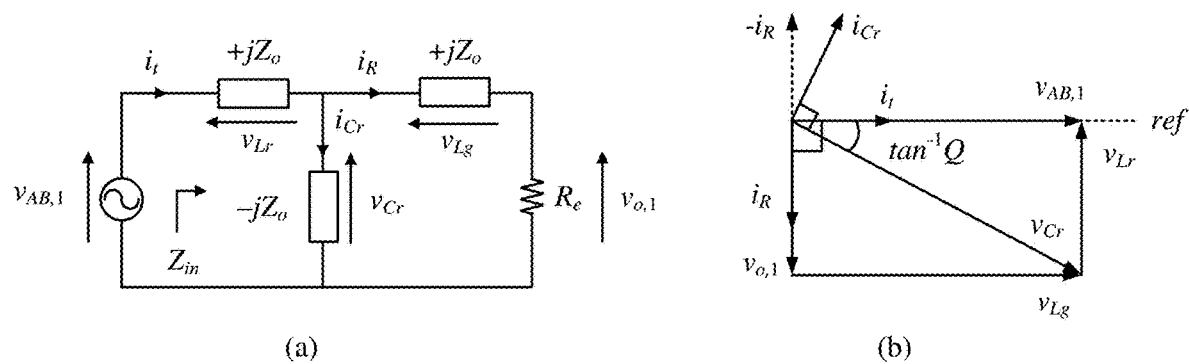
FIG. 5 is a schematic block diagram illustrating one embodiment of (a) an equivalent circuit of the tank, at an operating point of F=1 and g=1 and (b) a phasor diagram for the AC signals from the equivalent circuit of (a)

The amplitude of load side resonant inductor current ($i_R$) is evaluated from the circuit in FIG. 5($a$) with amplitude of $v_{o,1}$ from equation (8) and is given as:

$$I_R = \frac{|v_{o,1}|}{R_e} = \frac{\frac{4n}{\pi}V_{out}}{\frac{8n^2}{\pi^2}R_{load}} = \frac{\pi}{2n}I_{load}. \quad \text{(B.3)}$$

Now, from the circuit of FIG. 5($a$), $i_R$ can be expressed in terms of $i_t$ as:

$$i_R = i_t \frac{-jZ_o}{-jZ_o + R_e + jZ_o} = -j\frac{Z_o}{R_e}i_t, \quad \text{(B.4)}$$

which means that $i_R$ lags it by 90° and thus, using (B.3), $i_R(t)$ can be express as:

$$i_R(t) = I_R \cos\left(\omega_2 t - \frac{\pi}{2}\right) = \frac{\pi}{2n}I_{load}\cos\left(\omega_s t - \frac{\pi}{2}\right). \quad \text{(B.5)}$$

The voltage across the resonant capacitor can be found from FIG. 5($a$) as well and is derived as:

$$v_{Cr} = i_R(R_e + jZ_o) = \left[\frac{4n}{\pi}\frac{V_{out}}{R_e}\angle\left(-\frac{\pi}{2}\right)\right]R_e\left(1 + \frac{j}{Q}\right) = \frac{4n}{\pi}V_{out}\sqrt{1 + \frac{1}{Q^2}}\angle\left[-\frac{\pi}{2} + \tan^{-1}\left(\frac{1}{Q}\right)\right]. \quad \text{(B.6)}$$

Using trigonometric identity, it can be shown that:

$$\tan^{-1}Q = \frac{\pi}{2} - \tan^{-1}\left(\frac{1}{Q}\right) \quad \text{(B.7)}$$

Hence, from (B.6) the resonant capacitor voltage is given as:

$$v_{Cr}(t) = \frac{4n}{\pi}V_{out}\sqrt{1 + \frac{1}{Q^2}}\cos(\omega_s t - \tan^{-1}Q). \quad \text{(B.8)}$$

The current through $C_r$ is evaluated as:

$$i_{Cr} = \frac{v_{cr}}{-jZ_o} = \frac{4n}{\pi}\frac{V_{out}}{Z_o}\sqrt{1 + \frac{1}{Q^2}}\angle\left(-\tan^{-1}Q + \frac{\pi}{2}\right). \quad \text{(B.9)}$$

With the identity shown in (B.7), current in the resonant capacitor is expressed as:

$$i_{Cr}(t) = \frac{4n}{\pi}\frac{V_{out}}{Z_o}\sqrt{1 + \frac{1}{Q^2}}\cos\left[\omega_s t + \tan^{-1}\left(\frac{1}{Q}\right)\right]. \quad \text{(B.10)}$$

The VA of $L_r$ is evaluated as:

$$VA_{Lr} = I_{t,rms}^2 Z_o = \left(\frac{\pi}{2\sqrt{2}}\right)^2 \frac{I_g^2}{\left[\sin\left(\frac{\varphi_{AB}}{2}\right)\right]^2}Z_o. \quad \text{(B.11)}$$

Using the expression of $V_{out}$ from equation (17), (B.11) can be written as:

$$VA_{Lr} = \frac{8n^2}{\pi^2 Z_o}R_{load}\frac{V_{out}^2}{R_{load}} = \frac{R_e}{Z_o}P_{out} = QP_{out}. \quad \text{(B.12)}$$

VA of $L_g$ is evaluated as:

$$VA_{Lg} = I_{R,rms}^2 Z_o = \left(\frac{\pi}{2\sqrt{2}n}I_{load}\right)^2 Z_o = \frac{\pi^2}{8n^2}\left(\frac{V_{out}}{R_{load}}\right)^2 Z_o = \frac{Z_o}{\frac{8n^2}{\pi^2}R_{load}}\left(\frac{V_{out}^2}{R_{load}}\right) = \frac{1}{\frac{R_e}{Z_o}}P_{out} = \frac{P_{out}}{Q}. \quad \text{(B.13)}$$

The quality factors presented in equation (45) are derived here from their basic definition. The quality factor of the load side resonant inductor $L_g$ is derived as:

$$Q_L = 2\pi\frac{E_{Lg\_pk}f_o}{P_{out}}, \quad \text{(B.14)}$$

where, $E_{Lg\_pk}$ is the peak energy stored in $L_g$ and is given as:

$$E_{Lg\_pk} = \frac{1}{2}L_g\left(\sqrt{2}I_{R,rms}\right)^2 = L_g I_{R,rms}^2 \quad \text{(B.15)}$$

and from the equivalent circuit of FIG. 5($a$), $P_{out}$ can be given as:

$$P_{out} = I_{R,rms}^2 R_e. \quad \text{(B.16)}$$

Substituting (B.15) and (B.16) into (B.14) and using definition of $\omega_o$, $Z_o$ and Q from equation (7), $Q_L$ can be expressed as:

$$Q_L = 2\pi f_o \frac{L_g}{R_e} = \frac{Z_o}{R_e} = \frac{1}{Q}. \quad \text{(B.17)}$$

Similarly, the quality factor of the source side resonant inductor $L_r$ can be derived as:

$$Q_S = 2\pi\frac{E_{Lr\_pk}f_o}{P_{out}}, \quad \text{(B.18)}$$

where, $E_{Lr\_pk}$ is the peak energy stored in $L_r$ and is given as:

$$E_{Lr\_pk} = \frac{1}{2}L_r\left(\sqrt{2}I_{t,rms}\right)^2 = L_r I_{t,rms}^2. \quad \text{(B.19)}$$

Using the relationship between $i_t$ and $i_R$ from (B.4) and using (B.19) and equation (7), (B.18) can be further expressed as:

$$Q_S = 2\pi f_o \frac{L_r}{R_e}\left(\frac{R_e}{Z_o}\right)^2 = \frac{R_e}{Z_o} = Q. \quad \text{(B.20)}$$

It can be observed from (B.17) and (B.20) that $Q_S$ and $Q_L$ are inverse of each other which means if source side inductor current is more sinusoidal (less in harmonic content), the load side inductor current will be more non-sinusoidal (more harmonic content). This can be observed from the results shown in FIG. 10(a), where at light load, the waveform of $i_t$ is more sinusoidal than waveform of $i_R$ (transformer reflected $i_D$) when $Q_S=10$ and $Q_L=0.1$.

C. Tolerance Analysis

Figure 33:
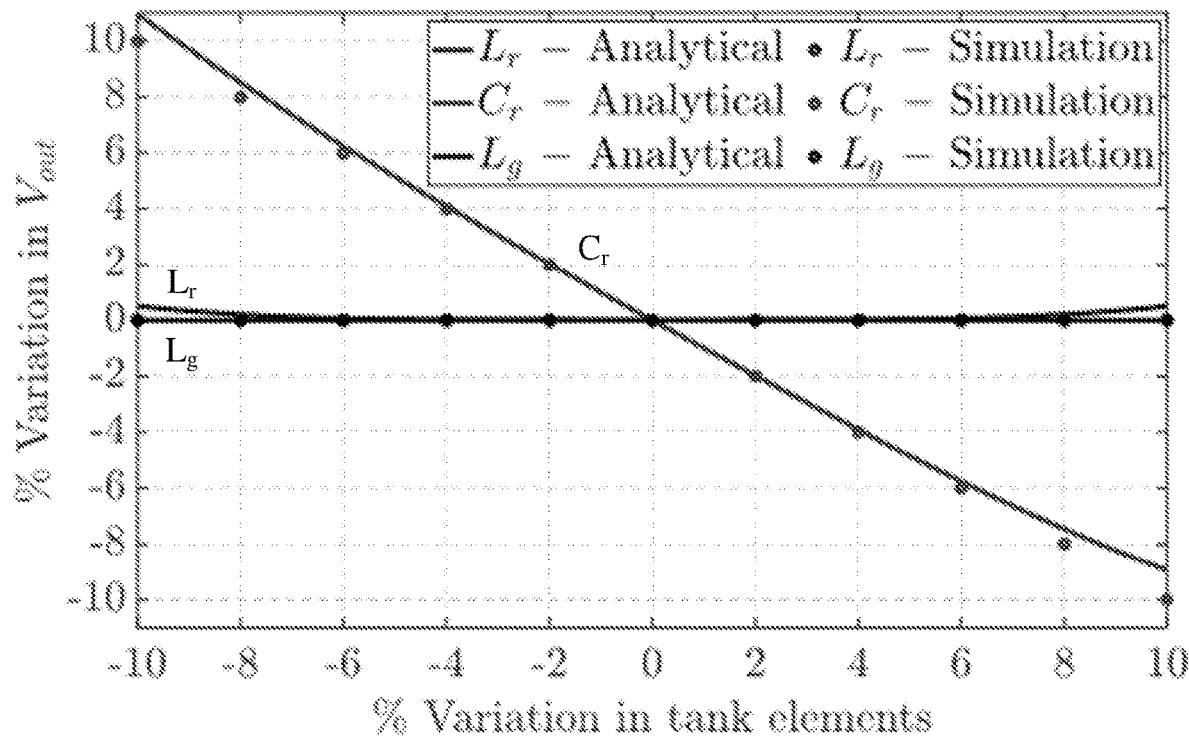
FIG. 33 is a diagram illustrating percentage variation in DC output voltage ($V_{out}$) for variation in tank elements for variation in Lr, variation in Cr, and for variation in Lg and the solid lines are for analytical results and dots are for simulation results.

The variation of output voltage due to tolerances in tank component values are shown in FIG. 33 using the analytical expression of $V_{out}$ from equation (12) and $Z_{in}$ from equation (13). In FIG. 33, the analytical percentage variation in $V_{out}$ is plotted in sloid lines for variation in $L_r$, $C_r$ and $L_g$, with one of them varied at a time, keeping the remaining two fixed at their nominal value(s). The tolerance results obtained from MATLAB-PLECS simulation is also shown in the same plot, using dots of corresponding color. It can be seen from this plot in FIG. 33 that there is a little variation in output voltage for variation in tank inductors. However, variation in resonant capacitor has a dominant effect on variation in $V_{out}$. The results plotted in FIG. 33 are for the lowest load of $P_{out}=50$ W, where the value of Q is maximum and has highest influence on $V_{out}$ due to component tolerance. With use of a class I ceramic capacitor (C0G, NP0), which is stable over temperature and voltage bias, the capacitance tolerance is within ±5% which translates to variation in $V_{out}$ within ±6%, from the result plotted in FIG. 33. This can be taken care of by margin in modulation angle of $\varphi_{AB}$, (120° to 180°). Further, since the tolerance is prominent at light loads, active shunt current control circuit can also be utilized at the input source with slight drop of light load efficiency.

An H-bridge controlled through phase shift modulation angle $\varphi_I$ is shown in FIG. 34(a) whose voltage and current signals on the DC side are $V_{DC}$, $I_{DC}$ and $v_{AC}$, $i_{AC}$ on the AC side. The voltage and current waveforms of this H-bridge are shown in FIG. 34(b) with $v_{AC,1}$ being the fundamental component of $v_{AC}$. With $v_{AC,1}$ as reference, the AC side quantities of the H-bridge are expressed as:

$$v_{AC,1}(t) = \frac{4}{\pi} V_{DC} \sin\left(\frac{\varphi_I}{2}\right) \sin(\omega_s t), \tag{D.1}$$

$$i_{AC}(C) = I_{AC} \sin(\omega_s t - \varphi_{AC}), \tag{D.2}$$

where $\varphi_{AC}$ is the phase shift angle between $v_{AC,1}$ and $i_{AC}$. From FIG. 34(b), the DC side current $I_{DC}$ can be evaluated from the AC side current as:

$$I_{DC} = \frac{1}{\frac{\pi}{\omega_s}} \int_{\frac{\pi}{2}-\frac{\varphi_I}{2}}^{\frac{\pi}{2}-\frac{\varphi_I}{2}} i_{AC}(t) dt = \frac{2}{\pi} I_{AC} \sin\left(\frac{\varphi_I}{2}\right) \cos(\varphi_{AC}). \tag{D.3}$$

The impedance seen from the AC side of the H-bridge is expressed as:

$$Z_{AC}|Z_{AC}|<\varphi_{AC}, \tag{D.4}$$

where $|Z_{AC}|$ is calculated as:

$$|Z_{AC}| = \frac{|v_{AC,1}|}{|i_{AC}|} = \frac{8}{\pi^2} R_{DC} \cos(\varphi_{AC}) \sin^2\left(\frac{\varphi_I}{2}\right), \tag{D.5}$$

where $R_{DC}$ is the load resistance on the DC side of the H-bridge. The impedance in (D.4) can also be expressed in cartesian form which is given as:

$$Z_{AC}=R_{AC}+jX_{AC}, \tag{D.6}$$

where $R_{Ac}$ and $X_{AC}$ are the real and imaginary part of $Z_{AC}$, respectively and are defined as:

$$R_{AC}=|Z_{AC}| \cos(\varphi_{AC}), X_{AC}=|Z_{AC}| \sin(\varphi_{AC}) \tag{D.7}$$

E. Sensitivity to Component Variation

The variation of DC output voltage, for forward power plow and DC output current, for reverse power flow are plotted in FIG. 35, for variation in each tank components, one at a time, keeping the other two elements at their nominal value. The results shown in FIG. 35 is from simulation carried out in MATLAB-PLECS where the solid lines represent the percentage variation in the DC output for forward power flow and the dotted lines are for reverse power flow with respect to percentage variation in $L_r$, $C_r$ and $L_g$. From this plot it can be seen that the DC output is not sensitive to the variation in inductor values but are strongly dependent on variation in resonant capacitor. However, since class I ceramic capacitors (C0G, NP0), stable over voltage bias and temperature, are used as the resonant capacitor, the tolerance in capacitance is within ±5% resulting in a variation in output within ±6%. This variation can be taken care of by the control range of $\varphi_{AB}$.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power converter comprising:
   a primary H-bridge comprising semi-conductor switches;
   an LCL-Transformer section comprising a first inductor $L_r$ with a first end connected to a first terminal A of the primary H-bridge, a capacitor $C_r$ connected between a second end of the first inductor $L_r$ and a second terminal B of the primary H-bridge, and a second inductor $L_g$ with a first end connected to the second end of the first inductor $L_r$;
   a transformer with a primary side connected between a second end of the second inductor $L_g$ and the second terminal B of the primary H-bridge;
   a secondary H-bridge comprising semi-conductor switches with an input connected to a secondary side of the transformer; and
   an output capacitor $C_f$ connected across output terminals of the secondary H-bridge,
   wherein the primary H-bridge is fed by a direct current (DC) constant current source and the output terminals of the secondary H-bridge are connected to a load and an output voltage of the secondary H-bridge regulated to maintain a constant DC output voltage, and
   wherein the semi-conductor switches of the primary H-bridge are arranged in a leg A and a leg B, the semi-conductor switches of the secondary H-bridge are arranged in a leg D and a leg E and wherein:
   the semi-conductor switches of the primary H-bridge are operated with symmetrical phase shift modulation with leg A leading leg B by an angle $\varphi_{Ab}$;

the semi-conductor switches of the secondary H-bridge are operated with symmetrical phase shift modulation with leg D leading leg E by an angle $\varphi_{DE}$;

an angle between leg A and leg D is angle $\varphi_{AD}$; and the output voltage of the secondary H-bridge is maintained at a constant voltage by controlling angle $\varphi_{AB}$, angle $\varphi_{DE}$, and angle $\varphi_{AD}$.

2. The power converter of claim 1, wherein a switching frequency of the semi-conductor switches of the primary H-bridge and the secondary H-bridge is selected to be within 15 percent of a resonant frequency of the LCL-Transformer section.

3. The power converter of claim 2, wherein a ratio g of the first inductor $L_r$ and the second inductor $L_g$ is set to be within a range of 0.2 to 5.

4. The power converter of claim 1, wherein a relationship between angle $\varphi_{AB}$, angle $\varphi_{DE}$, and angle $\varphi_{AD}$ is:

$$\varphi_{AD} = \frac{\varphi_{AB}}{2} + \frac{\pi}{2} - \frac{\varphi_{DE}}{2}.$$

5. The power converter of claim 4, wherein angle $\varphi_{DE}$ is 180 degrees and a relationship between angle $\varphi_{AB}$ and angle $\varphi_{AD}$ is:

$$\varphi_{AD} = \frac{\varphi_{AB}}{2}.$$

6. The power converter of claim 5, wherein one of:

angle $\varphi_{AB}$ is controlled as a function of the output voltage of the secondary H-bridge and angle $\varphi_{AD}$ is controlled to be half the angle $\varphi_{AB}$; and angle $\varphi_{AD}$ is controlled as a function of the output voltage of the secondary H-bridge and angle $\varphi_{AB}$ is controlled to be twice the angle $\varphi_{AD}$.

7. The power converter of claim 1, wherein power flow is bidirectional.

8. The power converter of claim 7, wherein a power flow direction from the primary H-bridge to the secondary H-bridge is dependent on a phase angle $\varphi_{PS}$, which is:

$$\varphi_{PS} = \varphi_{AD} - \frac{\varphi_{AB}}{2} + \frac{\varphi_{DE}}{2}.$$

9. The power converter of claim 8, wherein $\varphi_{PS}$ is within the range [0, π] for forward power flow where input current $I_1$ to the primary H-bridge and output current $I_2$ from the secondary H-bridge are positive, and $\varphi_{PS}$ is within the range [−π, 0] for reverse power flow where $I_1$ and $I_2$ are both negative.

10. The power converter of claim 8, wherein angle $\varphi_{DE}$ is 180 degrees and a relationship between angle $\varphi_{AB}$ and angle $\varphi_{AD}$ is:

$$\varphi_{AD} = \frac{\varphi_{AB}}{2}$$

for forward power flow; and $$\varphi_{AD} = \frac{\varphi_{AB}}{2} - 180°$$

for reverse power flow.

11. The power converter of claim 10, wherein one of:

for forward power flow, angle $\varphi_{AB}$ is one of set to a fixed value or controlled as a function of the output voltage of the secondary H-bridge and angle $\varphi_{AD}$ is controlled to be half the angle $\varphi_{AB}$;

for reverse power flow, angle $\varphi_{AB}$ is one of set to a fixed value or controlled as a function of the input current to the primary H-bridge and angle $\varphi_{AD}$ is controlled to be $$\varphi_{AD} = \frac{\varphi_{AB}}{2} - 180°;$$

for forward power flow, angle $\varphi_{AD}$ is one of set to a fixed value or controlled as a function of the output voltage of the secondary H-bridge and angle $\varphi_{AB}$ is controlled to be twice the angle $\varphi_{AD}$; and for reverse power flow, angle $\varphi_{AD}$ is one of set to a fixed value or controlled as a function of the input current to the primary H-bridge and angle $\varphi_{AB}$ is controlled to be $\varphi_{AB}=2(\varphi_{AD}+180°)$.

12. The power converter of claim 1, wherein a turns ratio n of the transformer is set at an optimal turns ratio $n_{opt}$:

$$n_{opt} = \frac{P_{load\_max} \sin\left(\frac{\varphi_{AB}}{2}\right)}{V_2 I_g},$$

where $P_{load\_max}$ is a maximum load condition;

$I_g$ is a DC constant source current; and $V_2$ is a constant output voltage of the secondary H-bridge.

13. The power converter of claim 1, further comprising an input capacitor $C_{in}$ connected across input terminals of the primary H-bridge.

14. A power converter comprising:

a primary H-bridge comprising a first semi-conductor switch, a second semi-conductor switch, a third semi-conductor switch, and a fourth semi-conductor switch, wherein the first semi-conductor switch and the second semi-conductor switch are in leg A with terminal A between the first semi-conductor switch and the second semi-conductor switch in leg A and the third semi-conductor switch and the fourth semi-conductor switch are in leg B with terminal B between the third semi-conductor switch and the fourth semi-conductor switch in leg B, said terminal A and said terminal B forming an output of the primary H-bridge;

an LCL-Transformer section comprising a first inductor $L_r$ with a first end connected to said terminal A, a capacitor $C_r$ connected between a second end of the first inductor $L_r$ and said terminal B, and a second inductor $L_g$ with a first end connected to the second end of the first inductor $L_r$;

a transformer with a primary side connected between a second end of the second inductor $L_g$ and said terminal B, the transformer comprising a turns ratio n;

a secondary H-bridge comprising a fifth semi-conductor switch, a sixth semi-conductor switch, a seventh semi-conductor switch, and an eight semi-conductor switch with an input connected to a secondary side of the transformer, wherein the fifth and sixth semi-conductor switches are in leg D with terminal D between the fifth and sixth semi-conductor switches of leg D and the seventh and eighth semi-conductor switches are in leg E with terminal E between the seventh and eighth semi-conductor switches of leg E, said terminal D and said terminal E forming an output of the secondary H-bridge; and an output capacitor $C_f$ connected across said terminal D and said terminal E, wherein the primary H-bridge is fed by a direct current (DC) constant current source, and wherein said terminals D and E are connected to a load and an output voltage across said terminals D and E is regulated to maintain a constant DC output voltage, and wherein:
the first, second, third and fourth semi-conductor switches of the primary H-bridge are operated with the symmetrical phase shift modulation with leg A leading leg B by an angle $\varphi_{AB}$;
the fifth, sixth, seventh, and eighth semi-conductor switches of the secondary H-bridge are operated with the symmetrical phase shift modulation with leg D leading leg E by an angle $\varphi_{DE}$;
an angle between leg A and leg D is angle $\varphi_{AD}$; and
the output voltage of the secondary H-bridge is maintained at a constant voltage by controlling angle $\varphi_{AB}$, angle $\varphi_{DE}$, and angle $\varphi_{AD}$,
wherein a relationship between angle $\varphi_{AB}$, angle $\varphi_{DE}$, and angle $\varphi_{AD}$ is:

$$\varphi_{AD} = \frac{\varphi_{AB}}{2} + \frac{\pi}{2} - \frac{\varphi_{DE}}{2}.$$

15. The power a switching frequency of the first, second, third and fourth semi-conductor switches of the primary H-bridge and the fifth, sixth, seventh, and eighth semi-conductor switches of the secondary H-bridge is selected to be within 15 percent of a resonant frequency of the LCL-Transformer section, and wherein a ratio g of the first inductor $L_r$ and the second inductor $L_g$ is within a range of 0.2 to 5.

16. The power converter of claim 14, wherein angle $\varphi_{DE}$ is 180 degrees and a relationship between angle $\varphi_{AB}$ and angle $\varphi_{AD}$ is $$\varphi_{AD} = \frac{\varphi_{AB}}{2},$$

and wherein one of:
angle $\varphi_{AB}$ is controlled as a function of the output voltage of the secondary H-bridge and angle $\varphi_{AD}$ is controlled to be half the angle $\varphi_{AB}$; and
angle $\varphi_{AD}$ is controlled as a function of the output voltage of the secondary H-bridge and angle $\varphi_{AB}$ is controlled to be twice the angle $\varphi_{AD}$.

17. The power converter of claim 14, wherein power flow is bidirectional, wherein
a power flow direction from the primary H-bridge to the secondary H-bridge is dependent on a phase angle $\varphi_{PS}$, which is:

$$\varphi_{PS} = \varphi_{AD} - \frac{\varphi_{AB}}{2} + \frac{\varphi_{DE}}{2}.$$

18. A bidirectional power converter comprising:
a primary H-bridge comprising a first semi-conductor switch, a second semi-conductor switch, a third semi-conductor switch, and a fourth semi-conductor switch, wherein the first semi-conductor switch and the second semi-conductor switch are in leg A with terminal A between the first semi-conductor switch and the second semi-conductor switch in leg A and the third semi-conductor switch and the fourth semi-conductor switch are in leg B with terminal B between the third semi-conductor switch and the fourth semi-conductor switch in leg B, said terminal A and said terminal B forming an output of the primary H-bridge;

an LCL-Transformer section comprising a first inductor $L_r$ with a first end connected to terminal A, a capacitor $C_r$ connected between a second end of the first inductor $L_r$ and said terminal B, and a second inductor $L_g$ with a first end connected to the second end of the first inductor $L_r$;

a transformer with a primary side connected between a second end of the second inductor $L_g$ and said terminal B, the transformer comprising a turns ratio n;

a secondary H-bridge comprising a fifth semi-conductor switch, a sixth semi-conductor switch, a seventh semi-conductor switch, and an eight semi-conductor switch with an input connected to a secondary side of the transformer, wherein the fifth and sixth semi-conductor switches are in leg D with terminal D between the fifth and sixth semi-conductor switches of leg D and the seventh and eighth semi-conductor switches are in leg E with terminal E between the seventh and eighth semi-conductor switches of leg E, terminal D and terminal E forming an output of the secondary H-bridge; and an output capacitor $C_f$ connected across said terminal D and said terminal E, wherein the primary H-bridge is fed by a direct current (DC) constant current source, and wherein said terminals D and E are connected to a load and an output voltage across said terminals D and E is regulated to maintain a constant DC output voltage, wherein:
the first, second, third and fourth semi-conductor switches of the primary H-bridge are operated with symmetrical phase shift modulation with leg A leading leg B by an angle conductor $\varphi_{AB}$;
the fifth, sixth, seventh, and eighth semi-conductor switches of the secondary H-bridge are operated with symmetrical phase shift modulation with leg D leading leg E by an angle $\varphi_{DE}$;
an angle between leg A and leg D is angle $\varphi_{AD}$; and
a power flow direction from the primary H-bridge to the secondary H-bridge is dependent on a phase angle $\varphi_{PS}$, which is:

$$\varphi_{PS} = \varphi_{AD} - \frac{\varphi_{AB}}{2} + \frac{\varphi_{DE}}{2}.$$

* * * * *